US012138217B2

(12) United States Patent
Perrin et al.

(10) Patent No.: US 12,138,217 B2
(45) **Date of Patent: *Nov. 12, 2024**

(54) COMBINATION EMERGENCY WASH AND FAUCET UNIT

(71) Applicant: Bradley Fixtures Corporation, Menomonee Falls, WI (US)

(72) Inventors: Timothy E. Perrin, Hartford, WI (US); Ryan Pfund, Slinger, WI (US); Douglas J. Carpiaux, Milwaukee, WI (US); Scott H. Micoley, Plymouth, WI (US)

(73) Assignee: Bradley Fixtures, LLC, Menomonee Falls, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/231,752

(22) Filed: Aug. 8, 2023

(65) Prior Publication Data

US 2023/0381064 A1 Nov. 30, 2023

Related U.S. Application Data

(63) Continuation of application No. 17/372,932, filed on Jul. 12, 2021, now Pat. No. 11,752,065, which is a (Continued)

(51) Int. Cl.

| | |
|---|---|
| ***A61H 35/02*** | (2006.01) |
| ***A61H 35/00*** | (2006.01) |
| ***E03C 1/04*** | (2006.01) |

(52) U.S. Cl.

CPC ........... *A61H 35/02* (2013.01); *A61H 35/008* (2013.01); *E03C 1/04* (2013.01); *A61H 2201/5051* (2013.01); *A61H 2201/5092* (2013.01)

(58) Field of Classification Search

CPC ................................ A61H 35/00; A61H 35/02

(Continued)

(56) References Cited

U.S. PATENT DOCUMENTS

| | | | |
|---|---|---|---|
| 1,079,441 | A | 11/1913 | Roethlisberger |
| 1,354,838 | A | 10/1920 | Perkins |

(Continued)

FOREIGN PATENT DOCUMENTS

| | | |
|---|---|---|
| CA | 178659 | 12/2018 |
| EM | 004541399-0001 | 1/2018 |

(Continued)

OTHER PUBLICATIONS

Bradley Eyewash Station, announced Date unavailable[online], [site visited Jul. 15, 2020]. Available from internet, URL:<https://www.scnindustrial.com/product/bradley-eyewash-station-s19274hw-sei778> (Year: 2020).

(Continued)

*Primary Examiner* — Lauren A Crane

(74) *Attorney, Agent, or Firm* — Boyle Fredrickson, S.C.

(57) ABSTRACT

A combination emergency wash and faucet unit includes a base, an emergency wash arm coupled to the base, and a spout coupled to the base. The emergency wash arm includes an emergency wash unit. The emergency wash arm is repositionable relative to the base. The spout is repositionable relative to the base and the emergency wash arm. The emergency wash arm is selectively reconfigurable between a left hand configuration and a right hand configuration.

20 Claims, 51 Drawing Sheets

Related U.S. Application Data continuation of application No. 16/005,394, filed on Jun. 11, 2018, now Pat. No. 11,058,604.

(60) Provisional application No. 62/518,218, filed on Jun. 12, 2017.

(58) Field of Classification Search
USPC .......................................... 239/27, 25; 4/620
See application file for complete search history.

(56) References Cited

U.S. PATENT DOCUMENTS

| | | | |
|---|---|---|---|
| 1,524,484 A | 1/1925 | Lutz | |
| 2,635,006 A | 4/1953 | Richmond | |
| 2,999,249 A | 9/1961 | Logan et al. | |
| 3,079,088 A | 2/1963 | Herman et al. | |
| 3,925,829 A | 12/1975 | Bost | |
| 4,257,560 A | 3/1981 | Diamond | |
| 4,675,924 A | 6/1987 | Allison et al. | |
| 4,688,276 A | 8/1987 | Allison et al. | |
| 4,901,927 A | 2/1990 | Valdivia | |
| 4,975,993 A | 12/1990 | Black et al. | |
| D330,071 S | 10/1992 | Zerlia | |
| 5,170,518 A | 12/1992 | Warriner | |
| 5,265,288 A | 11/1993 | Allison | |
| D368,302 S | 3/1996 | Doughty et al. | |
| 5,530,972 A | 7/1996 | Tanner | |
| D373,815 S | 9/1996 | Chaney | |
| 5,740,569 A | 4/1998 | Gurries et al. | |
| D437,394 S | 2/2001 | Mark et al. | |
| D439,953 S | 4/2001 | Lord | |
| 6,227,456 B1 | 5/2001 | Colman | |
| 6,256,808 B1 | 7/2001 | Graham et al. | |
| 6,385,794 B1 | 5/2002 | Miedzius et al. | |
| D461,880 S | 8/2002 | Underbrink | |
| D465,831 S | 11/2002 | Otero et al. | |
| D466,589 S | 12/2002 | Miedzius | |
| D466,859 S | 12/2002 | Siegert et al. | |
| 6,520,431 B2 * | 2/2003 | Donovan | A61H 35/02 239/581.1 |
| 6,611,972 B2 | 9/2003 | Underbrink et al. | |
| 6,782,568 B2 | 8/2004 | Novak et al. | |
| D519,613 S | 4/2006 | Spangler | |
| 7,159,252 B2 | 1/2007 | Underbrink et al. | |
| D543,827 S | 6/2007 | Citterio | |
| 7,240,854 B2 | 7/2007 | Taylor | |
| 7,305,722 B2 | 12/2007 | Sha et al. | |
| 7,552,747 B1 * | 6/2009 | Sargsyan | E03C 1/0404 4/601 |
| 7,997,513 B2 | 8/2011 | Chen et al. | |
| D662,219 S | 6/2012 | Perrin et al. | |
| D662,220 S | 6/2012 | Perrin et al. | |
| D662,605 S | 6/2012 | Perrin et al. | |
| D671,228 S | 11/2012 | Perrin et al. | |
| D673,298 S | 12/2012 | Perrin et al. | |
| D685,920 S | 7/2013 | Perrin et al. | |
| D706,399 S | 6/2014 | Yang et al. | |
| D754,297 S | 4/2016 | Garland | |
| 9,314,398 B2 | 4/2016 | Perrin et al. | |
| 9,492,348 B2 | 11/2016 | Novak et al. | |
| 9,700,484 B2 | 7/2017 | Perrin et al. | |
| 9,855,189 B2 | 1/2018 | Eveleigh et al. | |
| 9,868,125 B2 | 1/2018 | Macsay | |
| 9,943,193 B2 | 4/2018 | Stanley | |
| D833,601 S | 11/2018 | Massie et al. | |
| 10,213,058 B2 | 2/2019 | Eveleigh et al. | |
| D853,528 S | 7/2019 | Eads et al. | |
| D853,828 S | 7/2019 | Lucas et al. | |
| 10,342,389 B2 | 7/2019 | Eveleigh et al. | |
| D865,124 S | 10/2019 | Carpiaux et al. | |
| D865,126 S | 10/2019 | Zeng | |
| D875,888 S | 2/2020 | Carpiaux et al. | |
| D886,952 S | 6/2020 | Carpiaux et al. | |
| 10,807,106 B2 | 10/2020 | Buhler et al. | |
| 10,881,253 B2 | 1/2021 | Eveleigh et al. | |
| D912,214 S | 3/2021 | Perrin et al. | |
| D914,151 S | 3/2021 | Perrin et al. | |
| 2002/0175226 A1 | 11/2002 | Donovan | |
| 2009/0276954 A1 | 11/2009 | Davidson | |
| 2012/0096639 A1 | 4/2012 | Stanley et al. | |
| 2018/0353376 A1 | 12/2018 | Perrin et al. | |
| 2019/0368173 A1 | 12/2019 | Chung | |
| 2019/0390446 A1 | 12/2019 | Mooren et al. | |
| 2020/0248438 A1 | 8/2020 | Wang et al. | |
| 2021/0062733 A1 | 3/2021 | Miwa et al. | |
| 2021/0076879 A1 | 3/2021 | Eveleigh et al. | |

FOREIGN PATENT DOCUMENTS

| | | |
|---|---|---|
| EM | 004541399-0007 | 1/2018 |
| WO | WO-2008/067879 A1 | 6/2008 |

OTHER PUBLICATIONS

Bradley Eyewash Station, date unavailable[online], [site visited Jun. 23, 2021]. Available from internet, URL:<https://www.scnindustrial.com/product/bradley-eyewash-station-s 1927 4hw-sei778> (Year: 2021).

Eyewash Faucet, Combination Emergency Eyewash and Gooseneck Faucet, Chicago Faucets, CF2124 11/19, Copyright 2019, available at https://www.chicagofaucets.com/sites/default/files/2020-02/CF2124.pdf, 2pps.

International Search Report and Written Opinion for International Application No. PCT/US2018/036933, mailed Nov. 23, 2018, 23 pages.

Speakman Eyewash-Faucets, website http://speakman.com/emergency-equipment/eyewash-faucet, 2017, 2 pages.

* cited by examiner

COMBINATION EMERGENCY WASH AND FAUCET UNIT

CROSS-REFERENCE TO RELATED PATENT APPLICATIONS

This application is a continuation of U.S. application Ser. No. 17/372,932, filed Jul. 12, 2021, which is a continuation of U.S. application Ser. No. 16/005,394, filed Jun. 11, 2018, now U.S. Pat. No. 11,058,604, which claims the benefit of U.S. Provisional Application No. 62/518,218, filed Jun. 12, 2017, all of which are incorporated herein by reference in their entireties.

TECHNICAL FIELD

The present disclosure relates to faucet arrangements. More particularly, the present disclosure relates to a faucet unit incorporating an emergency wash unit, such as an eyewash unit.

BACKGROUND

Emergency wash units include emergency eyewash units, emergency facewash/eyewash units, and a combination of these systems. Emergency eyewash or emergency facewash units are designed to provide fluid, such as water, to a focused region of the person such as their eyes and/or face.

Emergency eyewash and facewash units are conventionally installed above a sink or basin to manage the drainage of fluid expelled by the systems and any contaminants washed away from a user of the system. In some cases, these sinks include faucets capable of providing fluid, such as water, to wash the hands or arms of a person or other objects or to fill vessels such as buckets, pots, or beakers. These faucets can supply water at various temperatures and flow rates and are the primary use of the sink, as opposed to the emergency wash unit. Accordingly, the faucets are generally centrally located on the sink, while the emergency wash units are located off to the side of the sink, separate from the faucets. The emergency wash units are then moved above the sink before use.

This placement of the emergency wash unit is beneficial, as it prevents the emergency wash unit from obstructing the normal use of the faucet. However, this placement brings a number of disadvantages. When using the emergency wash unit, the head of the person is moved directly above an outlet of the eyewash and/or facewash. Conventionally, the faucet may interfere with the intended placement of the user's head, especially if the vision of the person is impaired due to the presence of contaminants in their eyes. When the eyewash and/or facewash is moved over the sink, the outlets of the emergency wash unit remain offset toward the side of the sink, increasing the potential for water from the emergency wash unit to spray beyond the boundaries of the sink. Further, the eyewash and/or facewash takes up a significant amount of space along the perimeter of the sink. Additionally, this placement requires one or more additional holes through a support surface surrounding the sink to facilitate routing of hoses to the emergency wash unit. Accordingly, better systems are desired.

SUMMARY

One exemplary embodiment relates to a combination emergency wash and faucet unit including a base, an emergency wash arm coupled to the base, and a spout coupled to the base. The emergency wash arm includes an emergency wash unit. The emergency wash arm is repositionable relative to the base. The spout is repositionable relative to the base and the emergency wash arm. The spout is configured to move away from the emergency wash arm in response to movement of the emergency wash arm.

Another embodiment relates to a combination emergency wash and faucet unit including a base configured to be coupled to a sink, an emergency wash arm coupled to the base and repositionable between an active position and a stored position, a valve assembly coupled to the base and the emergency wash arm, and a spout coupled to the base. The base defines a fluid inlet. The emergency wash arm includes an emergency wash unit having an aperture positioned to dispense fluid away from the sink. The valve assembly is configured to fluidly couple the fluid inlet to the emergency wash unit in response to movement of the emergency wash arm such that fluid is dispensed via the aperture.

Another embodiment relates to a combination emergency wash and faucet unit including a base configured to be coupled to a sink, an emergency wash arm coupled to the base and repositionable between an active position and a stored position, a valve assembly coupled to the base and the emergency wash arm, and a spout coupled to the base and selectively fluidly coupled to the fluid inlet. The base defines a fluid inlet. The emergency wash arm includes an emergency wash unit having an aperture positioned to dispense fluid away from the sink. The valve assembly is configured to prevent or substantially prevent fluid from being dispensed from the spout in response to movement of the emergency wash arm.

This summary is illustrative only and is not intended to be in any way limiting. Other aspects, inventive features, and advantages of the devices and/or processes described herein, as defined solely by the claims, will become apparent in the detailed description set forth herein, taken in conjunction with the accompanying figures, wherein like reference numerals refer to like elements.

DETAILED DESCRIPTION

Figure 1:
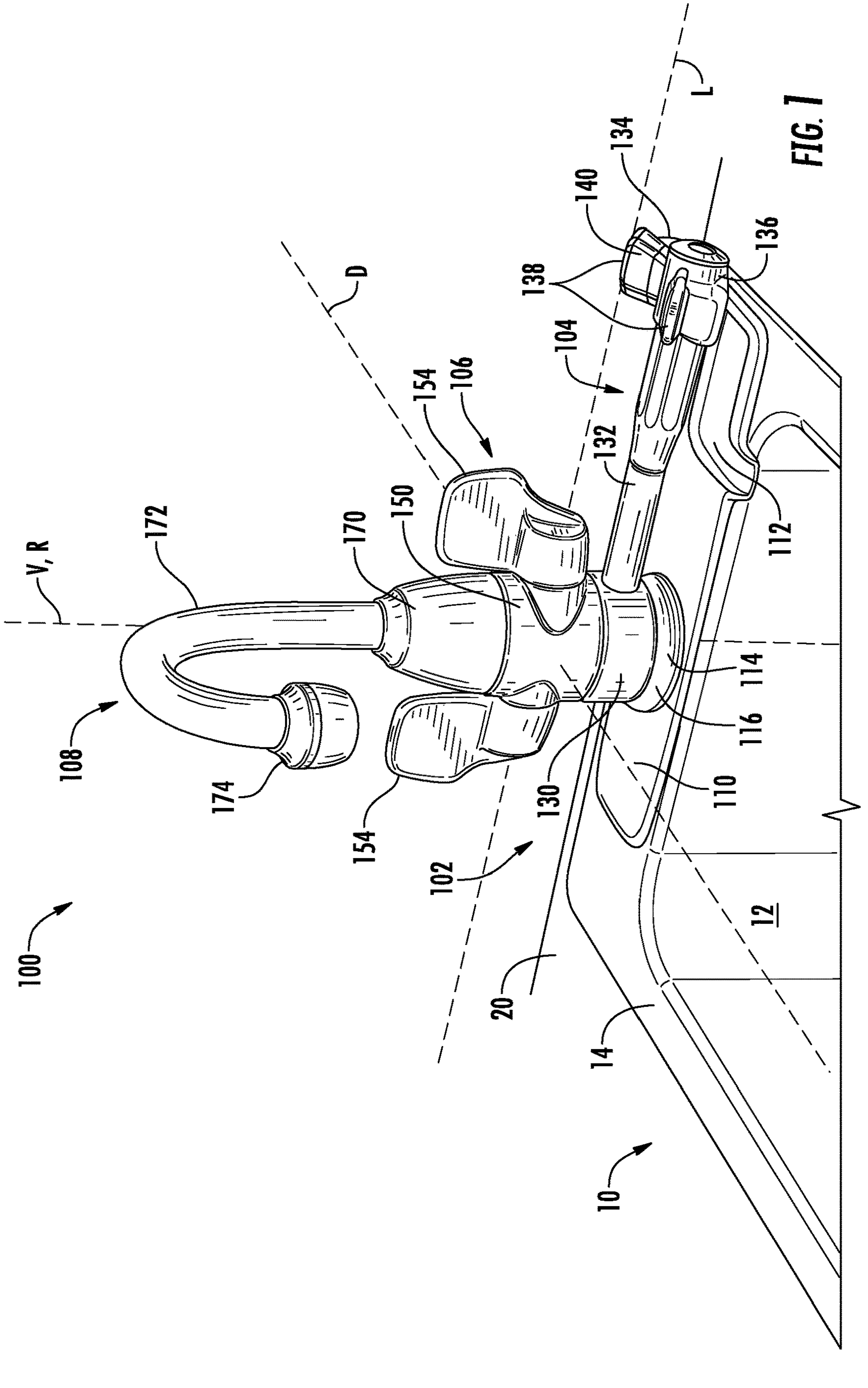
FIG. 1 is a perspective view of a combination eyewash and faucet unit, according to an exemplary embodiment.

Before turning to the figures, which illustrate the exemplary embodiments in detail, it should be understood that the present disclosure is not limited to the details or methodology set forth in the description or illustrated in the figures. It should also be understood that the terminology used herein is for the purpose of description only and should not be regarded as limiting.

As used herein, the term “emergency wash unit” means an eyewash, a facewash, or a combination eyewash/facewash. Therefore and although certain embodiments presented herein are described as including an eyewash that directs streams of water towards the eyes of a person, it should be understood that the eyewash may be replaced with a facewash or a combination eyewash/facewash that directs water to a larger area of the face that may also include the eyes.

As used herein, the term “overlap” means that the cross sectional areas of two apertures extend over one another, permitting fluid to travel through both apertures. The term “overlap” includes both partially overlapping, where only a portion of the area one aperture extends over the other, and completely overlapping, where the entire area of one aperture extends over the other aperture.

Referring to the Figures generally, various embodiments disclosed herein relate to a combination emergency wash and faucet unit, system, or fixture. According to the present disclosure, the fixture includes both an emergency wash unit and a faucet. The faucet is configured to dispense water for routine washing or filling tasks, such as washing one’s hands or filling a container with water. Water dispensed from the faucet may have a variable temperature or flow rate controlled by a user. The emergency wash unit is configured to be activated in an emergency to spray water towards a person to wash a substance from their eyes or face. Water dispensed from the emergency wash unit is lukewarm or tepid (e.g., between 60° F. and 100° F.) and directed in a controlled stream towards the eyes or face of a person. The emergency wash unit and the faucet are configured to be used alternately such that the emergency wash unit and the faucet are not activated at the same time.

The fixture includes a faucet including a spout and an emergency wash arm including the emergency wash unit. The emergency wash arm and the spout are pivotally coupled to a base. The base is fixed relative to a sink. When using the faucet, the spout is rotated to an active position over the sink, and the emergency wash arm is rotated to a stored or stowed position away from the sink. With the spout in the active position, water flow out of the spout is regulated by the user (e.g., by interacting with one or move valves, by moving their hand in front of a sensor, etc.). To use the emergency wash unit, the user applies a force to rotate or otherwise move the emergency wash arm to an active position over the sink. Rotation of the emergency wash arm from the stored position to the active position causes the spout to move or rotate to a stored position away from the sink. In some embodiments, the fixture includes a slip clutch or another such mechanism to transfer torque from the emergency wash arm to the spout, while facilitating rotation of the emergency wash arm independent of the spout if the spout encounters an obstacle. In other embodiments, the fixture includes stops that engage one another to couple the emergency wash arm and the spout in certain positions of the emergency wash arm relative to the spout. The fixture additionally includes a valve that prevents water flow through the spout and a valve that activates water flow through the emergency wash unit when the emergency wash arm is rotated to the active position. In some embodiments, rotation of the emergency wash arm back to the stored position rotates the spout towards the active position. In other embodiments, the emergency wash arm moves independent of the spout. With the emergency wash arm in the stored position, the valves allow water flow through the spout and prevent water flow out of the emergency wash unit.

The present disclosure includes a number of different embodiments, each with a different arrangement and movement path of the emergency wash arm. According to a first embodiment, the emergency wash arm rotates relative to the base about a vertical axis through a horizontal plane. In this embodiment, the emergency wash arm is oriented substantially horizontally in both the active and stored positions, with an approximately 90-degree offset between the two positions. In the stored position, the emergency wash arm extends along a rear wall of the sink. According to another embodiment, the emergency wash arm rotates about an oblique axis. In the stored position, the emergency wash arm is approximately vertical. In the active position, the emergency wash arm is approximately horizontal and extends over the sink. When moving between the stored and active positions, the emergency wash arm swings along the side of the faucet. According to yet another embodiment, the emergency wash arm rotates about a substantially horizontal, laterally-extending axis. In the stored position, the emergency wash arm is oriented approximately vertically, with an approximately 90-degree offset between the two positions.

Thus, the faucet and emergency wash unit move in sync with one another in a contemporaneous or near contemporaneous fashion (i.e., movement of one causes movement of the other and vice versa). Such contemporaneous movement can occur in all configurations or only when certain conditions are met (e.g., when the emergency wash arm is in a certain position relative to the spout). Beneficially, such an arrangement provides an easy-to-use faucet and emergency wash unit without one getting in the way or blocking the ease of use of the other. This improves an ease of use compared to conventional systems, may improve space occupancy parameters (e.g., not occupy as much space as other conventional systems), and generally be more appealing compared to other alternatives. Further and in one embodiment, to prevent accidental discharges, the control of fluid from the faucet and emergency wash unit is conditioned on the emergency wash unit being positioned in the active position (i.e., when the emergency wash unit is in the active position, fluid flow from the emergency wash unit is possible but when the emergency wash unit is in the stored position, fluid flow from the emergency wash unit is blocked). Such a system is beneficial to alleviate accidental discharges. Of course, in other embodiments, one or both units may always be active (i.e., capable of providing fluid) regardless of whether the unit is in the active or stored position (or another intermediate position). These and other features and benefits are described more fully herein below.

Referring now to FIG. 1, a combination emergency wash and faucet unit or combination emergency wash and faucet system, shown as fixture 100, is depicted according to an exemplary embodiment. The fixture 100 is shown coupled to a basin or sink 10, which is supported by a support structure 20. The fixture 100 includes a base 102 coupled to the sink 10, an emergency wash arm, shown as eyewash arm 104, pivotally coupled to base 102, a midsection 106 fixedly coupled to the base 102, and a faucet or spout section 108 pivotally coupled to the midsection 106. The fixture 100 is configured such that fluid (e.g., water) flows in through the base 102 and out through eyewash arm 104 or the spout section 108.

Referring to FIG. 1, the sink 10 is a basin configured to collect and/or drain fluid dispensed from the fixture 100. The sink 10 includes a depression 12 configured to contain fluid and a drain disposed near the bottom of the depression 12 and configured to selectively drain fluid from the depression 12. In some embodiments, a flange 14 at least partially surrounds the depression 12, extending from an upper surface of the sink 10. The sink 10 is supported by the support structure 20. In some embodiments, the support structure 20 defines an aperture through which the sink 10 extends. In some such embodiments, the flange 14 rests on an upper surface of the support structure 20. In other embodiments, the sink 10 rests entirely atop the support structure 20. The sink 10 may be a laboratory sink, a kitchen sink, a bathroom sink, or any other type of sink. The support structure 20 may be a structure having a flat surface (e.g., a countertop, a desk, etc.) or another type of structure. The sink 10 and/or the support structure 20 may define one or more apertures through which hoses, pipes, wires, or other elements pass to connect to the fixture 100.

Referring to FIG. 1, the base 102 is fixedly coupled to the sink 10. As shown in FIG. 1, the base 102 rests atop the flange 14. In other embodiments, the base 102 rests directly atop the support structure 20. In yet other embodiments, the base 102 is coupled to another surface, such as a projection from a wall adjacent the support structure 20, but is still fixed relative to the sink 10. The base 102 supports the rest of the fixture 100, and hoses, pipes, wires, or other elements pass through the base 102 to connect to other components of the fixture 100. As shown in FIG. 1, the base 102 includes a plate 110 that extends along a portion of the flange 14. The plate 110 includes a recessed portion, shown as drip tray 112, extending along a portion of the length of the plate 110. The drip tray 112 is disposed underneath a weep hole 142 of the eyewash arm 104 such that fluid that may drip from the weep hole 142 is caught by drip tray 112. A portion of the plate 110 extends out over the depression 12 of the sink 10, and the walls of the drip tray 112 shorten near this portion to facilitate drainage of fluid out of the drip tray 112 and into the sink 10. In some embodiments, the surface of the drip tray 112 is angled downward toward the sink 10 to further facilitate drainage. A stock 114 including a first portion 116 extends upward from the plate 110. The first portion 116 of the stock 114 extends between the plate 110 and the collar 130 of the eyewash arm 104. In some embodiments, the stock 114 includes a second portion that extends upward through the eyewash arm 104 and into the midsection 106.

Referring again to FIG. 1, the eyewash arm 104 includes a collar 130, an extension portion 132, and an emergency wash unit, shown as eyewash 134. The collar 130 is configured to rotate about a vertical axis R of rotation such that the eyewash arm 104 moves through a substantially horizontal plane. In some embodiments, the axis R is the vertical axis V. In other embodiments, the axis R is offset from the vertical axis V. In some embodiments, the collar 130 is rotatably coupled to the second portion of the stock 114. In other embodiments, a portion of the midsection 106 extends downward through the collar 130 to meet the stock 114, and the collar 130 is rotatably coupled to the midsection 106. The collar 130 may include an inner surface that acts as a bushing or bearing, riding on an exterior surface of the stock 114 or the midsection 106. The extension portion 132 extends outwards from the collar 130. The extension portion 132 may extend along a longitudinal axis that intersects the axis R of rotation of the collar 130. In other embodiments, the extension portion 132 is curved or otherwise shaped. The eyewash 134 is coupled to an end of the extension portion 132 opposite the collar 130. The eyewash arm 104 rotates from a stowed, stored, or otherwise nonuse position, shown in FIGS. 1 and 2, where the eyewash 134 is disposed over the drip tray 112, to an active position (or in-use position), shown in FIG. 3, where the eyewash 134 is disposed over the sink 10. In some embodiments, the stored position is offset approximately 90 degrees from the active position. The eyewash arm 104 may be parallel to the axis D in the active position and parallel to the axis L in the stored position. In use, a user can apply a force on the extension portion 132 or on the eyewash 134 to move the eyewash arm 104 between the stored position and the active position.

The eyewash 134 is configured to dispense tepid water into the eyes and/or face of a user. The eyewash 134 includes a body 136 defining a pair of outlets, shown as nozzles 138, that each direct a spray of water upwards and inwards to where the eyes of a person using the eyewash 134 would be located. The nozzles 138 may be configured to adjust the spray of water (e.g., the velocity of the spray, an aeration amount of the spray, a size or flow rate of the spray, etc.) to conditions optimal for cleaning out the eyes of a person without causing damage to the eyes. By way of example, the nozzles 138 may be of a certain diameter or may include a screen defining a series of apertures, through which the water flows to filter such water. In some embodiments, each nozzle 138 includes a series of smaller apertures that direct a number of individual sprays. In some embodiments, the eyewash 134 includes a pair of covers 140 that cover the nozzles 138 when the eyewash 134 is not in use. The covers 140 may be pivotally coupled to the body 136 such that the covers 140 rotate away from the spray when the eyewash 134 is in use. The covers 140 prevent dust or other debris from settling in the nozzles 138 over time. In some embodiments, the body 136 defines a weep hole 142 that facilitates a gradual drainage of any water trapped in the eyewash arm 104. The weep hole 142 prevents stagnation of water in the eyewash arm 104 when the eyewash 134 is not used for an extended period of time. The eyewash 134 may include valves or other flow regulation components to prevent rapid drainage of water out of the weep hole 142 (e.g., when the eyewash arm 104 is pressurized). The weep hole 142 is positioned such that it drains into the drip tray 112 when the eyewash arm 104 is in the stored position.

Figure 4B:
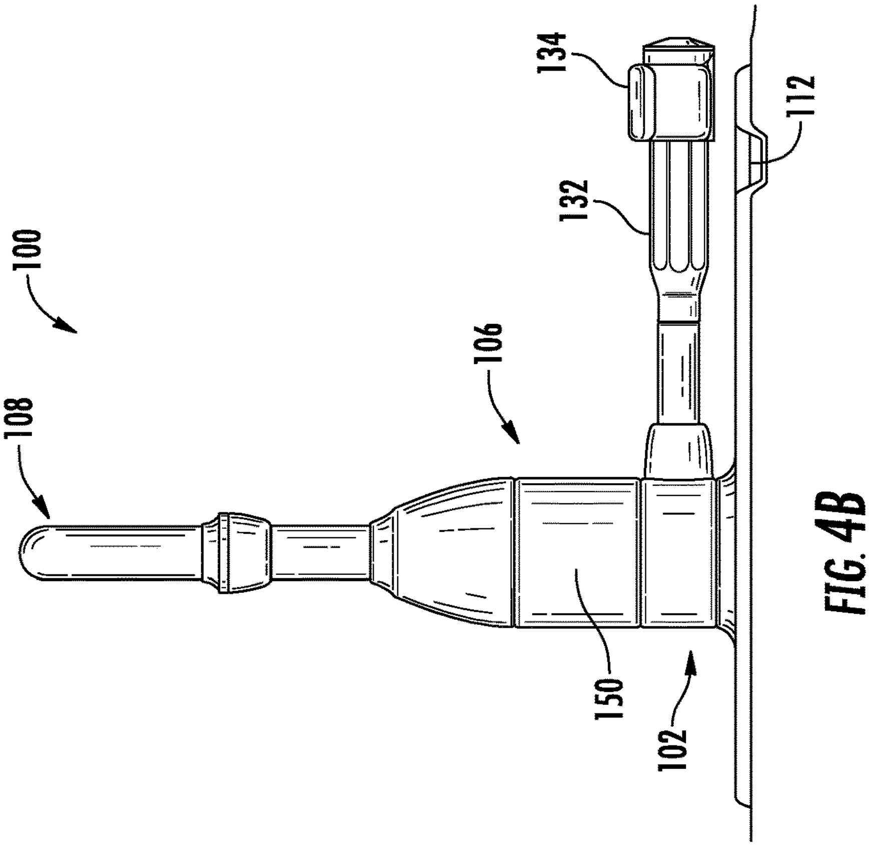
FIGS. 4A and 4B are front views of a combination eyewash and faucet unit, according to various exemplary embodiments.
Figure 4A:
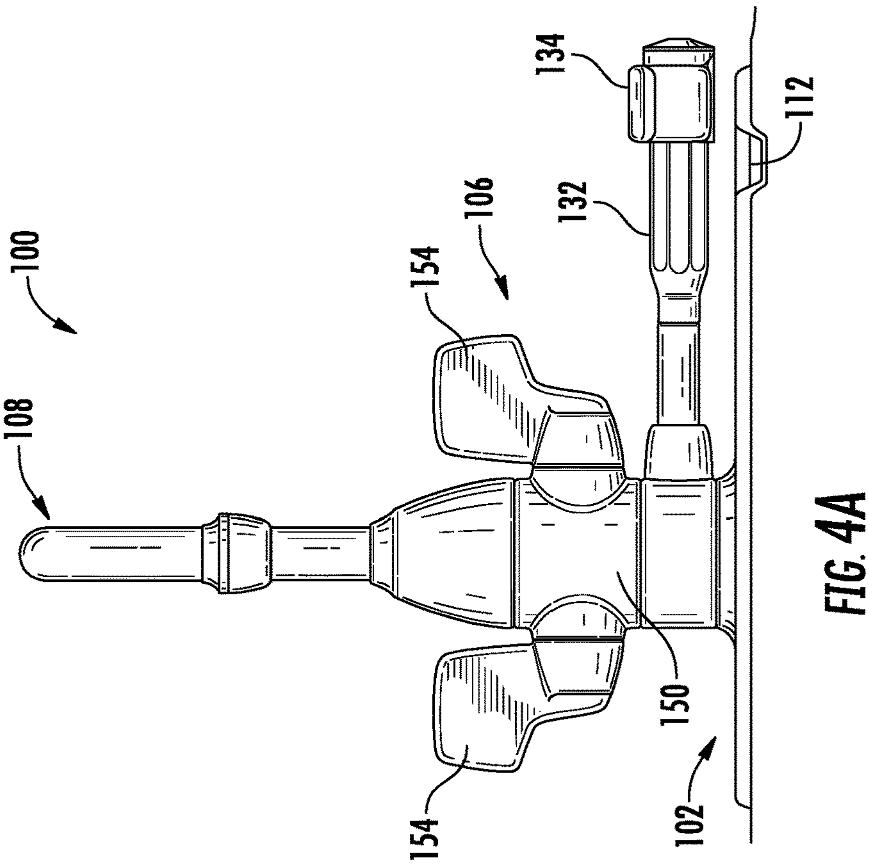

The midsection 106 includes a body 150 disposed between the collar 130 and the spout section 108. The body 150 is fixedly coupled to the base 102 such that the body 150 is rotationally fixed relative to the sink 10. The body 150 may connect directly to the base 102, or the midsection 106 may include another section extending through the collar 130 to the base 102. In some embodiments, the body 150 is coupled to one or more valve interfaces, shown as handles 154. The handles 154 are configured such that a user can rotate or otherwise move the handles 154 to control the flow rate and/or temperature of the water flowing through the spout section 108 by manipulating one or more valves contained within the body 150. By way of a first example, the midsection 106 may include two handles 154: one configured to control the flow rate of hot water, and one configured to control the flow rate of cold water, as shown in FIG. 4A. By way of another example, the midsection 106 may include one handle 154 configured to control the temperature and the flow rate of water flowing through the spout section 108. By way of yet another example, the midsection 106 may include no handles 154, as shown in FIG. 4B, and the flow rate and/or temperature of the water flowing through the spout section 108 is otherwise controlled (e.g., using an infrared movement sensor, using a capacitive touch sensor, etc.). In some embodiments, the temperature of the water flowing through the spout section 108 is preset. In some embodiments, the flow rate of the water flowing through the spout section 108 is preset, and the user activates or deactivates the flow.

Figure 2:
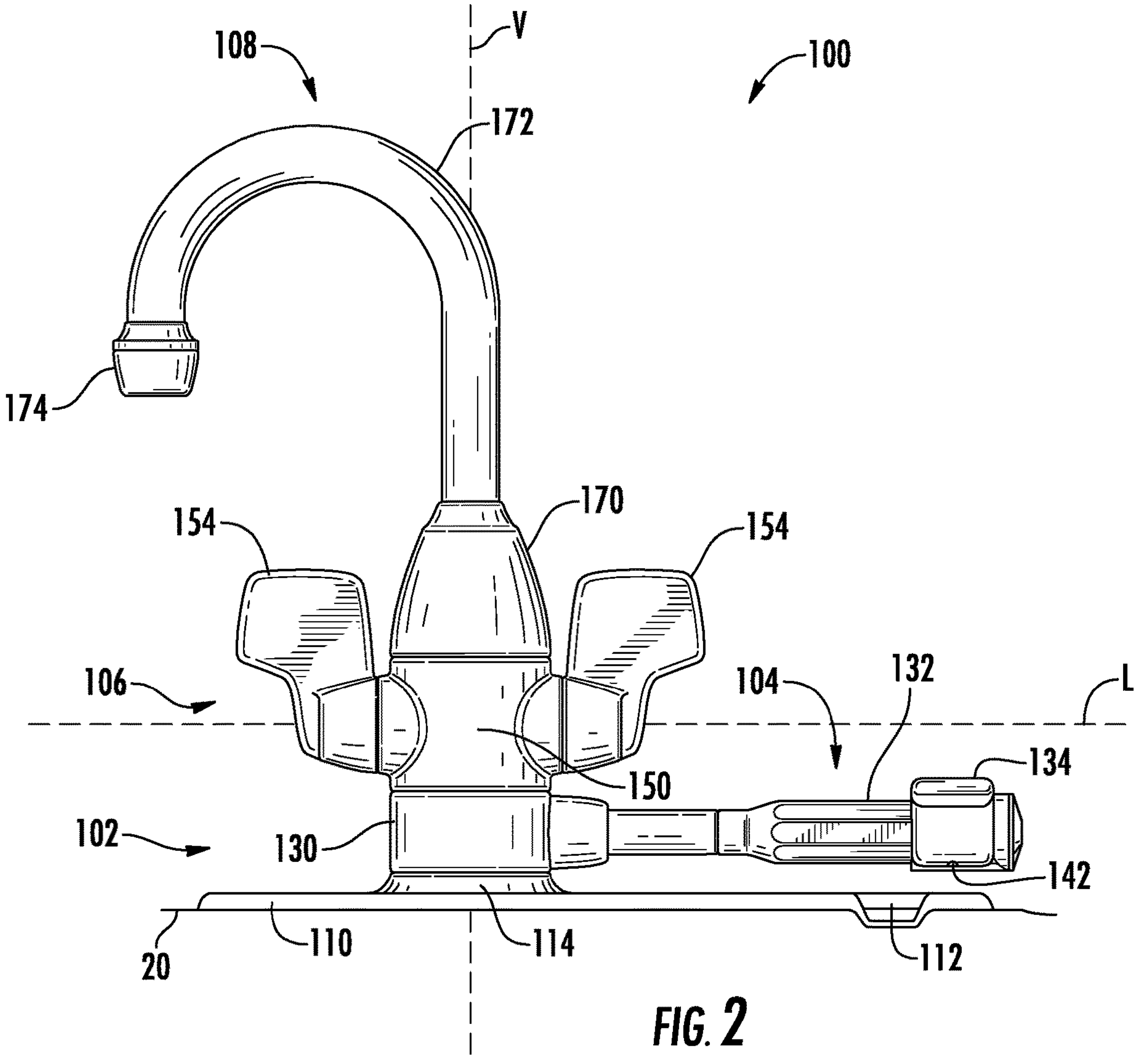
FIG. 2 is a front view of the combination eyewash and faucet unit of FIG. 1.
Figure 3:
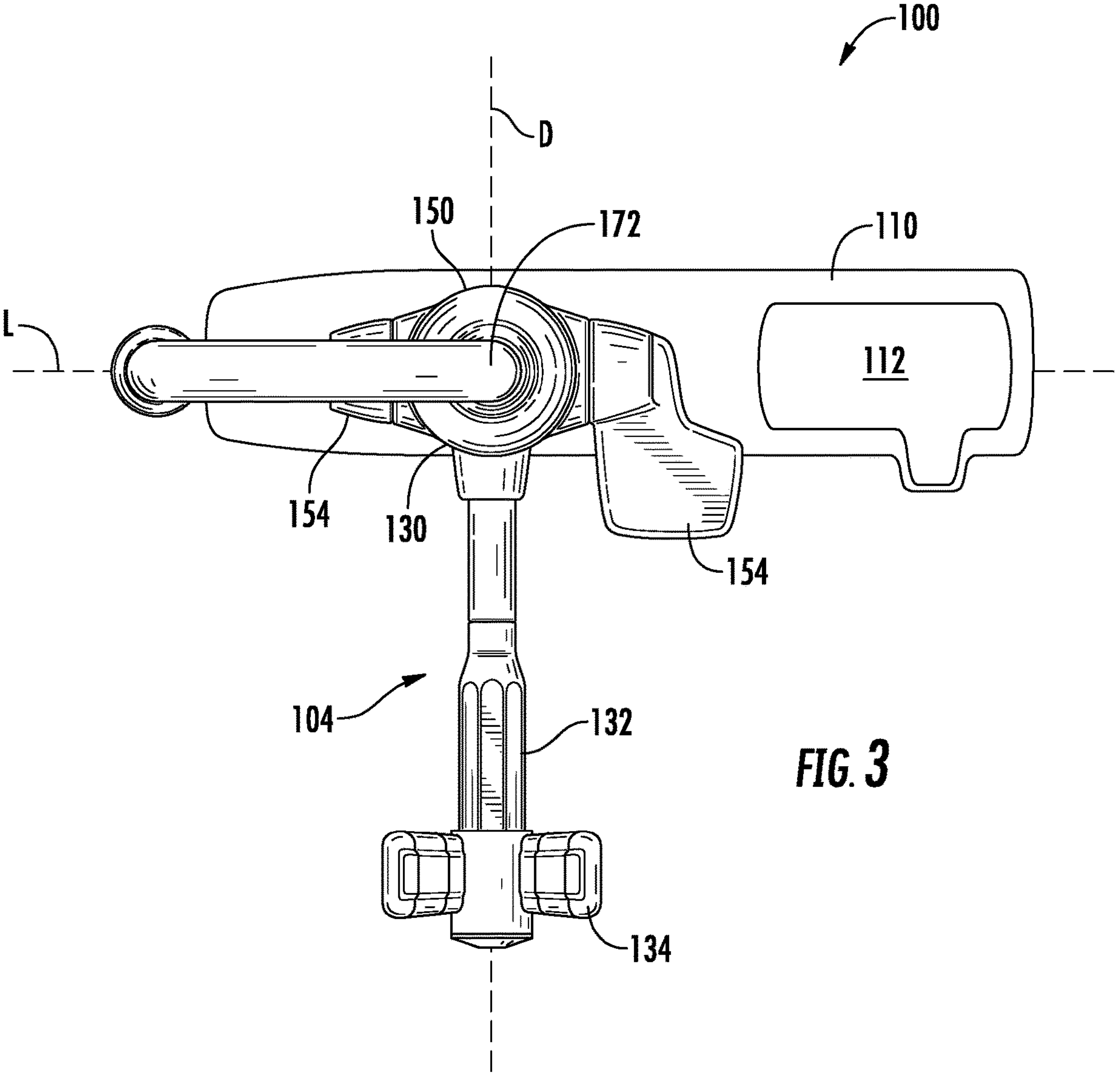
FIG. 3 is a top view of the combination eyewash and faucet unit of FIG. 1.

Referring to FIG. 1, the spout section 108 includes a body, shown as adaptor 170, an extension, shown as spout 172, and an outlet, shown as nozzle 174. The spout 172 and the nozzle 174 are configured to rotate relative to the body 150 of the midsection 106 about the vertical axis V. The spout 172 rotates between an active position, where the nozzle is disposed above the sink 10, and a stored position, where the spout 172 is rotated away from the sink 10. The active positon is shown in FIG. 2, and the stored position is shown in FIG. 1. In some embodiments, the active position is offset approximately 90 degrees from the stored position. The adaptor 170 may rotate with the spout 172 or may be fixed to the body 150. In some embodiments, the spout 172 is coupled to the body 150 with a bearing, bushing, or other similar device to facilitate supported rotation of the spout 172. The spout 172 may rotate freely a full 360 degrees, or may include hard stops to prevent rotation past a certain point. The adaptor 170 transitions between the diameter of the body 150 and the diameter of the spout 172 and may provide additional structural support for the spout 172. The spout 172 directs water to flow from the midsection 106 to the nozzle 174. Although the spout 172 is shown as a gooseneck-type extension, the spout 172 may be any type of extension having any shape (e.g., an extending neck with a flexible hose and a handheld end portion, a double-jointed neck, a neck that extends straight outward, etc.) and any size. Thus, those of ordinary skill in the art will readily recognize and appreciate the high configurability of the shape and size of the spout as well as other components, such as the handles. The nozzle 174 is configured to direct and otherwise control the stream of water exiting the spout 172. The nozzle 174 may be configured to adjust the spray of water (e.g., a velocity of the spray, a spray pattern, an aeration amount of the spray, a size or flow rate of the spray, etc.) depending on the use conditions of the fixture 100. The nozzle 174 may include an aerator (e.g., a screen through which the water passes), a flow restrictor, or other flow control components. In some embodiments, the nozzle 174 is coupled to a flexible hose to facilitate movement and aiming of the nozzle 174 by hand. The nozzle 174 may include adapters to interface with other components. By way of example, the nozzle 174 may include a hose barb or threaded portion with which to couple a hose.

Figure 5:
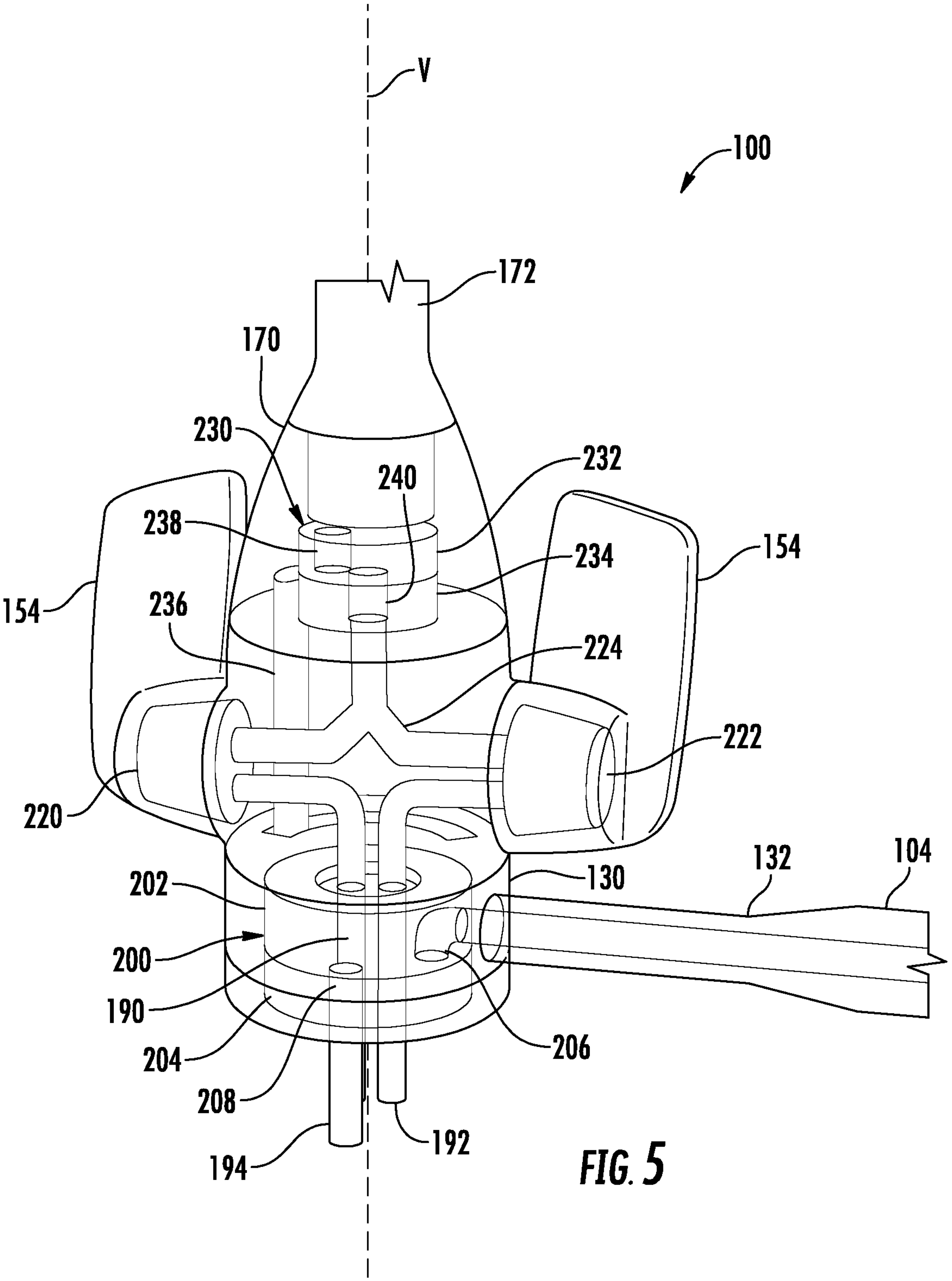
FIG. 5 is a schematic view of the combination eyewash and faucet unit of FIG. 1 including a number of valves, according to an exemplary embodiment.

Referring to FIG. 5, the flow paths of water through the fixture 100 are depicted according to an exemplary embodiment. Water flows into the fixture 100 from a hot water source, shown as hot water line 190, from a cold water source, shown as cold water line 192, and from a tepid water source, shown as tepid water line 194. The hot water line 190 and the cold water line 192 supply hot water and cold water, respectively, at temperatures conventionally used with standard faucets. The tepid water line 194 supplies lukewarm or tepid water (e.g., water between 60° F. and 100° F.). The water in the hot water line 190, the cold water line 192, and the tepid water line 194 is pressurized by one or more outside sources (e.g., water pumps, inflated bladders, a storage tank placed vertically above the fixture 100, etc.). The water in the hot water line 190, the cold water line 192, or the tepid water line 194 may be filtered or otherwise treated depending on the application. The hot water line 190, the cold water line 192, and the tepid water line 194 pass into the fixture 100 through the base 102. Accordingly, the sink 10 or the support structure 20 may define one or more apertures through which the lines pass. The lines may be any type of hose or pipe (e.g., copper piping, PVC pipe, flexible polyethylene tubing, etc.).

Referring to FIG. 5, the tepid water line 194 supplies tepid water to the eyewash arm 104 through a valve, shown as puck valve 200. The puck valve 200 may be ceramic or made from another material. The puck valve 200 includes a top portion 202 and a bottom portion 204. The top portion 202 is fluidly coupled to the eyewash arm 104 at an aperture, shown as outlet interface 206, and the bottom portion 204 is fluidly coupled to the tepid water line 194 at an aperture, shown as inlet interface 208. The top portion 202 and the bottom portion 204 are pivotally coupled to one another such that they rotate relative to one another about a vertical axis. The top portion 202 is coupled to and rotates with the collar 130. The bottom portion 204 is fixedly coupled to the base 102 and, accordingly, is stationary. When the eyewash arm 104 is in the stored position, the outlet interface 206 and the inlet interface 208 do not overlap one another, preventing the flow of water through the puck valve 200. When the eyewash arm 104 is in the active position, the outlet interface 206 and the inlet interface 208 overlap one another, and water flows from the tepid water line 194, through the puck valve 200, the collar 130, and the extension portion 132, and out through the eyewash 134. The shape and/or size of the outlet interface 206 and the inlet interface 208 may be modified to adjust the flow rate of water into the eyewash arm 104 between the stored position and the active position. By way of example, the inlet interface 208 may include a slot of uniform width extending circumferentially along the bottom portion 204. In such an example, the length of the slot may be varied to adjust the range of angular positions of the eyewash arm 104 in which water will flow through the puck valve 200.

Referring to FIG. 5, the puck valve 200 is annular shaped, and defines an aperture through its center. The hot water line 190 and the cold water line 192 pass through the aperture. The hot water line 190 interfaces with a hot water valve 220, and the cold water line 192 interfaces with a cold water valve 222. The hot water valve 220 and the cold water valve 222 may be any type of valve (e.g., compression valves, ball valves, cartridge valves, disk valves, solenoid valves, etc.). A shown in FIG. 5, the hot water valve 220 is coupled to and controlled by a handle 154, and the cold water valve 222 is coupled to and controlled by another handle 154. A user can rotate the handle 154 coupled to the hot water valve 220 to adjust the flow rate of hot water toward the spout 172, and a user can rotate the handle 154 coupled to the cold water valve 222 to adjust the flow rate of cold water toward the spout 172. An outlet of the hot water valve 220 and an outlet of the cold water valve 222 are coupled to a uniter 224, in which the hot water and the cold water mix.

An outlet of the uniter 224 is fluidly coupled to a valve, shown as puck valve 230. The puck valve 200 and the puck valve 230 may both be part of a valve assembly. The puck valve 230 may be ceramic or made from another material. The puck valve 230 includes a top portion 232 and a bottom portion 234 configured to rotate relative to one another about a vertical axis. The bottom portion 234 is fixed relative to the body 150. The top portion 232 is rotationally coupled to the spout 172. The puck valve 230 is configured such that mixed water flows through the puck valve 230 and out through the spout 172. The top portion 232 includes an aperture, shown as outlet interface 238, fluidly coupled to the spout 172, and the bottom portion 234 includes an aperture, shown as inlet interface 240, fluidly coupled to the uniter 224. When the spout 172 is in the stored position, the outlet interface 238 and the inlet interface 240 do not overlap one another, preventing the flow of water through the spout 172. When the spout 172 is in the active position, the outlet interface 238 and the inlet interface 240 overlap one another, and mixed water flows through the spout 172 and out through the nozzle 174. The shape and/or size of the outlet interface 238 and the inlet interface 240 may be modified to adjust the flow rate of water into the spout 172 between the stored position and the active position. By way of example, the inlet interface 240 may include a slot of uniform width extending circumferentially along the bottom portion 234. In such an example, the length of the slot may be varied to adjust the range of angular positions of the spout 172 in which water will flow through the puck valve 230.

The spout 172 is rotationally coupled to the collar 130 by a connector, shown as link 236. In some embodiments, the link 236 connects directly to the spout 172. In other embodiments, the link 236 is connected to the adaptor 170, which is in turn connected to the spout 172. In some embodiments, a slip clutch rotationally couples the link 236 and the spout 172. By way of example, the slip clutch may be an O-ring disposed between the spout 172 and the adaptor 170. By way of another example, the slip clutch may be two pieces of brake material forced together such that friction between the two pieces causes them to move together. The slip clutch transmits torque from the link 236 to the spout 172 until the torque reaches a threshold level. When the torque reaches the threshold level, the slip clutch rotationally decouples the link 236 and the spout 172. The link 236 is configured such that the spout 172 is rotated toward the stored position when the eyewash arm 104 is rotated toward the active position. The link 236 is additionally configured such that the spout 172 is rotated toward the active positon when the eyewash arm 104 is rotated toward the stored position. In embodiments that include the slip clutch, the eyewash arm 104 can continue rotating if the spout 172 encounters an obstacle, as the clutch will slip.

Figure 6:
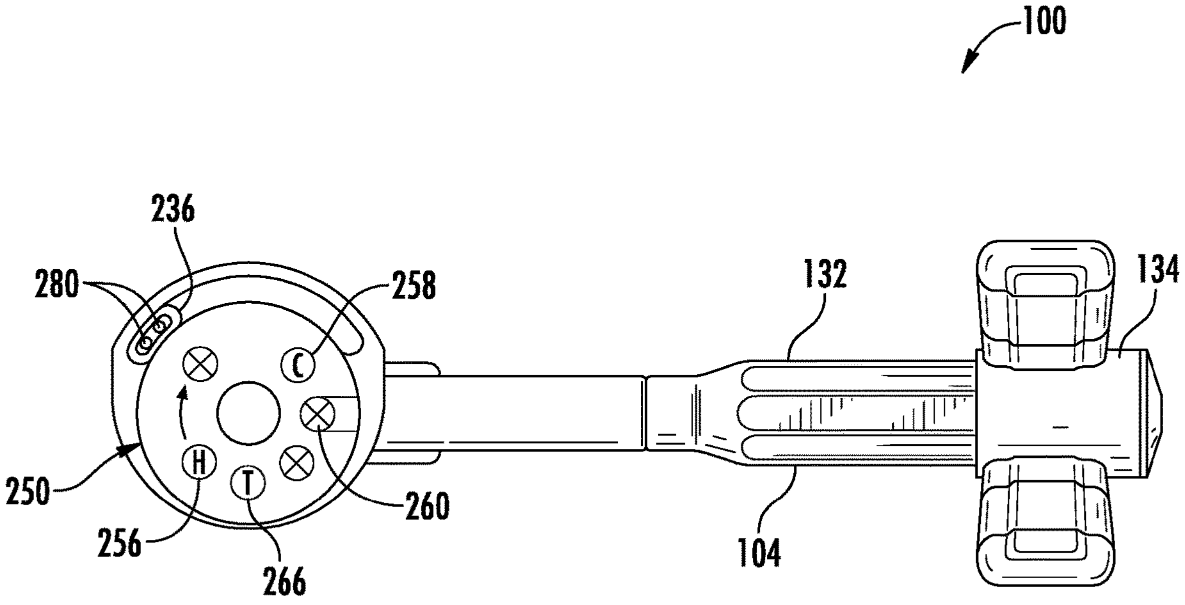
FIG. 6 is a schematic view of the combination eyewash and faucet unit of FIG. 1 including a valve, according to an exemplary embodiment.
Figure 8A:
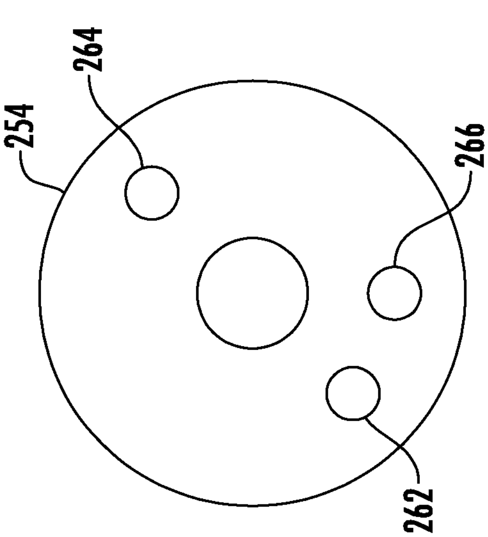
FIGS. 8A and 8B are various views of a bottom portion of the valve of FIG. 6.
Figure 8B:
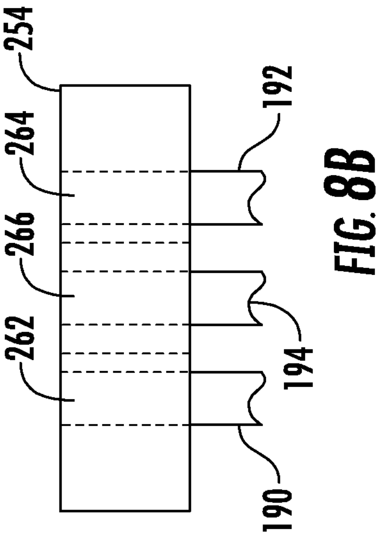
Figure 7A:
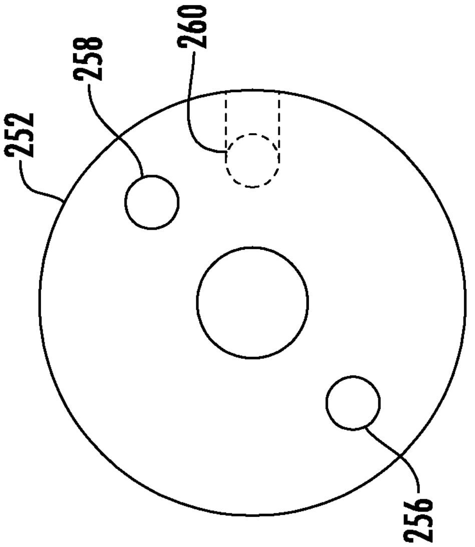
FIGS. 7A and 7B are various views of a top portion of the valve of FIG. 6.
Figure 7B:
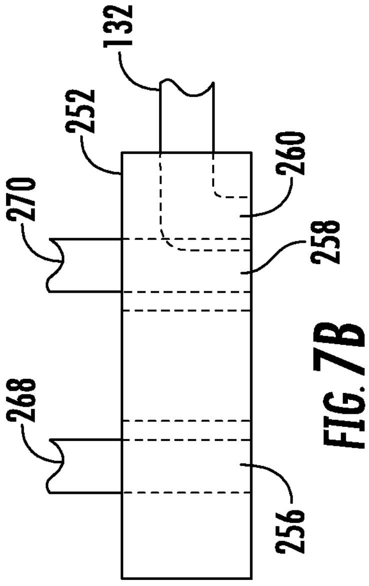

In some embodiments, the puck valve 200 is replaced with a valve assembly, shown in FIG. 6 as puck valve 250. The puck valve 250 may be made from ceramic or another material. In embodiments that incorporate the puck valve 250, the hot water line 190, the cold water line 192, and the tepid water line 194 are fluidly coupled to the puck valve 250. The puck valve 250 includes a top portion 252 rotatably coupled to a bottom portion 254. The top portion 252 is illustrated in FIGS. 7A and 7B, and the bottom portion 254 is illustrated in FIGS. 8A and 8B. The top portion 252 is rotationally fixed relative to the collar 130, and the bottom portion 254 is rotationally fixed relative to the base 102. The top portion 252 includes apertures shown as a hot water outlet 256, a cold water outlet 258, and a tepid water outlet 260. The bottom portion 254 includes apertures shown as a hot water inlet 262 coupled to the hot water line 190, a cold water inlet 264 coupled to the cold water line 192, and a tepid water inlet 266 coupled to the tepid water line 194. A line, shown as hot water bridge 268, connects the hot water valve 220 to the hot water outlet 256. A second line, shown as cold water bridge 270, connects the cold water valve 222 to the cold water outlet 258. The tepid water outlet 260 is fluidly coupled to the eyewash arm 104.

When the eyewash arm 104 is in the stored position, the hot water inlet 262 overlaps the hot water outlet 256, and the cold water inlet 264 overlaps the cold water outlet 258, facilitating the flow of hot and cold water to the corresponding valves. The tepid water inlet 266 does not overlap the tepid water outlet 260, preventing the flow of tepid water to the eyewash 134. When the eyewash arm 104 is rotated to the active position, the hot water inlet 262 no longer overlaps the hot water outlet 256, and the cold water inlet 264 no longer overlaps the cold water outlet 258, preventing the flows of hot and cold water. The tepid water inlet 266 overlaps the tepid water outlet 260, facilitating the flow of tepid water to the eyewash 134. The puck valve 250 facilitates automatic activation and deactivation of water flow through the eyewash 134 and the spout 172 as the eyewash arm 104 is rotated. In embodiments that incorporate the puck valve 250, the puck valve 230 may be omitted, and the uniter 224 may be directly connected to the spout 172.

In some embodiments, the fixture 100 includes electrical components. By way of example, the hot water valve 220 and/or the cold water valve 222 may be one or more solenoid valves that are electrically activated. The fixture 100 may include an infrared sensor that activates the flow through the spout 172 when motion is detected (e.g., when a user waves a hand in front of the sensor). The fixture 100 may include a capacitance sensor that detects a change in capacitance indicating a person contacting part of the fixture 100. The sensor may activate the flow through the spout 172 upon detection of human contact. As shown in FIG. 6, any wires 280 that extend through the fixture 100 may be routed through the link 236 to facilitate motion of the eyewash arm 104 without interference with the wires 280.

In some embodiments, the hot water line 190 and the cold water line 192 are replaced with a mixed water line that brings water into the fixture 100 at a preset temperature. In such embodiments, the hot water valve 220 and the cold water valve 222 may be replaced with a single valve that controls the flow of mixed water to the spout 172.

Figure 9A:
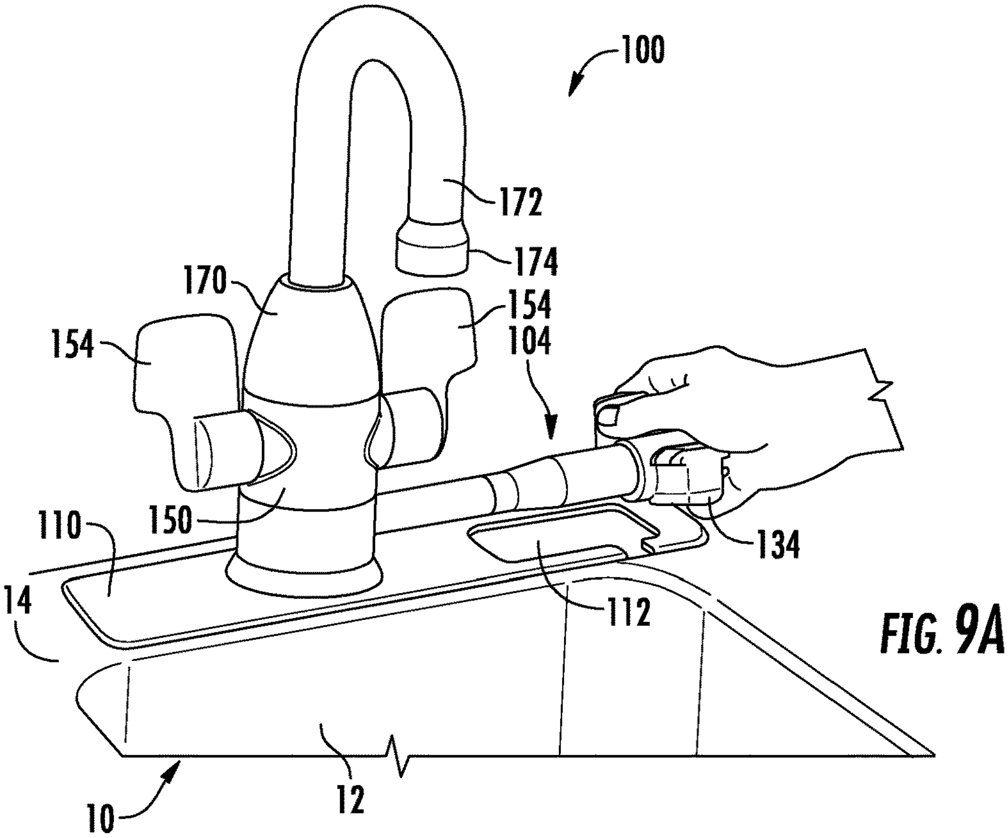
FIGS. 9A-9D illustrate a user interacting with the combination eyewash and faucet unit of FIG. 1.
Figure 9B:
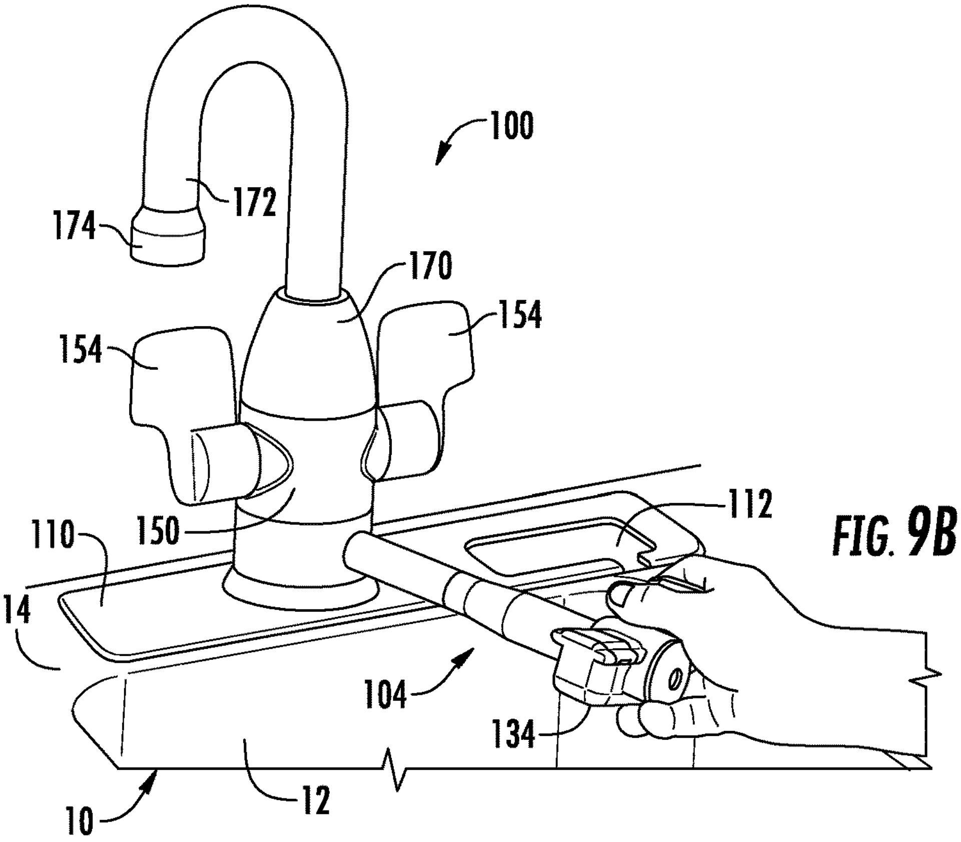
Figure 9C:
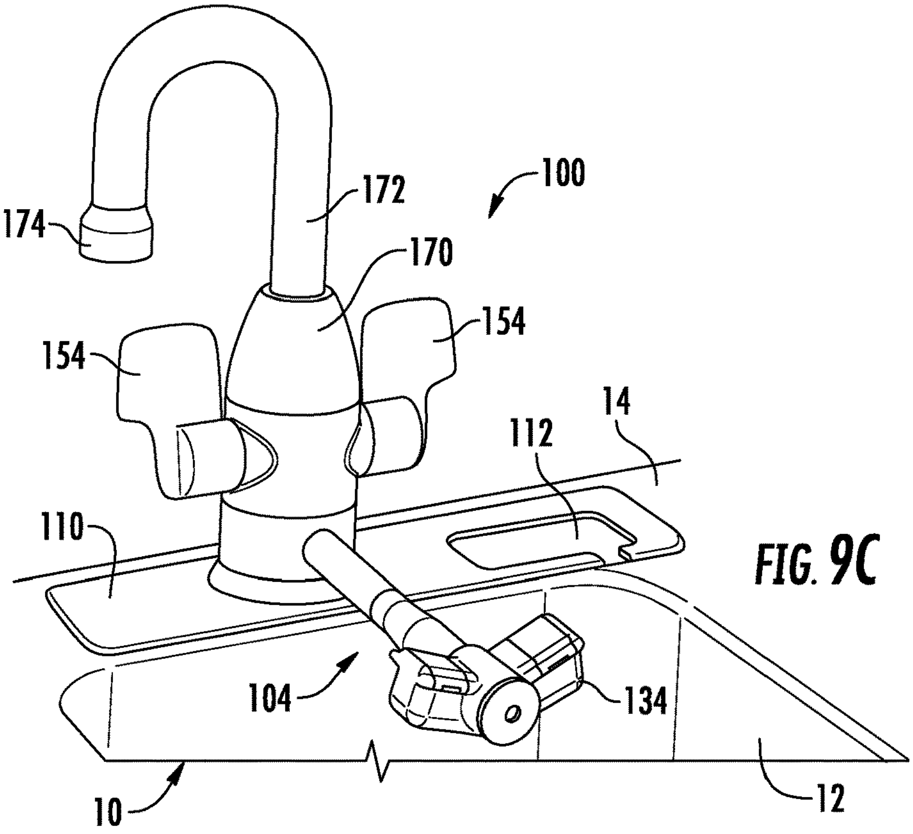
Figure 9D:
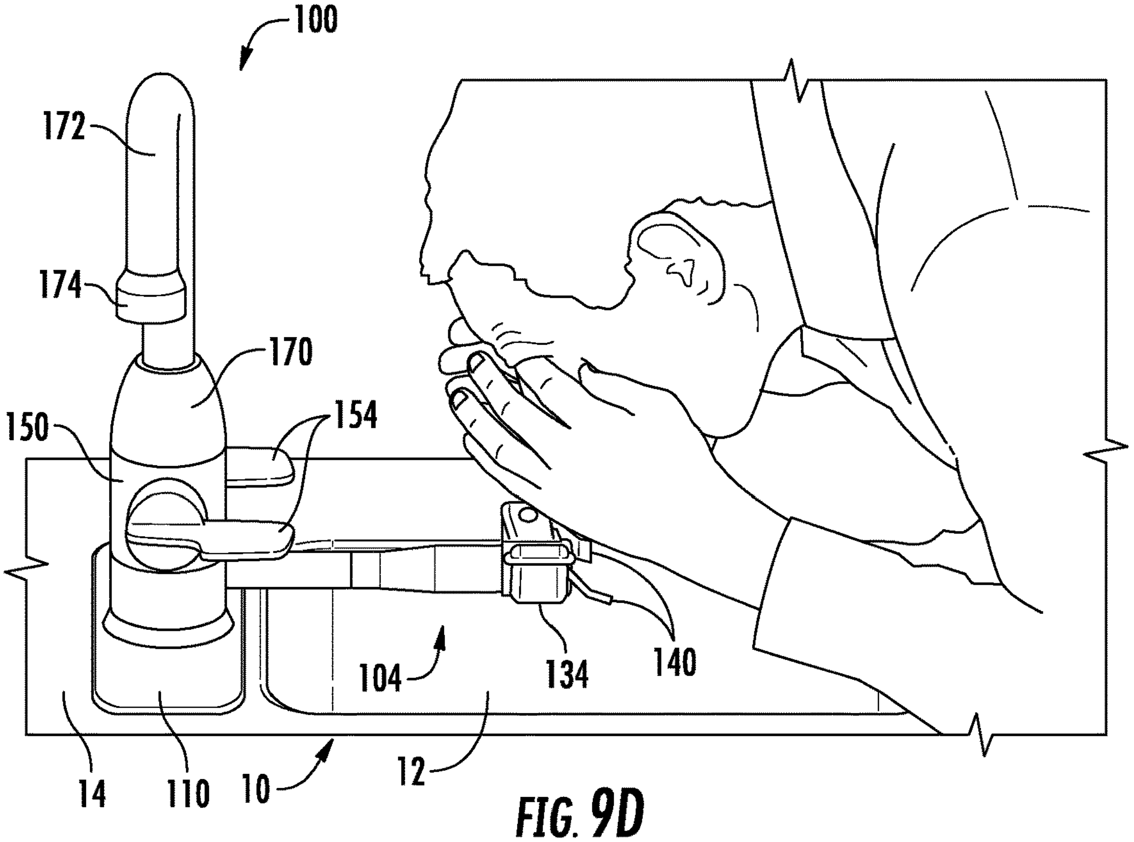

FIGS. 9A-9D illustrate a user interacting with the eyewash arm 104 to use the eyewash 134. FIGS. 9A-9C illustrate a user pulling the eyewash arm 104 into the active position. FIG. 9D illustrates a user using the eyewash 134. It should be noted that the spout 172 moves to the stored position to prevent interference between the user and the spout 172.

Figure 10:
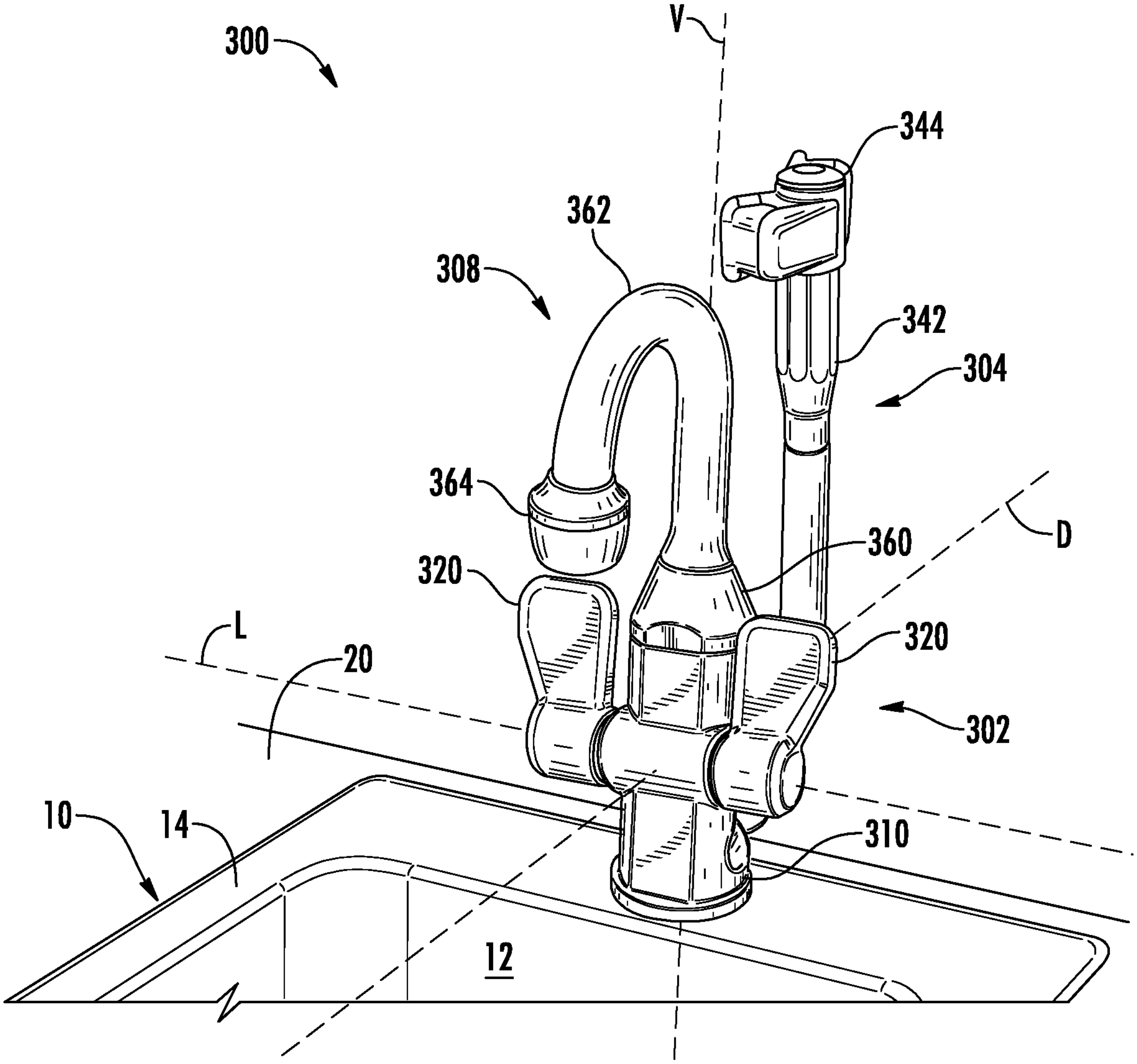
FIG. 10 is a perspective view of a combination eyewash and faucet unit, according to another exemplary embodiment.

Referring to FIG. 10, a combination emergency wash and faucet unit or combination emergency wash and faucet system, shown as fixture 300, is depicted according to an exemplary embodiment. The fixture 300 may be substantially similar to the fixture 100, except as otherwise specified. The fixture 300 is shown coupled to the sink 10, which is supported by the support structure 20. The fixture 300 includes a base 302 coupled to the sink 10, an emergency wash arm, shown as eyewash arm 304, pivotally coupled to base 302, and a faucet or spout section 308 pivotally coupled to the base 302. The fixture 300 is configured such that fluid (e.g., water) flows in through the base 302 and out through eyewash arm 304 or the spout section 308.

The base 302 is similar in function to a combination of the base 102 and the midsection 106, although the drip tray 112 and the stock 114 are omitted due to the placement of the eyewash arm 304. Referring to FIG. 10, the base 302 includes a body 310 that extends vertically from the sink 10. The base 302 is fixedly coupled to the sink 10. In some embodiments, the base 302 rests atop the support structure 20. In other embodiments, the base 302 rests atop the sink 10.

Figure 11A:
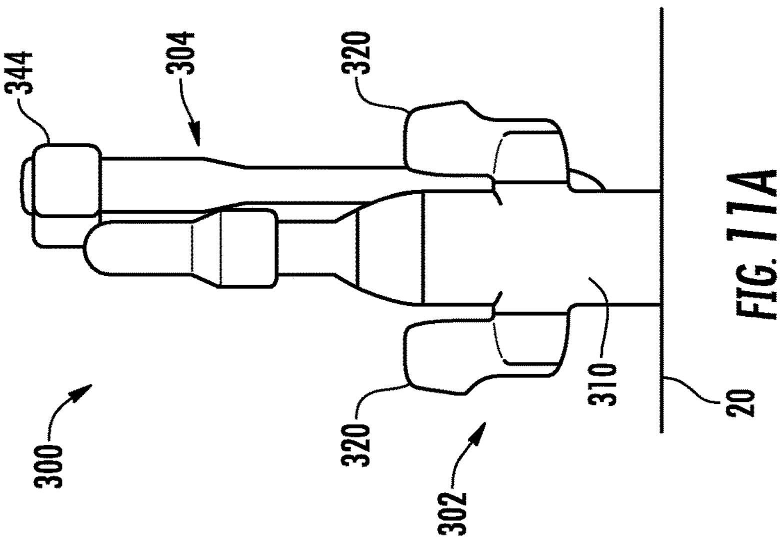
FIGS. 11A-11C are front views of a combination eyewash and faucet unit, according to various exemplary embodiments.
Figure 11B:
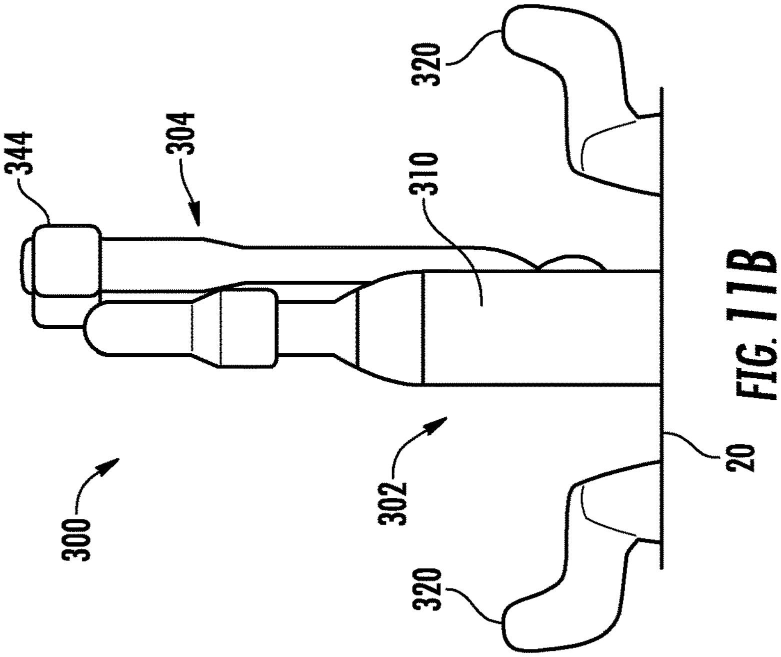
Figure 11C:
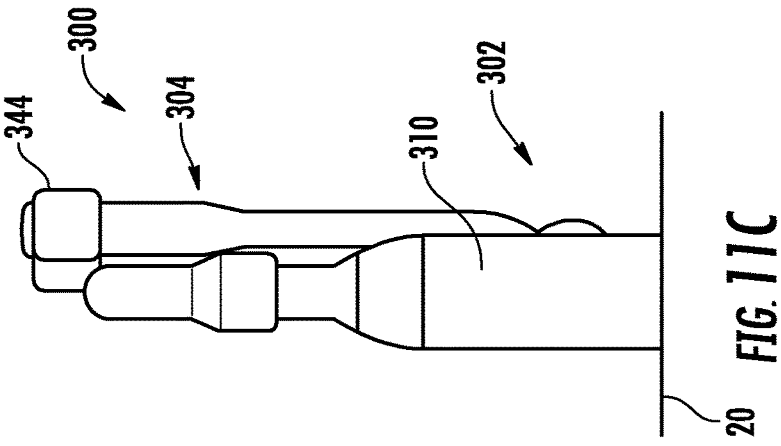

In some embodiments, the body 310 is coupled to one or more valve interfaces, shown as handles 320. The handles 320 are configured such that a user can rotate or otherwise move the handles 320 to control the flow rate and/or temperature of the water flowing through the spout section 308 by manipulating one or more valves. By way of a first example, the base 302 may include two handles 320 coupled to the body 310: one configured to control the flow rate of hot water, and one configured to control the flow rate of cold water, as shown in FIG. 11A. By way of another example, the fixture 300 may include two handles 320 similar to those shown in the embodiment of FIG. 11A, but the handles 320 and the corresponding valves may be coupled to the support structure 20 adjacent the body 310, as shown in FIG. 11B. By way of another example, the base 302 may include one handle 320 configured to control the temperature and the flow rate of water flowing through the spout section 308. By way of yet another example, the fixture 300 may include no handles 320, as shown in FIG. 11C, and the flow rate and/or temperature of the water flowing through the spout section 308 is otherwise controlled (e.g., using an infrared movement sensor, using a capacitive touch sensor, etc.). In some embodiments, the temperature of the water flowing through the spout section 308 is preset. In some embodiments, the flow rate of the water flowing through the spout section 308 is preset, and the user activates or deactivates the flow.

Referring to FIGS. 12A-13A, the body 310 defines an eyewash aperture 330 and a protrusion, shown as eyewash arm seat 332, extending therethrough. The eyewash arm 304 is pivotally coupled to the eyewash arm seat 332. The eyewash arm 304 includes a collar 340, an extension portion 342, and an emergency wash unit, shown as eyewash 344. The collar 340 extends over and is pivotally coupled to the eyewash arm seat 332. The collar 340 may include an inner surface that acts as a bushing, riding on an exterior surface of the eyewash arm seat 332. The extension portion 342 extends away from the collar 340. As shown in FIGS. 12A-13A, the extension portion 342 includes a first straight portion and a second straight portion that are angled relative to one another. This configuration may facilitate rotation of the eyewash arm 304 without interference with other components of the fixture 300. In other embodiments, the extension portion 342 is otherwise curved or shaped. The eyewash 344 is coupled to an end of the extension portion 342 opposite the collar 340. The eyewash 344 may be substantially similar to the eyewash 134. In some embodiments, the eyewash 344 is rotatable relative to the extension portion 342. In some embodiments, the eyewash arm 304 or the body 310 include a weep hole similar to the weep hole 142, but located near the bottom of the fixture 300 (e.g., on the collar 340). This placement facilitates drainage of the eyewash arm 304 while the eyewash arm 304 is in the storage position.

Figure 12B:
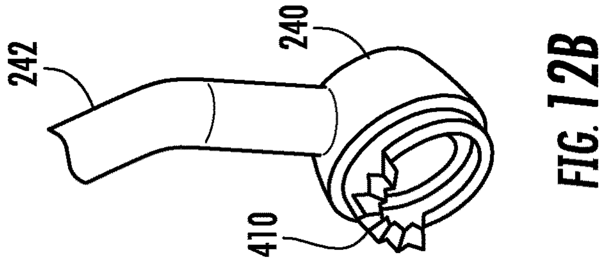
FIGS. 12A and 12B are exploded views of the combination eyewash and faucet unit of FIG. 10.
Figure 12A:
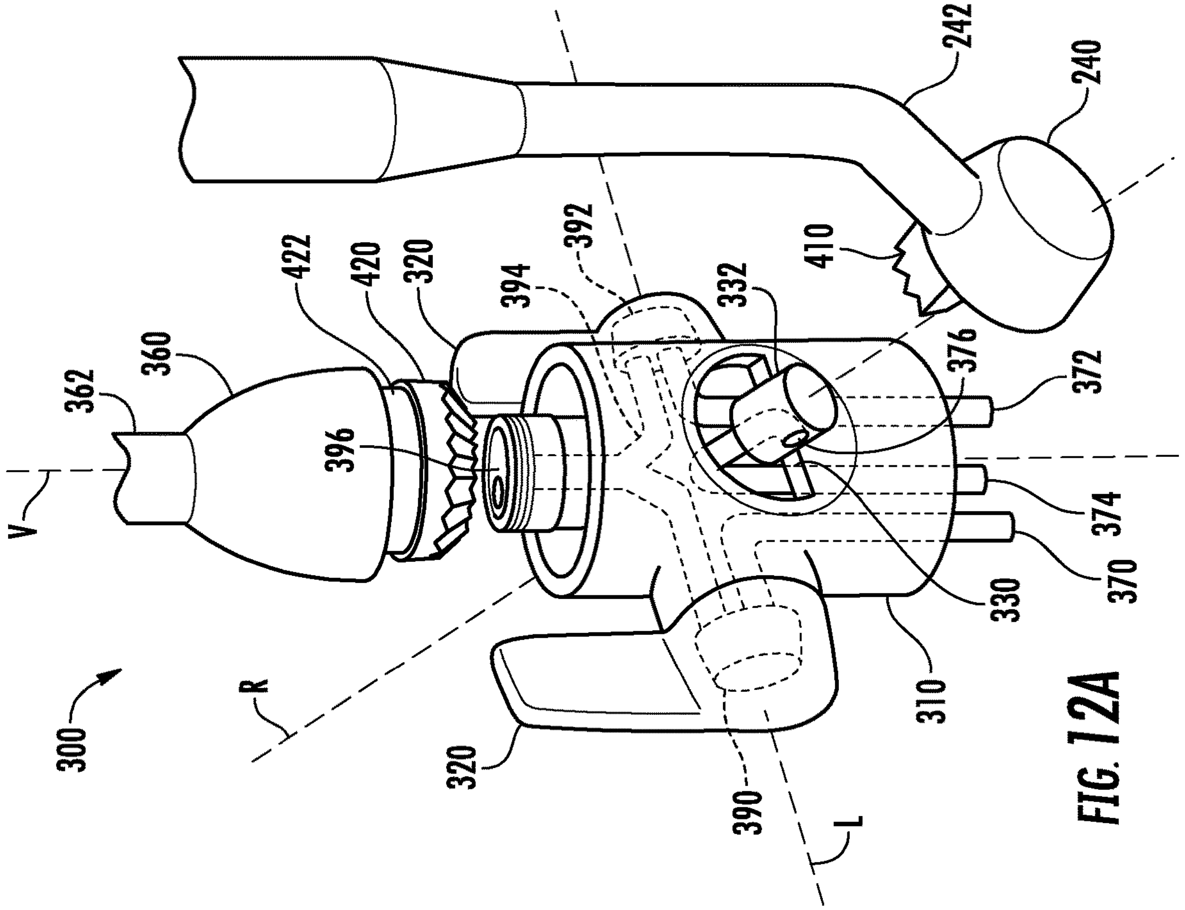
Figure 13A:
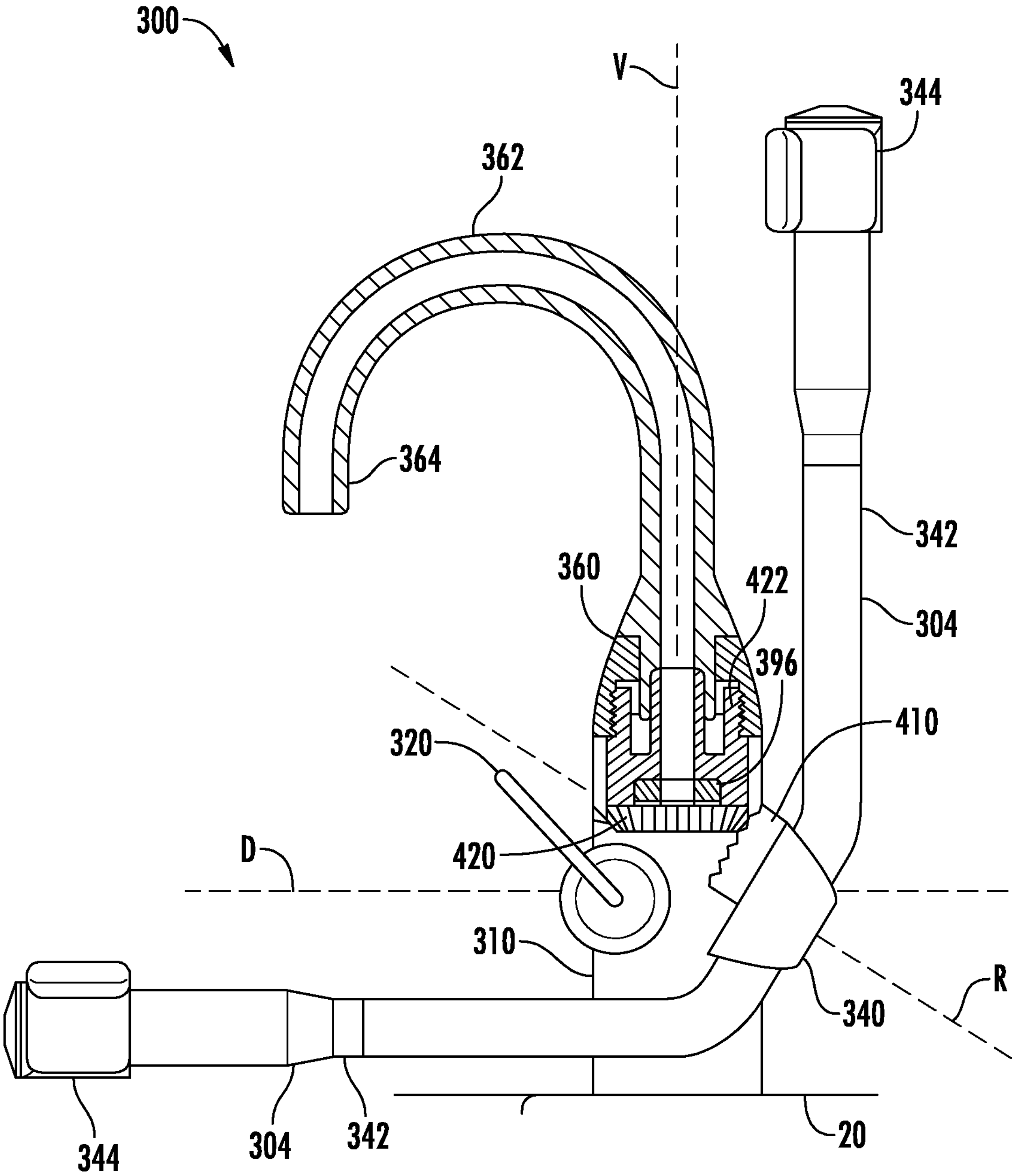
FIGS. 13A-13C are various side views of the combination eyewash and faucet unit of FIG. 10.
Figure 14:
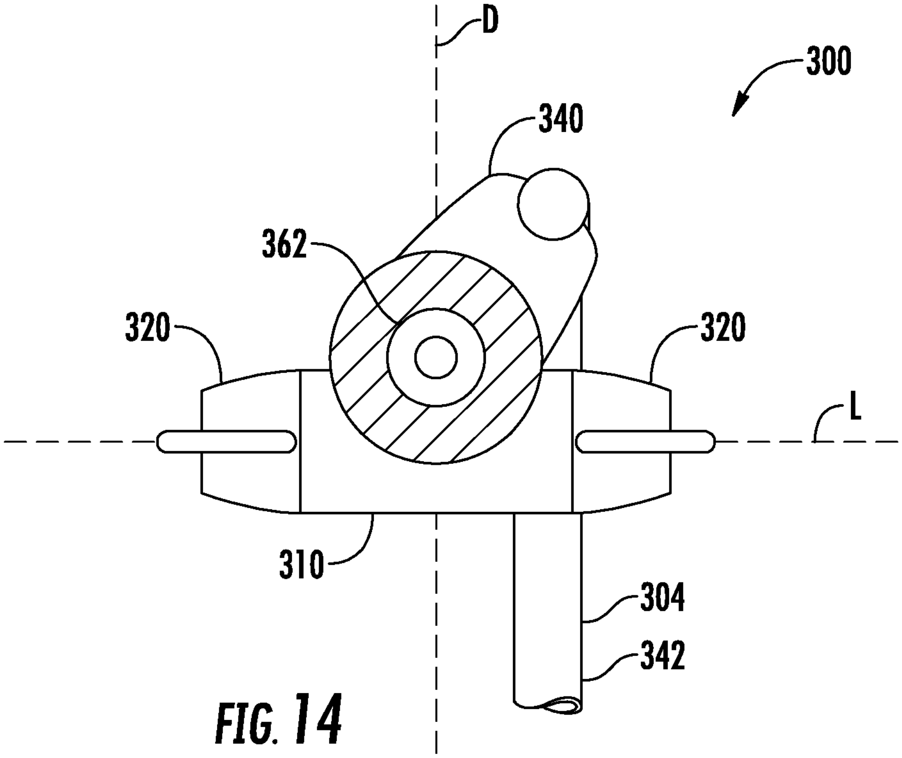
FIG. 14 is a top view of the combination eyewash and faucet unit of FIG. 10.
Figure 15:
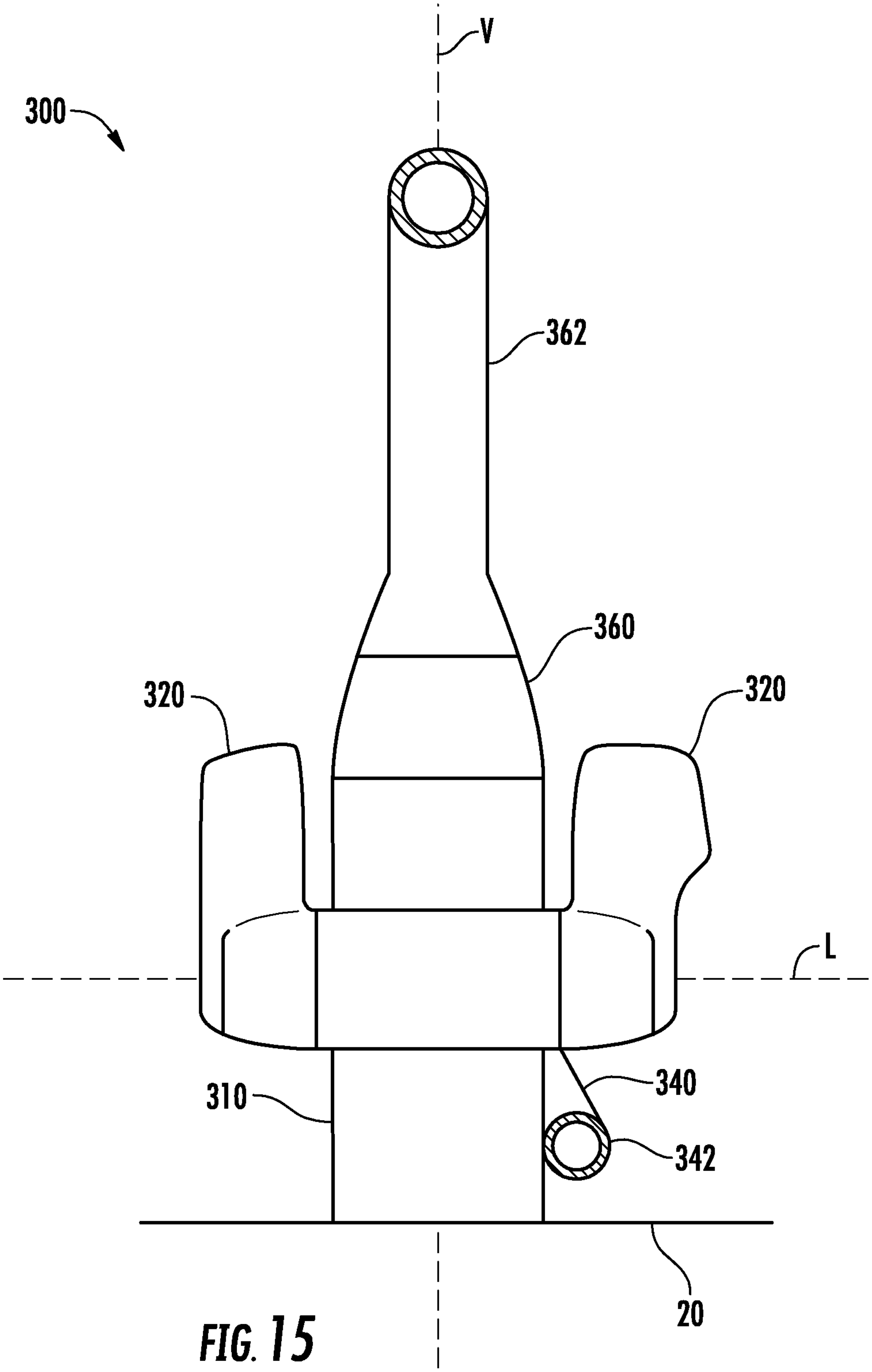
FIG. 15 is a front view of the combination eyewash and faucet unit of FIG. 10.

The eyewash arm 304 rotates about an axis R extending parallel to and through the eyewash arm seat 332. In some embodiments, the eyewash arm seat 332 is fixed relative to the body 310. In other embodiments, the eyewash arm seat 332 is mobile (e.g., rotatable) relative to the body 310. A vertical axis V extends through the center of the body 310, a lateral axis L extends parallel to a rear wall of the sink 10 and through the axis of rotation of both of the handles 320, and a depth axis D extends perpendicular to the V and L axes. As shown in FIGS. 12A and 13A, the eyewash arm seat 332 extends away from the body 310 backward, downward, and to the right as viewed from the front of the fixture 100. In some embodiments, the axis R is rotationally offset approximately 45 degrees from each of the V, L, and D axes. The eyewash arm 304 rotates from a stored position, shown in FIGS. 10 and 13B, where the eyewash 344 is disposed mostly behind the body 310, to an active position, shown in FIGS. 13C, 14, and 15, where the eyewash 344 is disposed over the sink 10. The eyewash arm 304 may be approximately parallel to the vertical axis V in the stored position and approximately parallel to the depth axis D in the active position. In some embodiments, the stored position is offset approximately 90 degrees from the active position. In use, a user can apply a force on the extension portion 342 or on the eyewash 344 to move the eyewash arm 304 between the stored position and the active position.

Figure 13B:
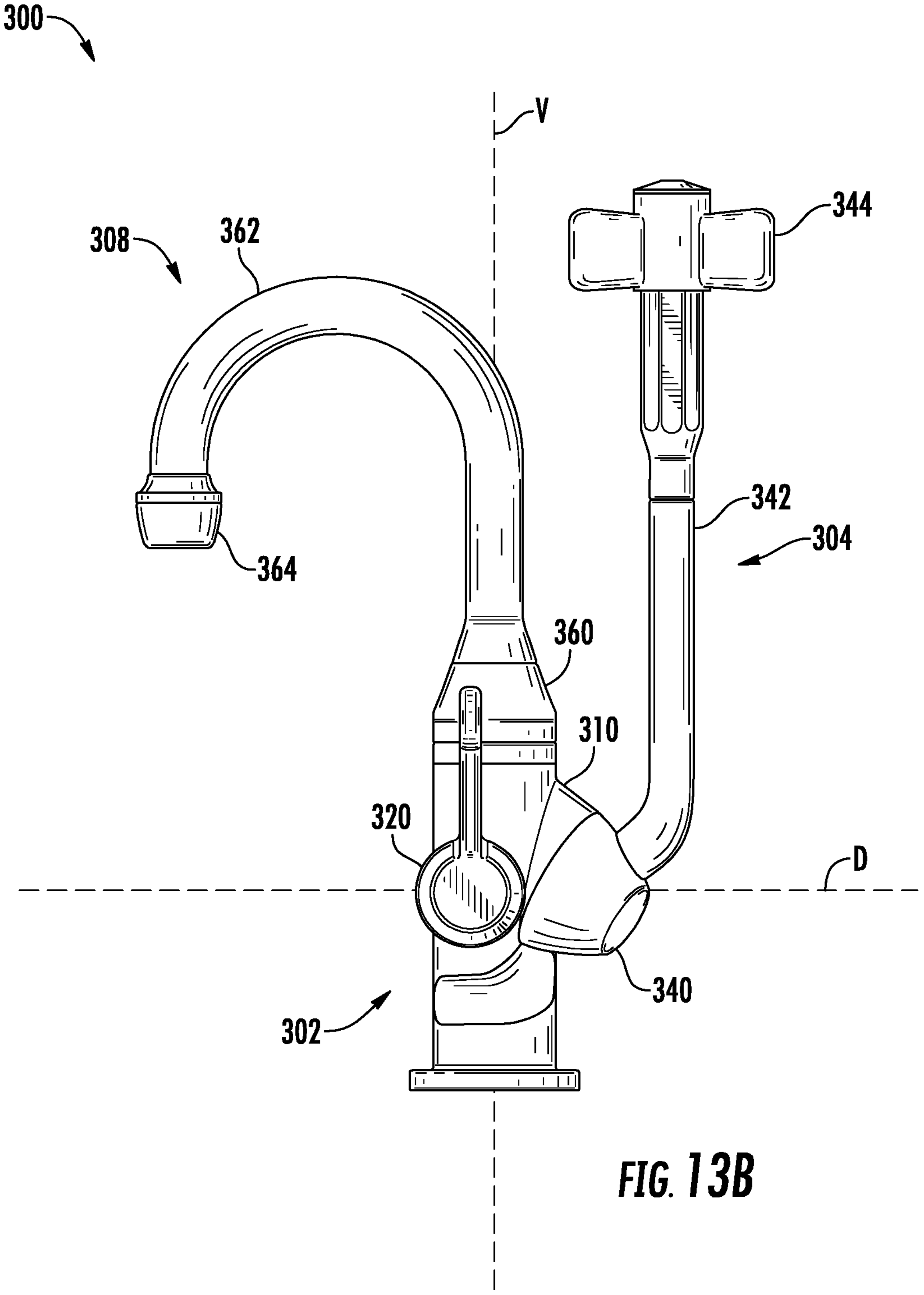
Figure 13C:
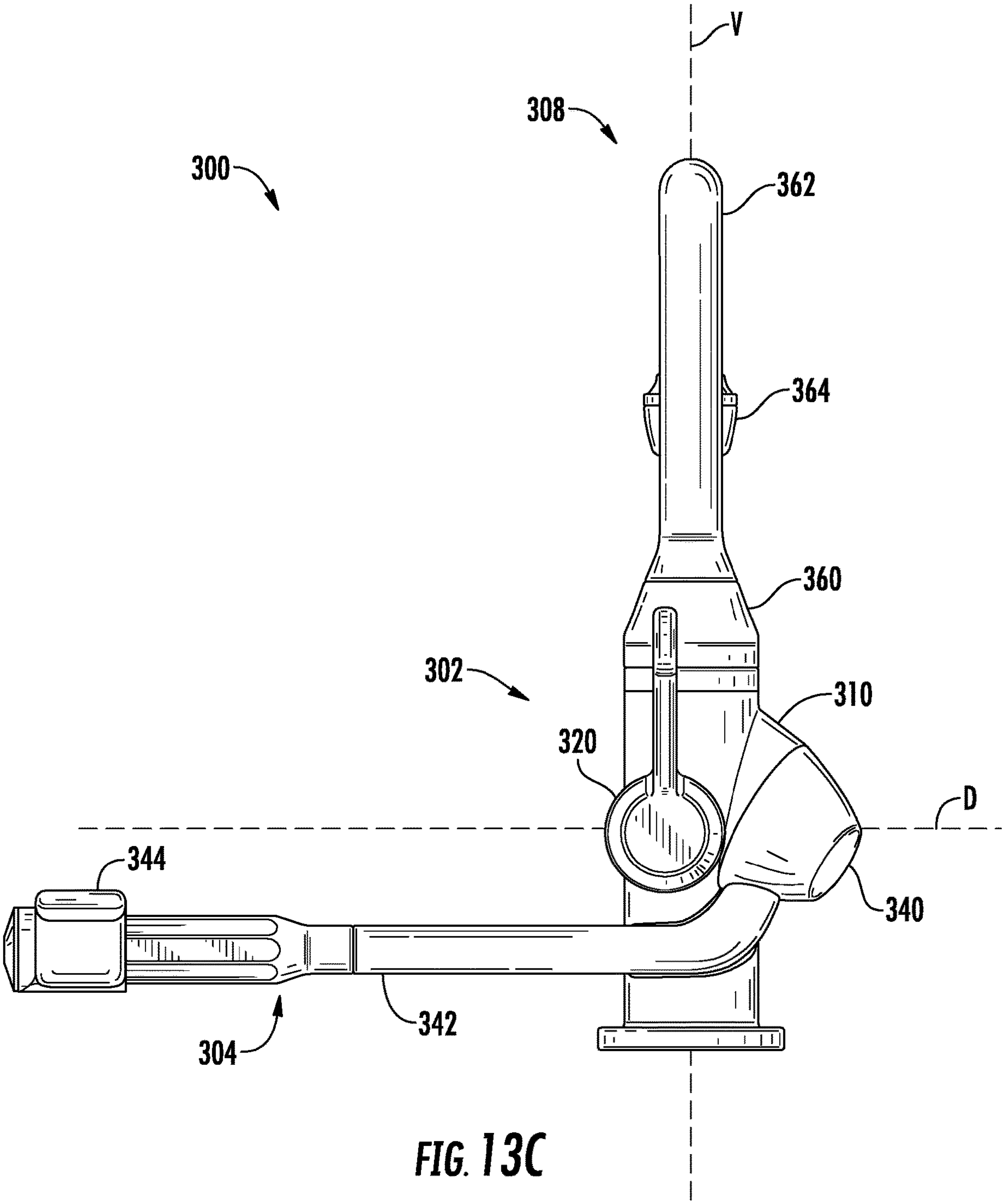

Referring to FIG. 10, the spout section 308 includes a body, shown as adaptor 360, an extension, shown as spout 362, and an outlet, shown as nozzle 364. The spout 362 and the nozzle 364 are configured to rotate relative to the body 310 about the vertical axis V. The adaptor 360 may rotate with the spout 362 or may be fixed to the body 310. In some embodiments, the spout 362 is coupled to the body 310 with a bearing, bushing, or other similar device to facilitate supported rotation of the spout 362. The spout 362 may rotate freely a full 360 degrees, or may include hard stops to prevent rotation past a certain point. The spout 362 rotates between an active position above the sink 10 and a stored position rotationally offset from the active position. The stored position is shown in FIG. 13B, and the active position is shown in FIG. 13C. The stored position may be offset approximately 90 degrees from the active position. The adaptor 360 transitions between the diameter of the body 310 and the diameter of the spout 362 and may provide additional structural support for the spout 362. The spout 362 directs water to flow from the body 310 to the nozzle 364. Although the spout 362 is shown as a gooseneck type extension, the spout 362 may be any type of extension having any shape (e.g., an extending neck with a flexible hose and a handheld end portion, a double-jointed neck, a neck that extends straight outward, etc.). The nozzle 364 may be substantially similar to the nozzle 174.

FIG. 12A illustrates the flow paths of water though the fixture 300. Water flows into the fixture 300 through a hot water source, shown as hot water line 370, through a cold water source, shown as cold water line 372, and through a tepid water source, shown as tepid water line 374. The hot water line 370, the cold water line 372, and the tepid water line 374 may be substantially similar to the hot water line 190, the cold water line 192, and the tepid water line 194, respectively.

The tepid water line 374 supplies tepid water to the eyewash 344 through a valve, the collar 340, and the extension portion 342. The valve permits the flow of tepid water to the eyewash arm 304 when the eyewash arm 304 is in the active position and prevents the flow of tepid water to the eyewash arm 304 when the eyewash arm 304 is in the stored position. The rotational position of the eyewash arm 304 where flow begins may be varied by modifying the geometry of the valve. In some embodiments, the valve is a valve similar to the puck valve 200. In other embodiments, the valve is an aperture or port 376 extending through a side wall of the eyewash arm seat 332. With the eyewash arm 304 in the stored position, the port 376 does not overlap the internal flow path of the eyewash arm 304, and flow is prevented. As the eyewash arm 304 rotates toward the active position, the port 376 overlaps the internal flow path of the eyewash arm 304, and the flow is activated.

Referring to FIG. 12A, the hot water line 370 is fluidly coupled to a hot water valve 390 similar to the hot water valve 220, and the cold water line 372 is fluidly coupled to a cold water valve 392 similar to the cold water valve 222. The outputs of the hot water valve 390 and the cold water valve 392 are fluidly coupled to a uniter 394 similar to the uniter 224. The hot water and cold water mix in the uniter 394, and mixed water flows out of the uniter 394 through an outlet. The fixture 300 may incorporate alternative mechanisms that facilitate user control of the mixed water (e.g., activation with an infrared or capacitance sensor, a different valve arrangement, etc.), similar to those discussed above in relation to the fixture 100. Mixed water flows from the uniter 394 into a valve, shown as a puck valve 396. The puck valve 396 may be similar in construction to the puck valve 230. The outlet of the puck valve 396 is fluidly coupled to the spout 362. The spout 362 is rotationally coupled to the puck valve 396. When the spout 362 is in the active position, the puck valve 396 permits the flow of mixed water into the spout 362. When the spout 362 moves out of the active position and towards the stored position, the puck valve 396 prevents flow out of the spout 362. This prevents spilling water outside the sink 10.

Referring to FIGS. 12A-13A, the fixture 300 includes driving components that rotationally couple the eyewash arm 304 to the spout 362. The collar 340 includes a gear 410 (e.g., a bevel gear) that extends around the eyewash arm seat 332 and into the eyewash aperture 330. The gear 410 may extend around the entirety of the eyewash arm seat 332 or around a portion of the eyewash arm seat 332. The gear 410 is rotationally coupled to the collar 340. A gear 420 (e.g., a bevel gear) extends into the body 310 from the spout section 308. The gear 420 is rotationally coupled to the spout 362 by a clutch, shown as slip clutch 422. The gear 410 and the gear 420 interface with one another and are configured to cooperate to transfer torque between the eyewash arm 304 and the spout 362. The slip clutch 422 rotationally decouples the gear 420 and the spout 362 when the torque transferred through the slip clutch 422 reaches a threshold level. When the eyewash arm 304 is moved to the active position, the spout 362 rotates toward the stored position. When the eyewash arm 304 is moved to the stored position, the spout 362 rotates toward the active position. The slip clutch 422 decouples the eyewash arm 304 from the spout 362 if the spout 362 encounters an obstacle, facilitating continued movement of the eyewash arm 304.

Figure 16A:
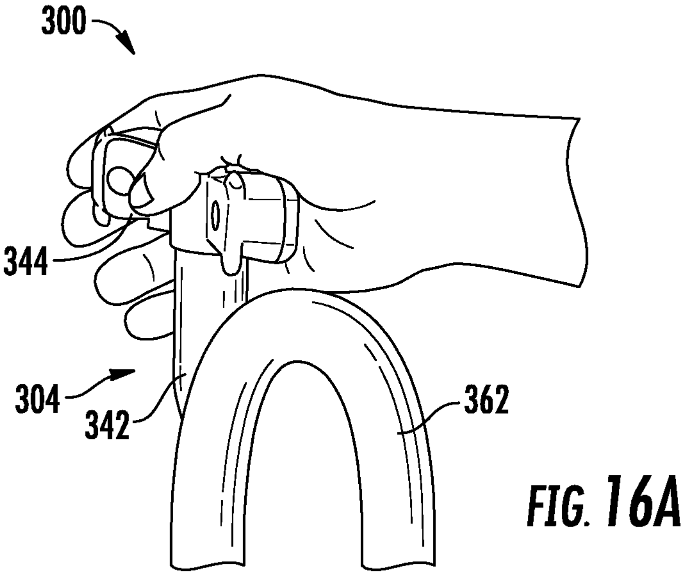
FIGS. 16A-16D illustrate a user interacting with the combination eyewash and faucet unit of FIG. 10.
Figure 16B:
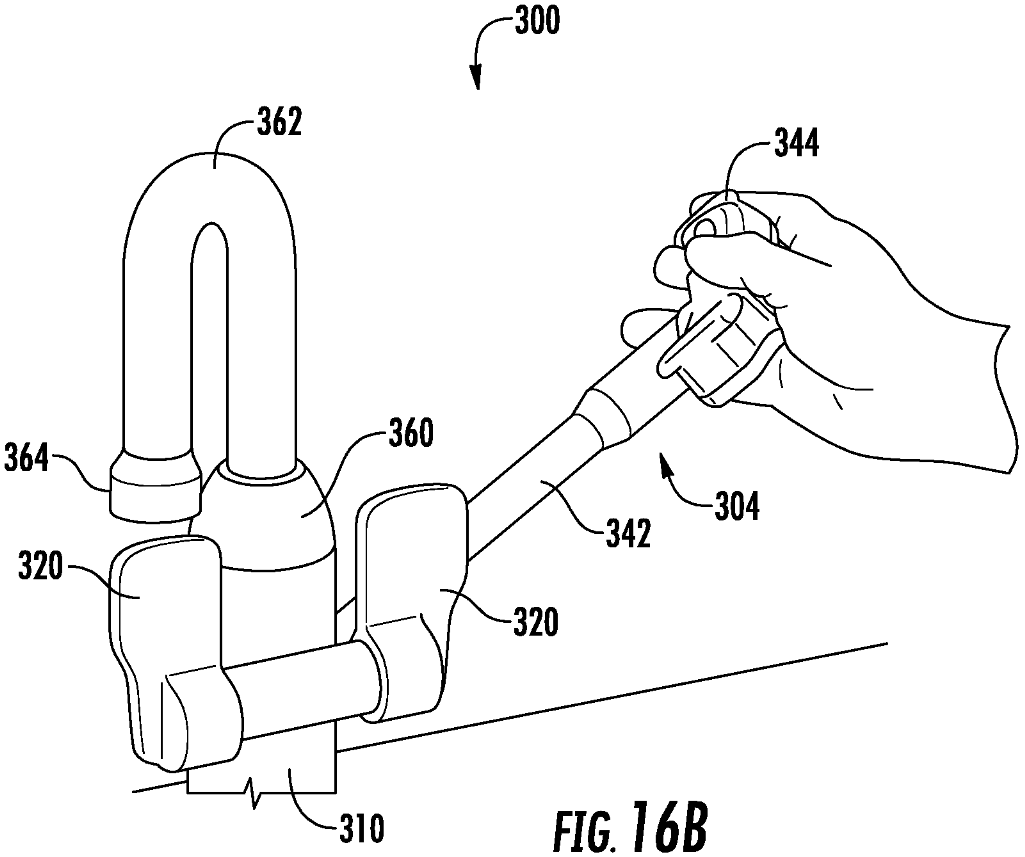
Figure 16C:
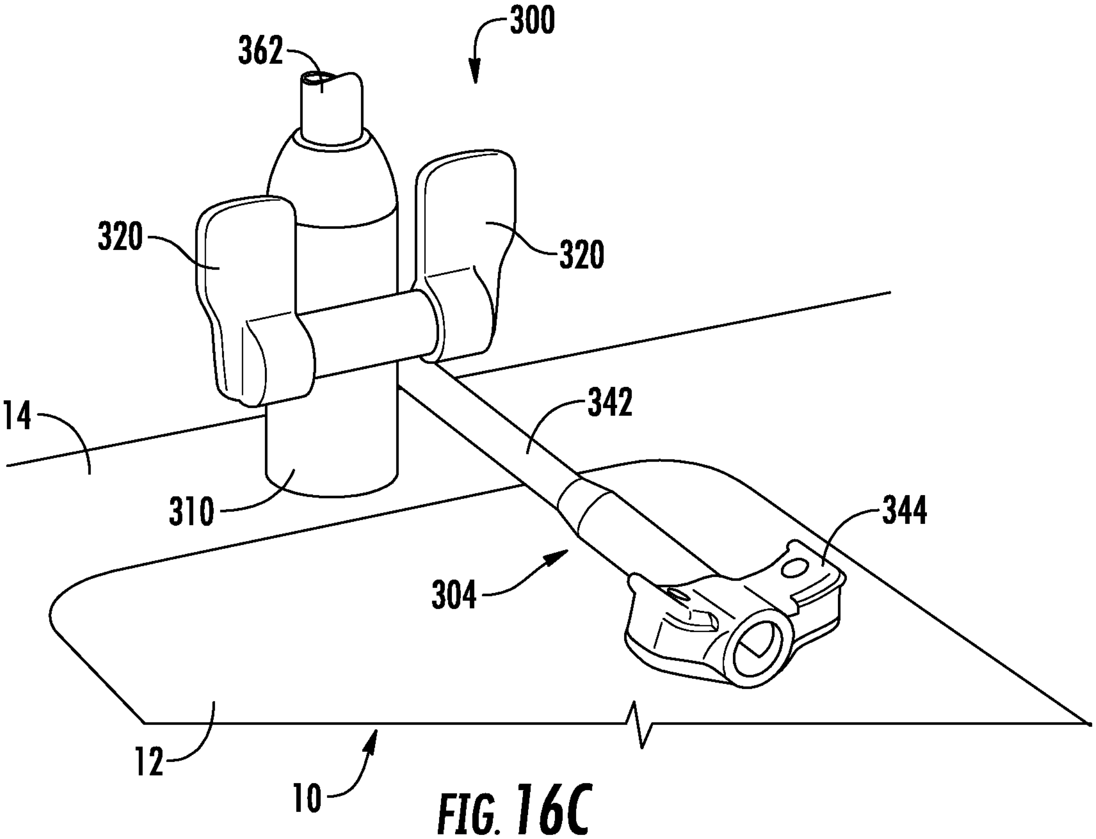
Figure 16D:
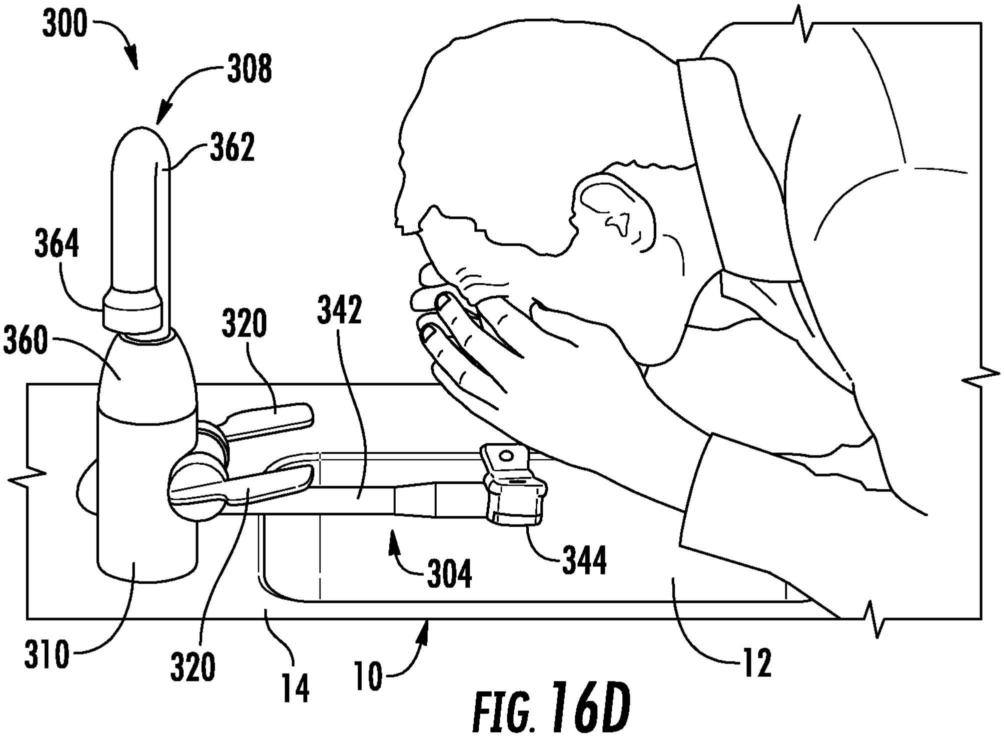

FIGS. 16A-16D illustrate a user interacting with the eyewash arm 304 to use the eyewash 344. FIGS. 16A-16C illustrate a user pulling the eyewash arm 304 into the active position. FIG. 16D illustrates a user using the eyewash 344. It should be noted that the spout 362 moves to the stored position to prevent interference between the user and the spout 362.

Figure 17:
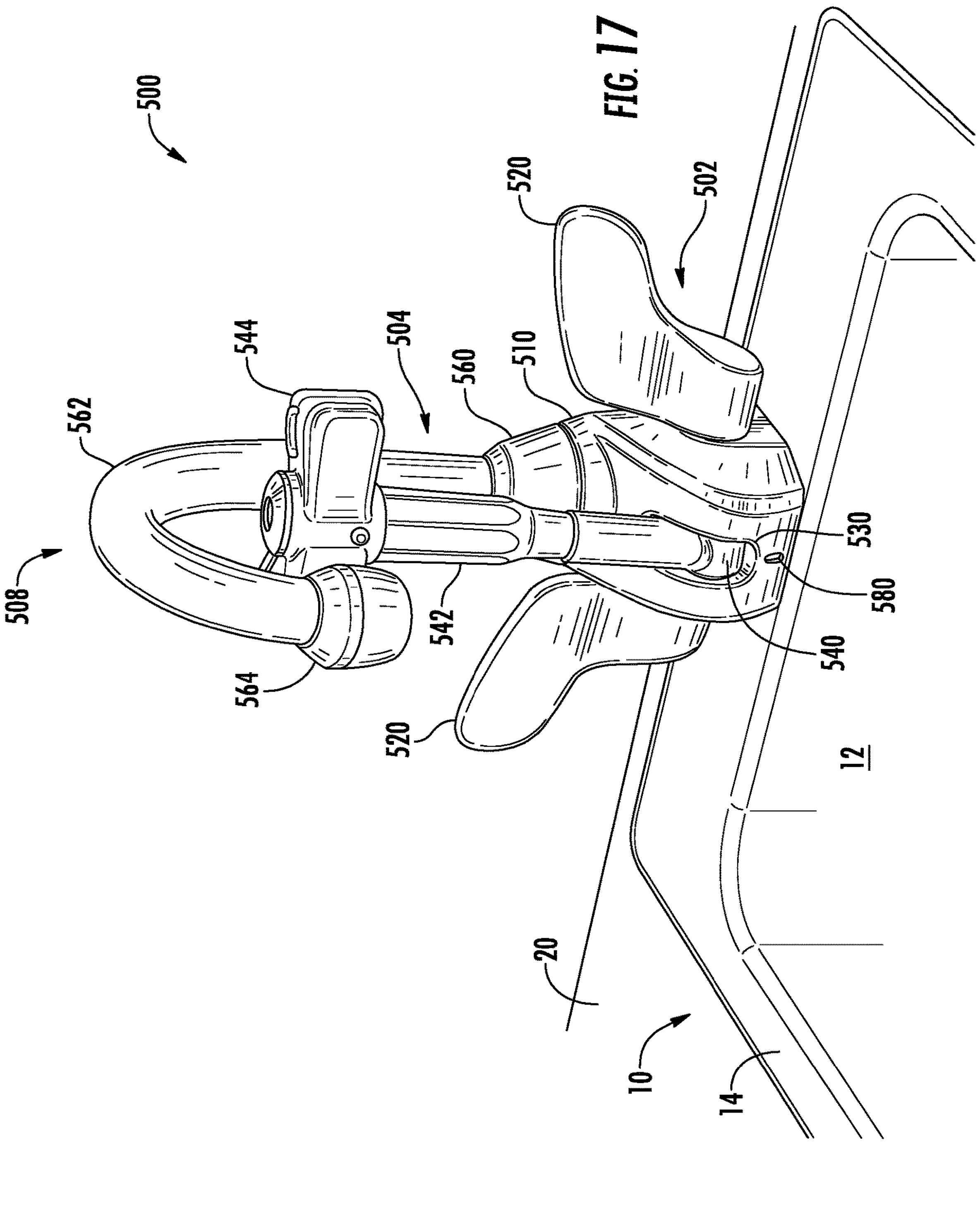
FIG. 17 is a perspective view of a combination eyewash and faucet unit, according to yet another exemplary embodiment.

Referring to FIG. 17, a combination emergency wash and faucet unit or combination emergency wash and faucet system, shown as fixture 500, is depicted according to an exemplary embodiment. The fixture 500 may be substantially similar to the fixture 100 and/or the fixture 300, except as otherwise specified. The fixture 500 is shown coupled to the sink 10, which is supported by the support structure 20. The fixture 500 includes a base 502 coupled to the sink an emergency wash arm, shown as eyewash arm 504, pivotally coupled to base 502, and a spout section 508 pivotally coupled to the base 502. The fixture 500 is configured such that fluid (e.g., water) flows in through the base 502 and out through eyewash arm 504 or the spout section 508.

The base 502 is similar in function to a combination of the base 102 and the midsection 106, although the drip tray 112 and the stock 114 are omitted due to the placement of the eyewash arm 504. Referring to FIG. 10, the base 502 includes a body 510 that extends vertically from the sink 10. The base 502 is fixedly coupled to the sink 10. In some embodiments, the base 502 rests atop the support structure 20. In other embodiments, the base 502 rests atop the sink 10.

Figure 18C:
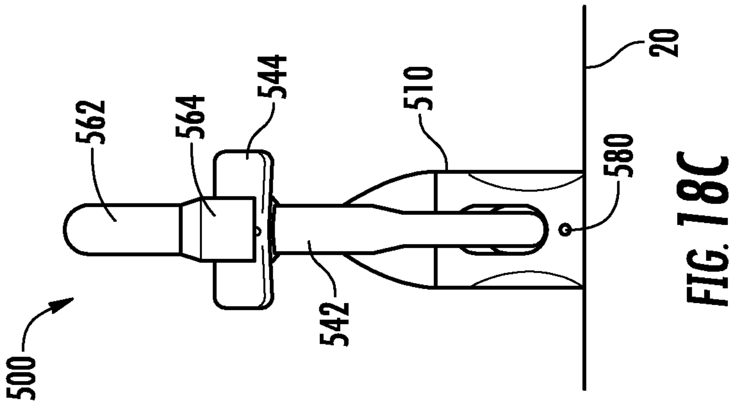
FIGS. 18A-18C are front views of a combination eyewash and faucet unit, according to various exemplary embodiments.
Figure 18B:
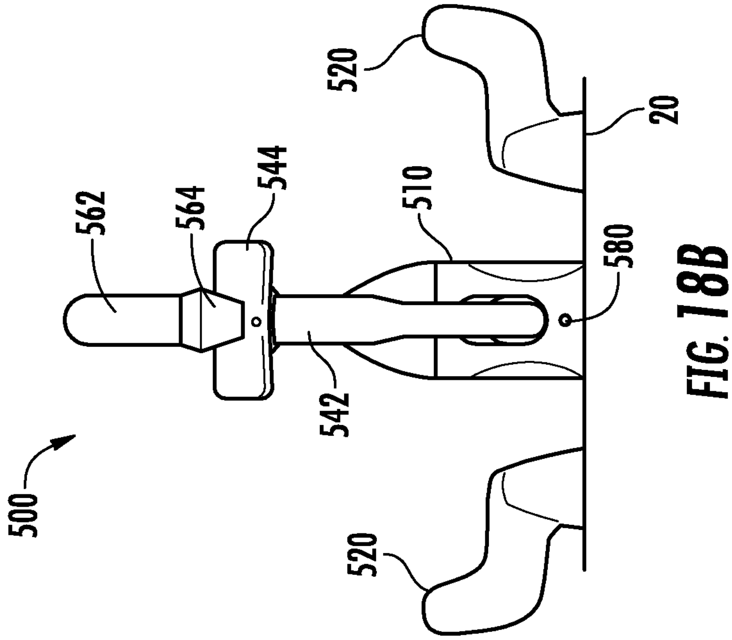
Figure 18A:
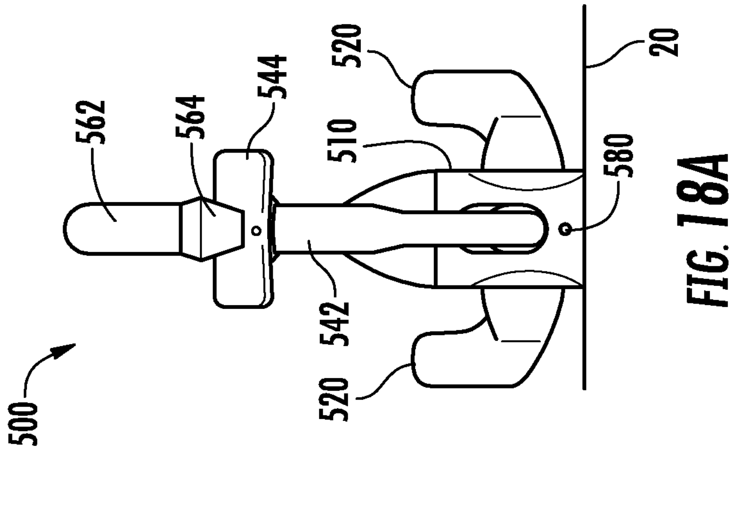

In some embodiments, the body 510 is coupled to one or more valve interfaces, shown as handles 520. The handles 520 are configured such that a user can rotate or otherwise move the handles 520 to control the flow rate and/or temperature of the water flowing through the spout section 508 by manipulating one or more valves. By way of a first example, the base 502 may include two handles 520 coupled to the body 510: one configured to control the flow rate of hot water, and one configured to control the flow rate of cold water, as shown in FIG. 18A. By way of another example, the fixture 500 may include two handles 520 similar to those shown in the embodiment of FIG. 18A, but the handles 520 and the corresponding valves may be coupled to the support structure 20 adjacent the body 510, as shown in FIG. 18B. By way of another example, the base 502 may include one handle 520 configured to control the temperature and the flow rate of water flowing through the spout section 508. By way of yet another example, the fixture 500 may include no handles 520, as shown in FIG. 18C, and the flow rate and/or temperature of the water flowing through the spout section 508 is otherwise controlled (e.g., using a movement sensor, using a touch sensor, etc.). In some embodiments, the temperature of the water flowing through the spout section 508 is preset. In some embodiments, the flow rate of the water flowing through the spout section 508 is preset, and the user activates or deactivates the flow.

Figure 19:
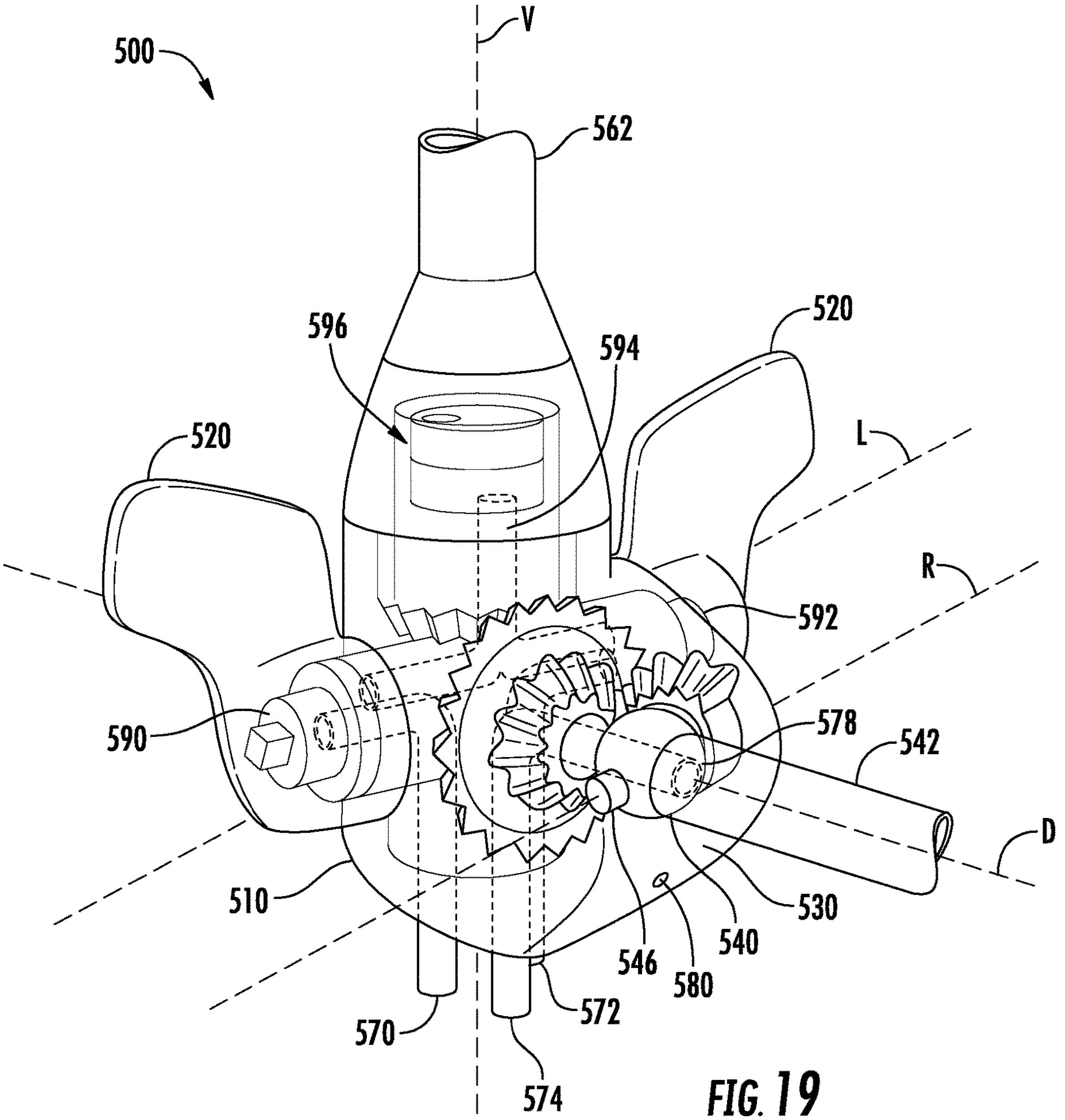
FIG. 19 is a perspective view of the combination eyewash and faucet unit of FIG. 17 with a number of parts shown as transparent.

Referring to FIGS. 17 and 19, the body 510 defines an eyewash aperture 530, through which the eyewash arm 504 received. The eyewash arm 504 is pivotally coupled to the body 510. The eyewash arm 504 includes an interface portion 540, an extension portion 542, and an emergency wash unit, shown as eyewash 544. The interface portion 540 includes an axle 546 extending therefrom that is received by the body 510. The interface portion 540 is coupled to the body 510 such that the eyewash arm 504 rotates about the axle 546. The body 510 may include one or more bushings or bearings that ride on an exterior surface of the axle 546. The extension portion 542 extends away from the interface portion 540. As shown in FIG. 17, the extension portion 542 is a single straight section. In other embodiments, the extension portion 542 is otherwise curved or shaped. The eyewash 544 is coupled to an end of the extension portion 542 opposite the interface portion 540. The eyewash 544 may be substantially similar to the eyewash 134.

The eyewash arm 504 rotates about an axis R extending through the center of the axle 546. A vertical axis V extends through the center of the body 510, a lateral axis L extends parallel to a rear wall of the sink 10 and through the axis of rotation of both of the handles 520, and a depth axis D extends perpendicular to the V and L axes. As shown in FIG. 19, the axle 546 and the axis R extend parallel to the lateral axis L. The eyewash arm 504 rotates from a stored position, shown in FIGS. 17 and 20B, where the eyewash is rotated away from the sink to an active position, shown in FIGS. 19 and 20C, where the eyewash 544 is disposed over the sink 10. The eyewash arm 504 may be approximately parallel to the vertical axis V in the stored position and approximately parallel to the depth axis D in the active position. In some embodiments, the stored position is offset approximately 90 degrees from the active position. In use, a user can apply a force on the extension portion 542 or on the eyewash 544 to move the eyewash arm 504 between the stored position and the active position.

Figure 20A:
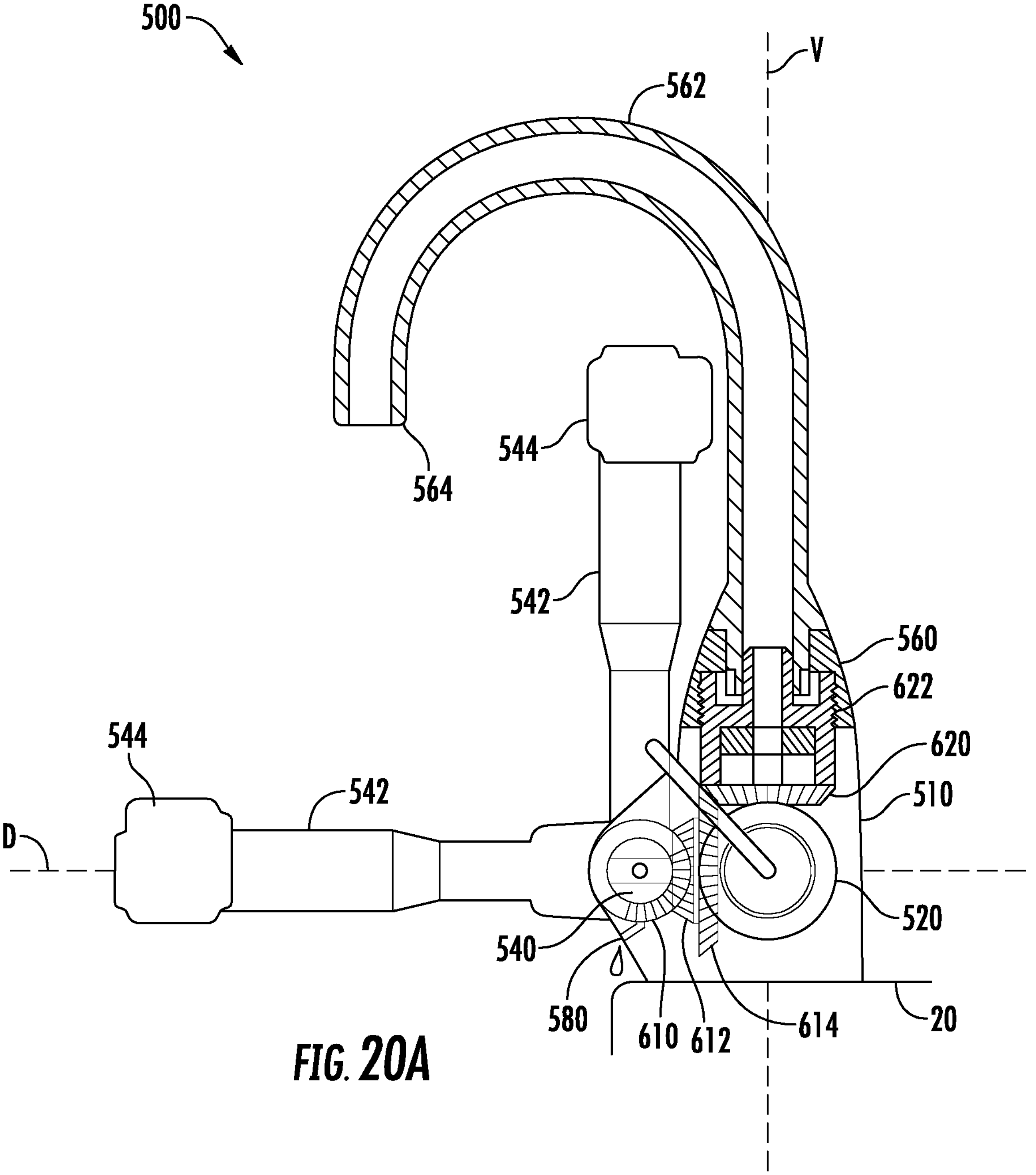
FIGS. 20A-20C are various side views of the combination eyewash and faucet unit of FIG. 17.
Figure 20B:
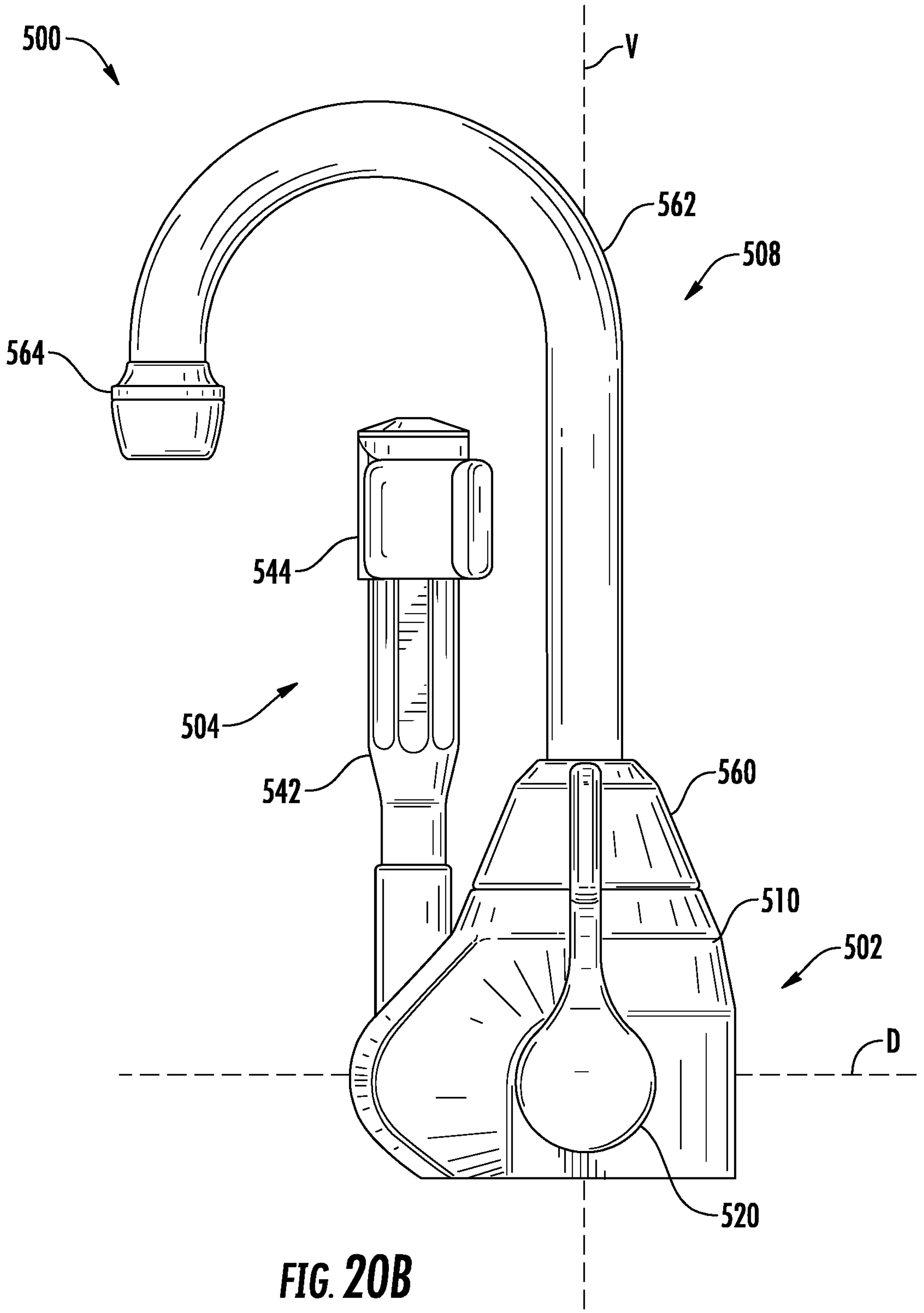
Figure 20C:
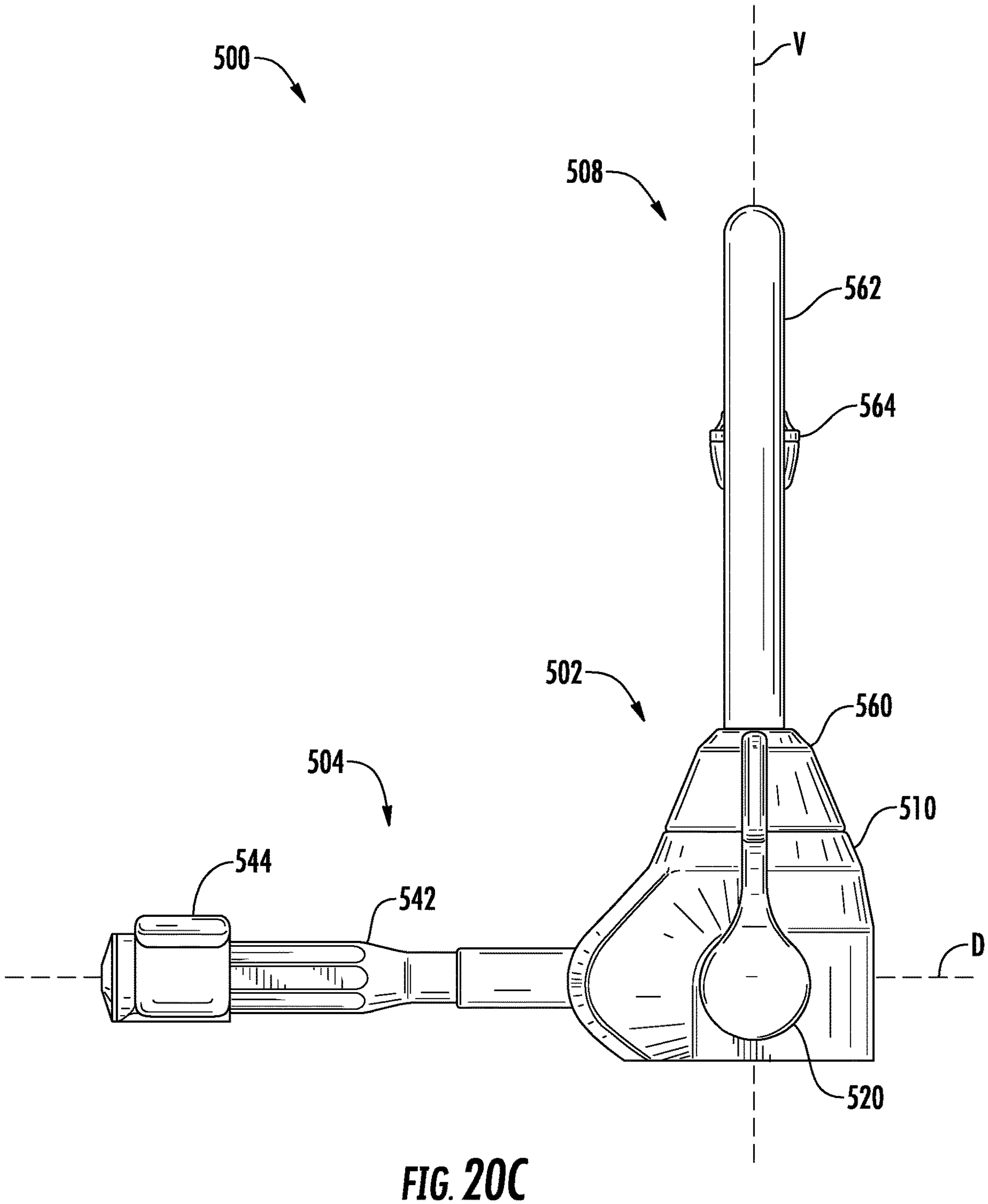
Figure 21:
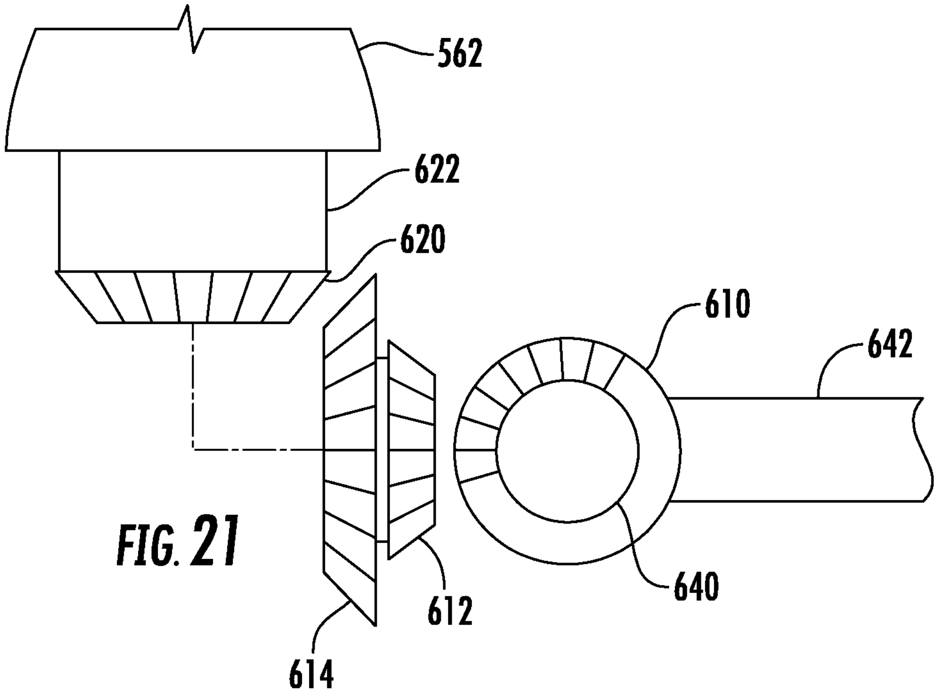
FIG. 21 is a schematic view showing drive components of the combination eyewash and faucet unit of FIG. 17, according to an exemplary embodiment.
Figure 22:
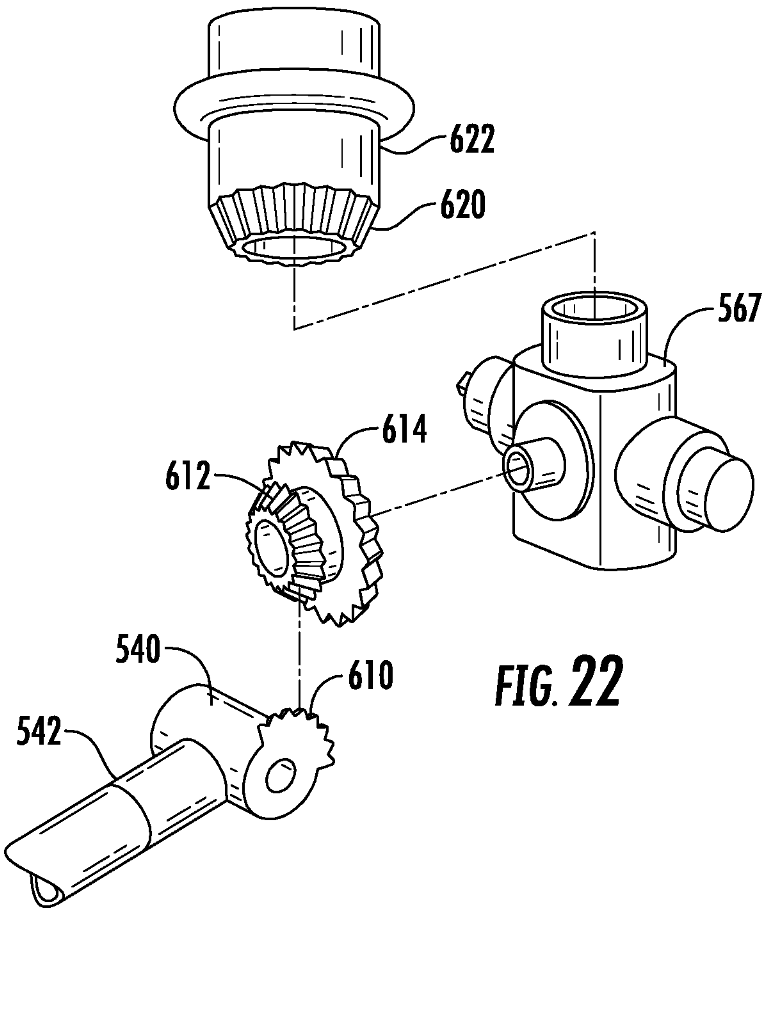
FIG. 22 is another schematic view showing the drive components of FIG. 21.
Figure 23:
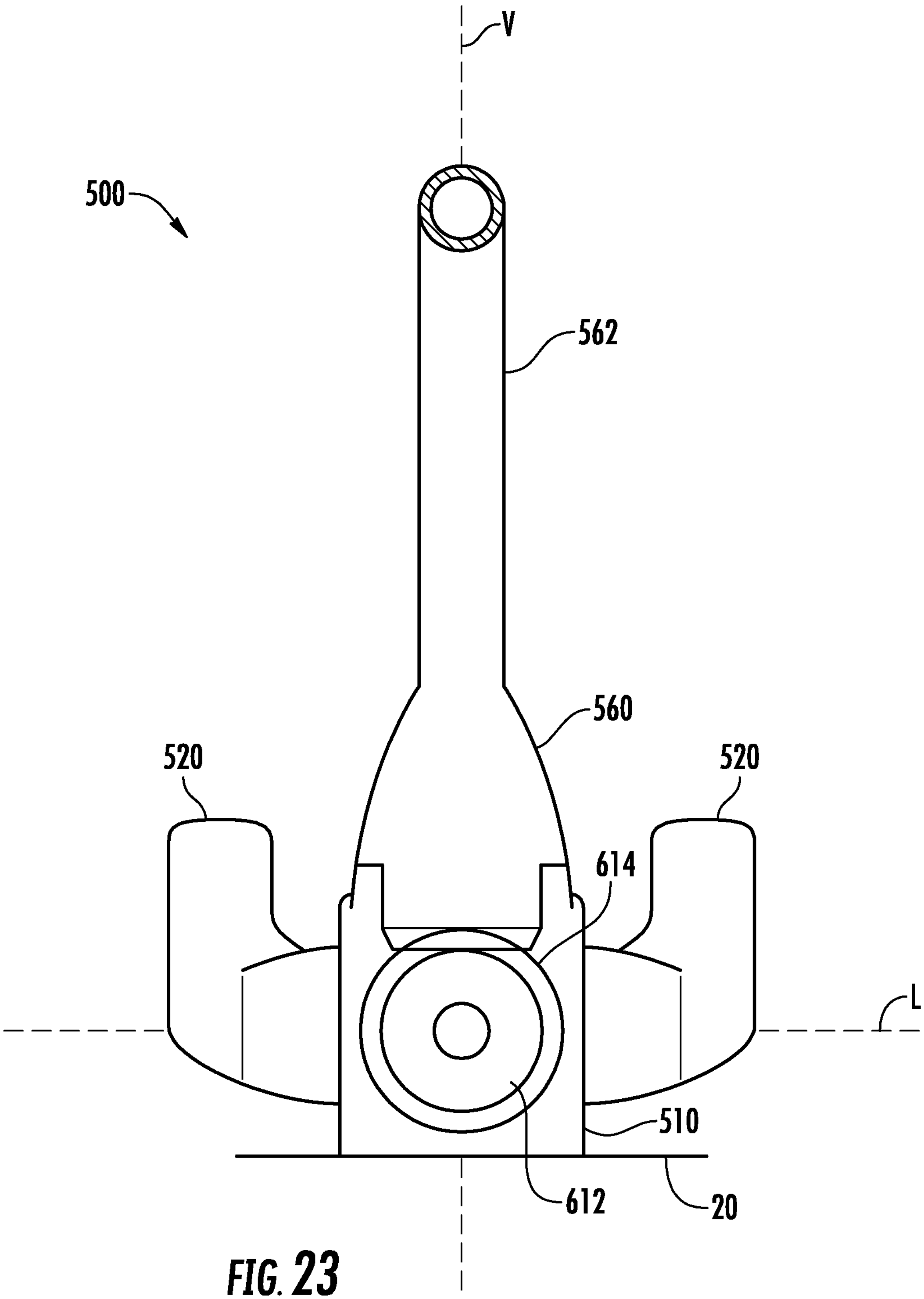
FIG. 23 is a front view of the combination eyewash and faucet unit of FIG. 17.
Figure 24:
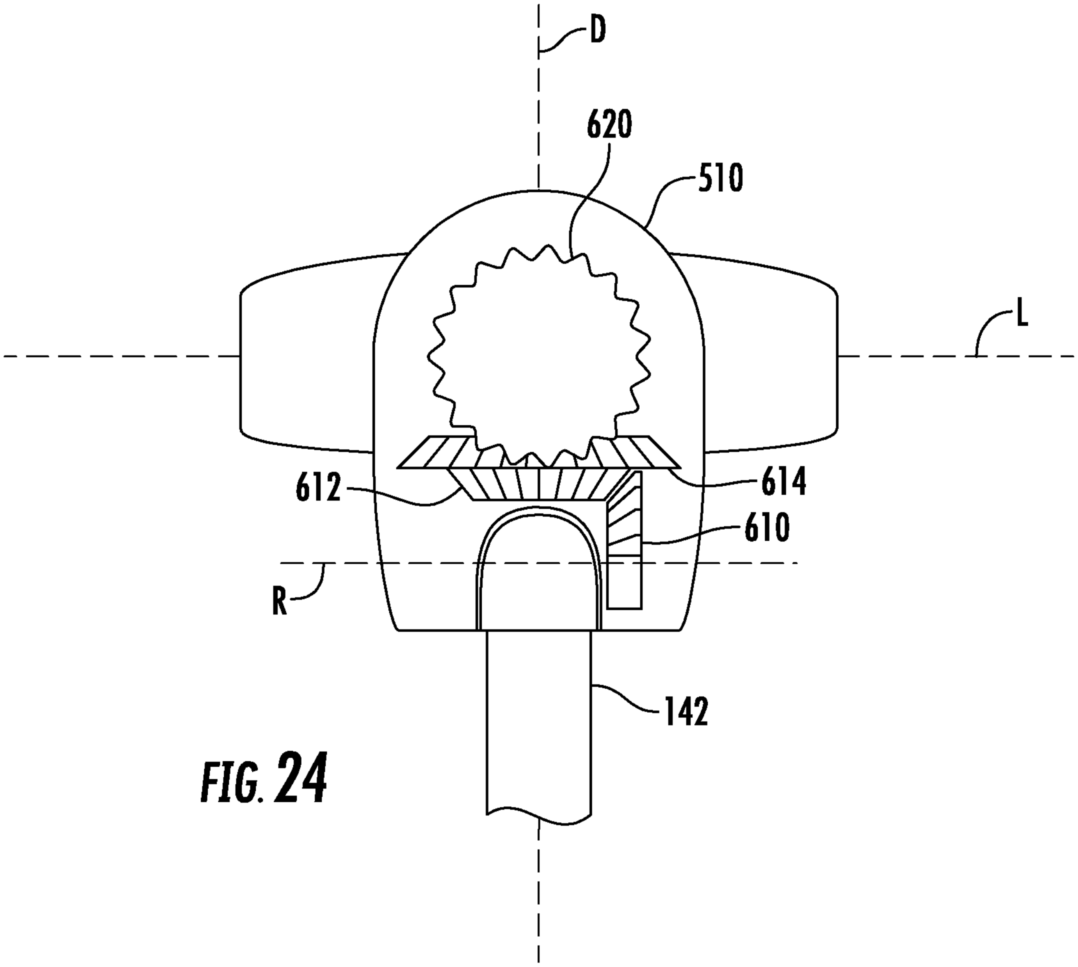
FIG. 24 is a top schematic view of the combination eyewash and faucet unit of FIG. 17.

Referring to FIG. 17, the spout section 508 includes a body, shown as adaptor 560, an extension, shown as spout 562, and an outlet, shown as nozzle 564. The spout 562 and the nozzle 564 are configured to rotate relative to the body 510 about the vertical axis V. The adaptor 560 may rotate with the spout 562 or may be fixed to the body 510. The spout 562 rotates between an active position above the sink 10 and a stored position rotationally offset from the active position. The stored position is shown in FIG. 20B, and the active position is shown in FIG. 20C. The active position may be approximately 90 degrees offset from the stored position. The adaptor 560, spout 562, and nozzle 564 may be substantially similar to the adaptor 360, the spout 362, and the nozzle 364.

FIG. 19 illustrates the flow paths of water though the fixture 500. Water flows into the fixture 500 through a hot water source, shown as hot water line 570, through a cold water source, shown as cold water line 572, and through a tepid water source, shown as tepid water line 574. The hot water line 570, the cold water line 572, and the tepid water line 574 may be substantially similar to the hot water line 190, the cold water line 192, and the tepid water line 194, respectively. As shown in FIG. 19, the hot water line 570, the cold water line 572, and the tepid water line 574 each interface with a manifold 576 that distributes the water. In other embodiments, the lines connect directly to other components (e.g., the hot water valve 590 and the cold water valve 592).

The tepid water line 574 supplies tepid water to the eyewash 544 through a valve, the interface portion 540, and the extension portion 542. The valve permits the flow of tepid water to the eyewash arm 504 when the eyewash arm is in the active position and prevents the flow of tepid water to the eyewash arm 504 when the eyewash arm is in the stored position. The rotational position of the eyewash arm 504 where flow begins may be varied by modifying the geometry of the valve. In some embodiments, the valve is a valve similar to the puck valve 200. In other embodiments, the valve is an aperture or port 578 extending through the interface portion 540 that is configured to overlap a corresponding port in the manifold 576. With the eyewash arm in 504 the stored position, the port 578 does not overlap the corresponding port in the manifold 576, and flow is prevented. As the eyewash arm 504 rotates toward the active position, the port 578 overlaps the corresponding port in the manifold 576, and the flow is activated. The exterior of the interface portion 540 may be cylindrical or spherical to seal against the port in the manifold 576 throughout the rotation of the eyewash arm 504. In some embodiments, the body 510 includes a weep hole 580 similar to the other weep holes discussed herein. The weep hole 580 is arranged such that it drains out of front surface of the body 510 and into the sink 10. The weep hole 580 is configured to be fluidly coupled to the port 578 when the eyewash arm 504 is in the stored orientation. Accordingly, the weep hole may extend immediately below the interface portion 540.

Referring to FIG. 19, the hot water line 570 is fluidly coupled to a hot water valve 590, similar to the hot water valve 220, and the cold water line 572 is fluidly coupled to a cold water valve 592, similar to the cold water valve 222. The outputs of the hot water valve 590 and the cold water valve 592 are fluidly coupled to a uniter 594, similar to the uniter 224. The hot water and cold water mix in the uniter 594, and mixed water flows out of the uniter 594 through an outlet. The fixture 500 may incorporate alternative mechanisms that facilitate user control of the mixed water (e.g., activation with an infrared or capacitance sensor, a different valve arrangement, etc.), similar to those discussed above in relation to the fixture 100. Mixed water flows from the uniter 594 into a valve, shown as a puck valve 596. The puck valve 596 may be similar in construction to the puck valve 230. The outlet of the puck valve 596 is fluidly coupled to the spout 562. The spout 562 is rotationally coupled to the puck valve 596. When the spout 562 is in the active position, the puck valve 596 permits the flow of mixed water through into the spout 562. When the spout 562 moves out of the active position and towards the stored position, the puck valve 596 prevents flow out of the spout 562. This prevents spilling water outside the sink 10.

Referring to FIGS. 19-24, the fixture 500 includes driving components that rotationally couple the eyewash arm 504 to the spout 562. The interface portion 540 includes a gear 610 (e.g., a bevel gear) that extends around the axle 546 inside of the body 510. The gear 610 may extend around the entirety of the axle 546 or around a portion of the axle 546. The gear 610 is rotationally coupled to the interface portion 540 and rotates about the axis R. A gear 612 and a gear 614 (e.g., bevel gears) are rotatably coupled to the manifold 576. The gear 612 and the gear 614 are rotationally fixed relative to one another and rotate about an axis parallel to the axis D. The gear 610 and the gear 612 interface with one another and are configured to transfer torque between the eyewash arm 504 and the gear 614. A gear 620 (e.g., a bevel gear) extends into the body 510 from the spout section 508. The gear 620 is rotationally coupled to the spout 562 by a clutch, shown as slip clutch 622. The gear 614 and the gear 620 are configured to cooperate to transfer torque between the gear 612 and the spout 562. Together, the gears 610, 612, 614, and 620 cooperate to transfer torque between the eyewash arm 504 and the spout 562. The relative sizes of the gears 610, 612, 614, and 620 may be varied to modify the relative rotational speed of the eyewash arm 504 and the spout 562. By way of example, the gear 614 may be increased in diameter to rotate the spout 562 more quickly relative to the eyewash arm 504. In some embodiments, the driving components are configured such that the spout 562 moves out of the path of the eyewash arm 504 before the eyewash arm 504 comes into contact with the spout 562. The slip clutch 622 rotationally decouples the gear 620 and the spout 562 when the torque transferred through the slip clutch 622 reaches a threshold level. When the eyewash arm 504 is moved to the active position, the spout 562 rotates toward the stored position. When the eyewash arm 304 is moved to the stored position, the spout 562 rotates toward the active position. The slip clutch 622 decouples the eyewash arm 504 from the spout 562 if the spout 562 encounters an obstacle, facilitating continued movement of the eyewash arm 504.

Figure 25A:
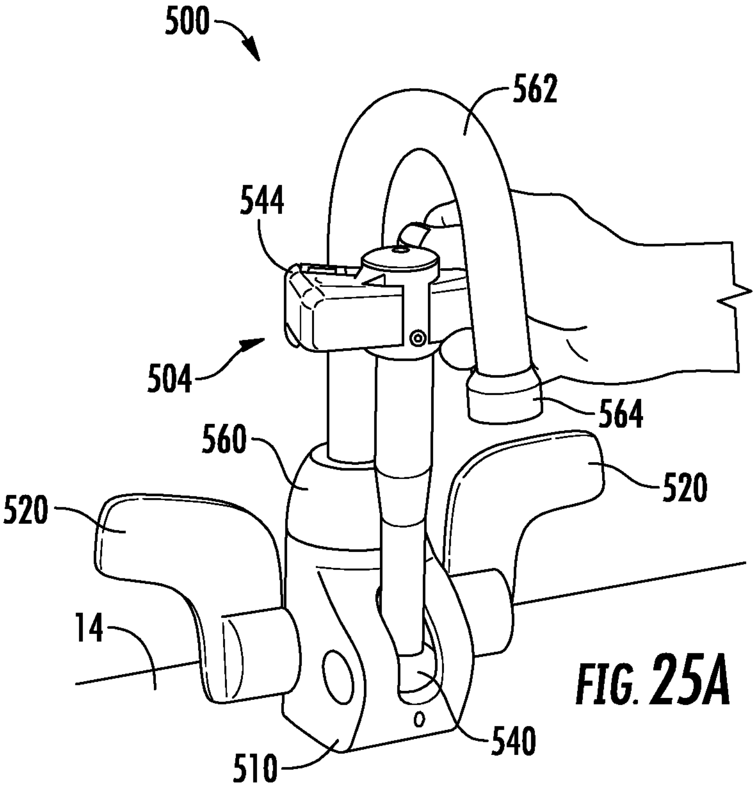
FIGS. 25A-25D illustrate a user interacting with the combination eyewash and faucet unit of FIG. 17.
Figure 25B:
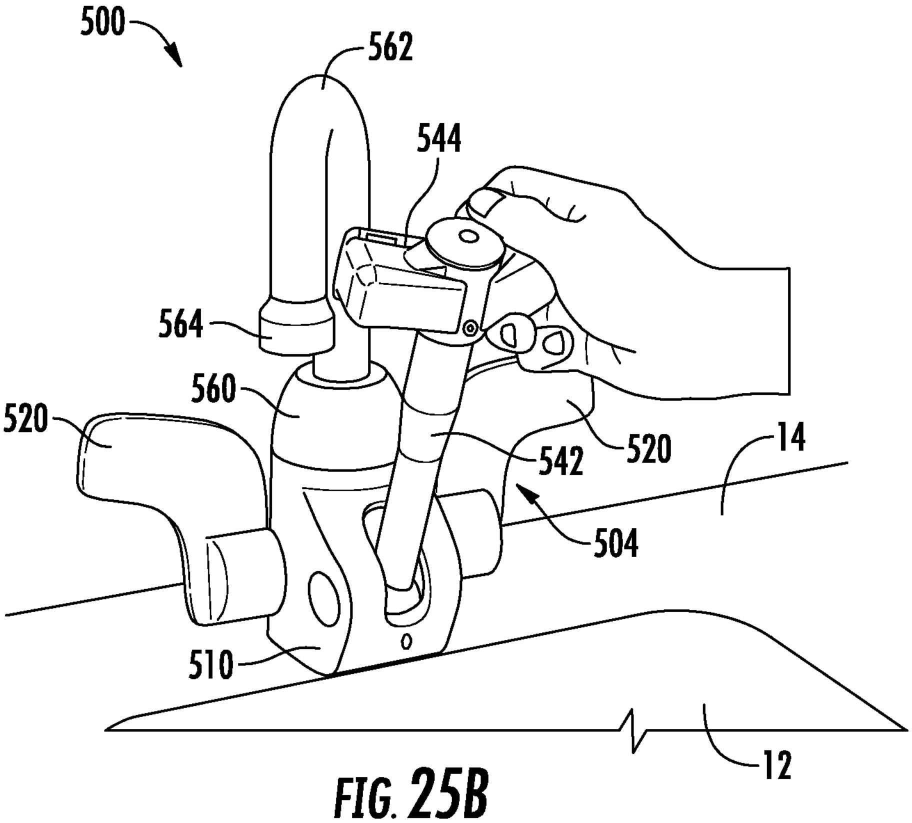
Figure 25C:
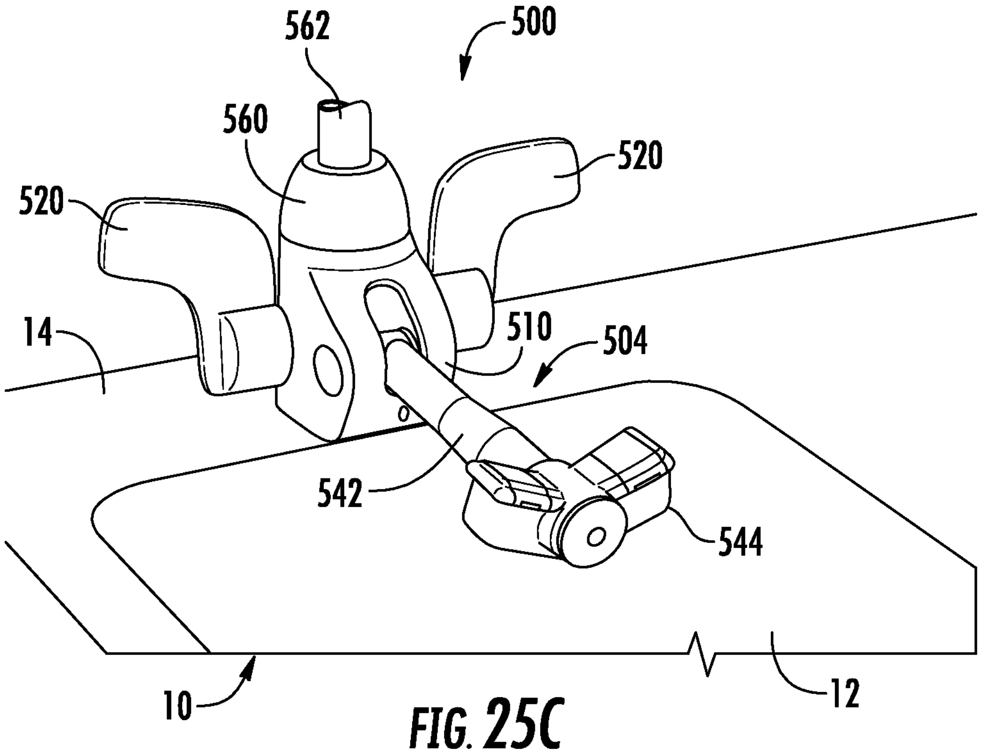
Figure 25D:
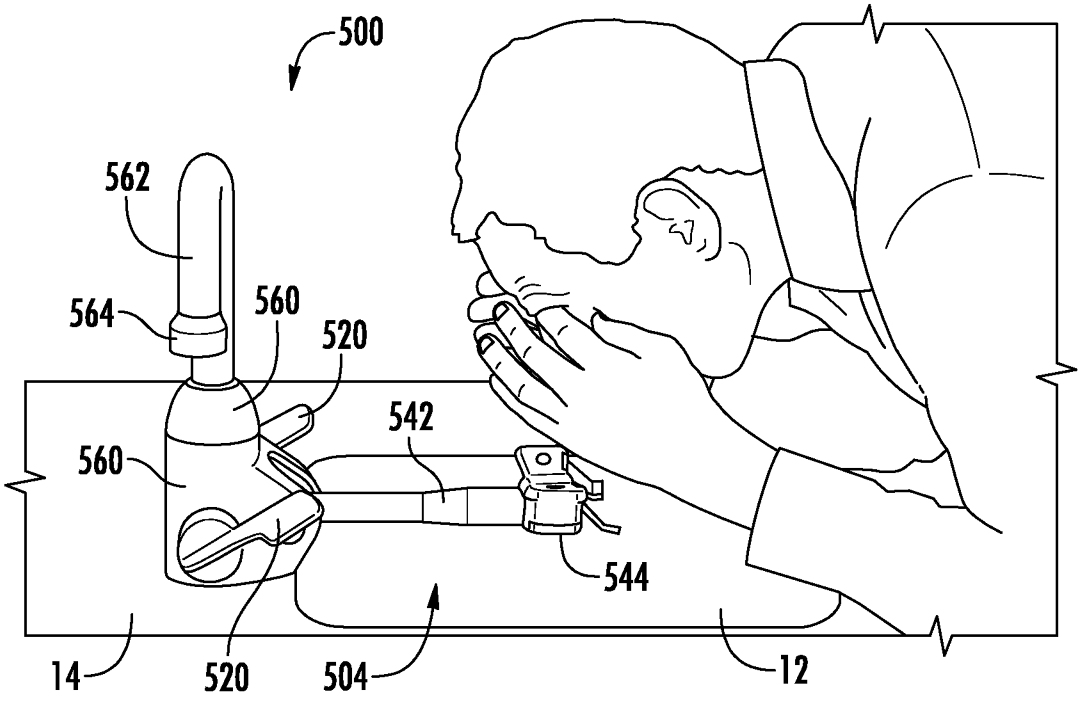

FIGS. 25A-25D illustrate a user interacting with the eyewash arm 504 to use the eyewash 544. FIGS. 25A-25C illustrate a user pulling the eyewash arm 504 into the active position. FIG. 25D illustrates a user using the eyewash 544. It should be noted that the spout 562 moves to the stored position to prevent interference between the user and the spout 562.

Referring to FIGS. 26-39B, a combination emergency wash and faucet unit or combination emergency wash and faucet system, shown as fixture 1000, is depicted according to another exemplary embodiment. The fixture 1000 may be substantially similar to the fixture 100, except as otherwise specified. The fixture 1000 is shown coupled to the sink 10, which is supported by the support structure 20. The fixture 1000 includes a base 1002 coupled to the sink an emergency wash arm, shown as eyewash arm 1004, pivotally coupled to the base 1002, and a faucet or spout section 1008 pivotally coupled to the base 1002. The fixture 1000 is configured such that fluid (e.g., water) flows in through the base 1002 and out through eyewash arm 1004 or the spout section 1008. A vertical axis V extends through the base 1002, the eyewash arm 1004, and the spout section 1008, a lateral axis L extends parallel to a rear wall of the sink 10, and a depth axis D extends perpendicular to the V and L axes.

Referring to FIGS. 26, 27, 31 and 32, the base 1002 includes a body 1010 constructed as a single piece (e.g., a single cast piece, etc.). In other embodiments, the body 1010 is assembled from multiple components. The base 1002 supports the other components of the fixture 1000, similar to the base 302. The body 1010 is configured to extend out over the depression 12 (e.g., along the depth axis D). The body 1010 is fixedly coupled to the sink 10. In some embodiments, the body 1010 rests atop the support structure 20. In other embodiments, the body 1010 rests atop the sink 10.

In some embodiments, the base 1002 includes one or more valve interfaces, shown as handles 1020. The handles 1020 are configured such that a user can rotate or otherwise move the handles 1020 to control the flow rate and/or temperature of the water flowing through the spout section 1008 by manipulating one or more valves. In the embodiment shown in FIG. 28, the base 1002 includes two handles 1020 coupled to the body 1010: one configured to control the flow rate of hot water, and one configured to control the flow rate of cold water. In the embodiment shown in FIG. 27, the fixture 1000 omits the handles 1020, and the flow rate and/or temperature of the water flowing through the spout section 1008 is otherwise controlled (e.g., using an infrared movement sensor (e.g., the motion sensor 1060), using a capacitive touch sensor, etc.). In some embodiments, the temperature of the water flowing through the spout section 1008 is preset. In some embodiments, the flow rate of the water flowing through the spout section 1008 is preset, and the user activates or deactivates the flow.

Referring again to FIG. 26, the eyewash arm 1004 includes a collar 1030, an extension portion 1032, and an emergency wash unit, shown as eyewash 1034. The eyewash arm 1004 may be similar to the eyewash arm 104 except as otherwise stated herein. The collar 1030 is configured to rotate about a substantially vertical axis R of rotation such that the eyewash arm 1004 moves through a horizontal plane. The eyewash arm 1004 rotates between a stowed, stored, or otherwise nonuse position, shown in FIG. 26, where the eyewash 1034 extends parallel or substantially parallel to the length axis L, to an active position (or in-use position), shown in FIG. 39B, where the eyewash arm 1004 extends parallel or substantially parallel to the depth axis D. In some embodiments, the stored position is offset approximately 90 degrees from the active position. In use, a user can apply a force on the extension portion 1032 or on the eyewash 1034 to move the eyewash arm 1004 between the stored position and the active position. The base 1002 overhangs the depression 12 such that the eyewash 1034 is positioned over the depression 12 in both the stored and active positions. The eyewash 1034 includes a body 1036 defining a pair of outlets that each dispense a spray of tepid water upwards and inwards to where the eyes of a person using the eyewash 1034 would be located. In some embodiments, the eyewash 1034 includes a pair of covers 1040 that cover the nozzles when the eyewash 1034 is not in use.

Figure 26:
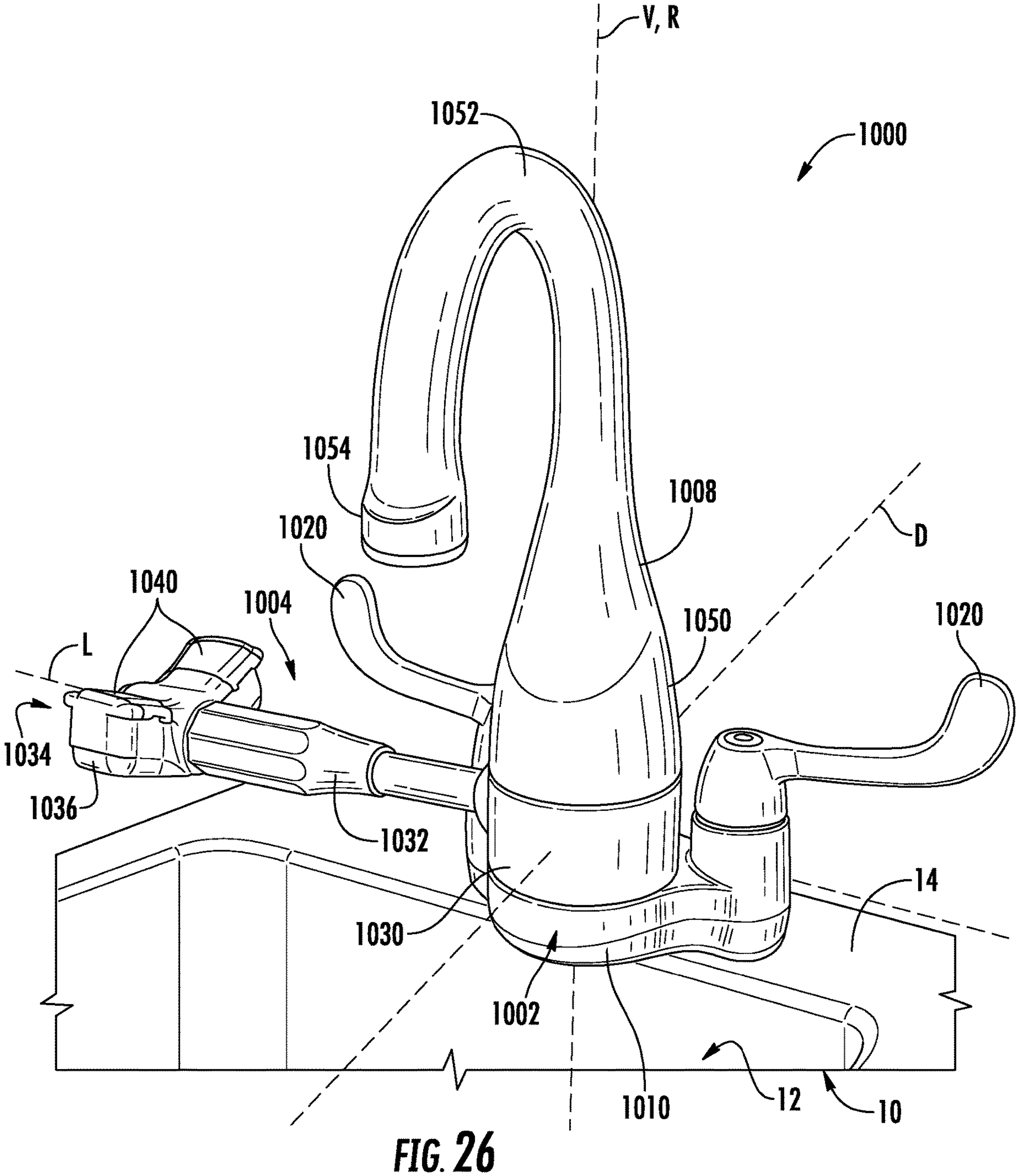
FIG. 26 is a perspective view of a combination eyewash and faucet unit, according to yet another exemplary embodiment.
Figure 38A:
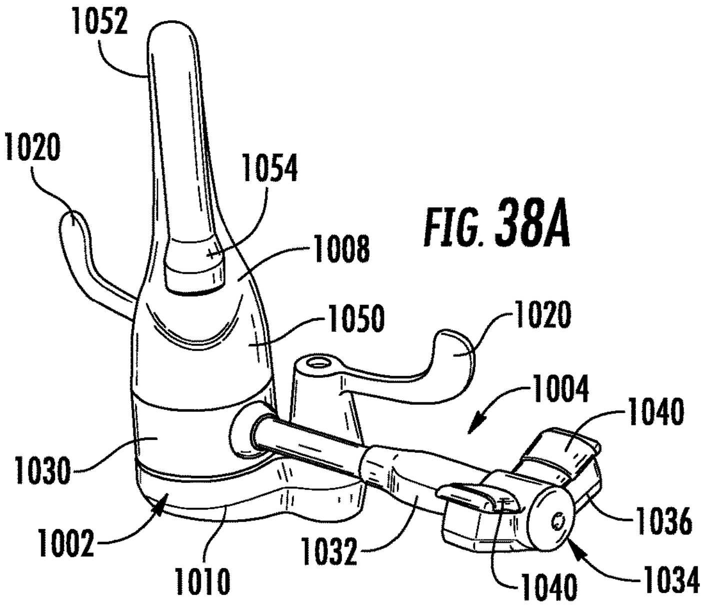
FIGS. 38A-38C are perspective views of the combination eyewash and faucet unit of FIG. 26 illustrating movement of a spout portion of the combination eyewash and faucet unit, according to an exemplary embodiment.

The spout section 1008 includes a first section or adaptor section, shown as body 1050, an extension section, shown as spout 1052, and an outlet, shown as nozzle 1054. The spout section 1008 may be similar to the spout section 108 except as otherwise stated herein. The spout section 1008 is configured to rotate about the axis R. The spout 1052 and the body 1050 are coupled to one another (e.g., integrally formed as a single piece). The nozzle 1054 is coupled to the end of the spout section 1008 opposite the body 1050. The spout section 1008 rotates between an active position, where the spout section 1008 extends along the depth axis D, and one of two stored positions, where the spout section 1008 extends between the depth axis D and the lateral axis L. The active positon is shown in FIG. 26, and the stored positions are shown in FIGS. 38A and 38C. In some embodiments, the active position is offset approximately 45 degrees from each stored position. The nozzle 1054 is configured to direct and otherwise control the stream of water exiting the spout section 1008.

Figure 27:
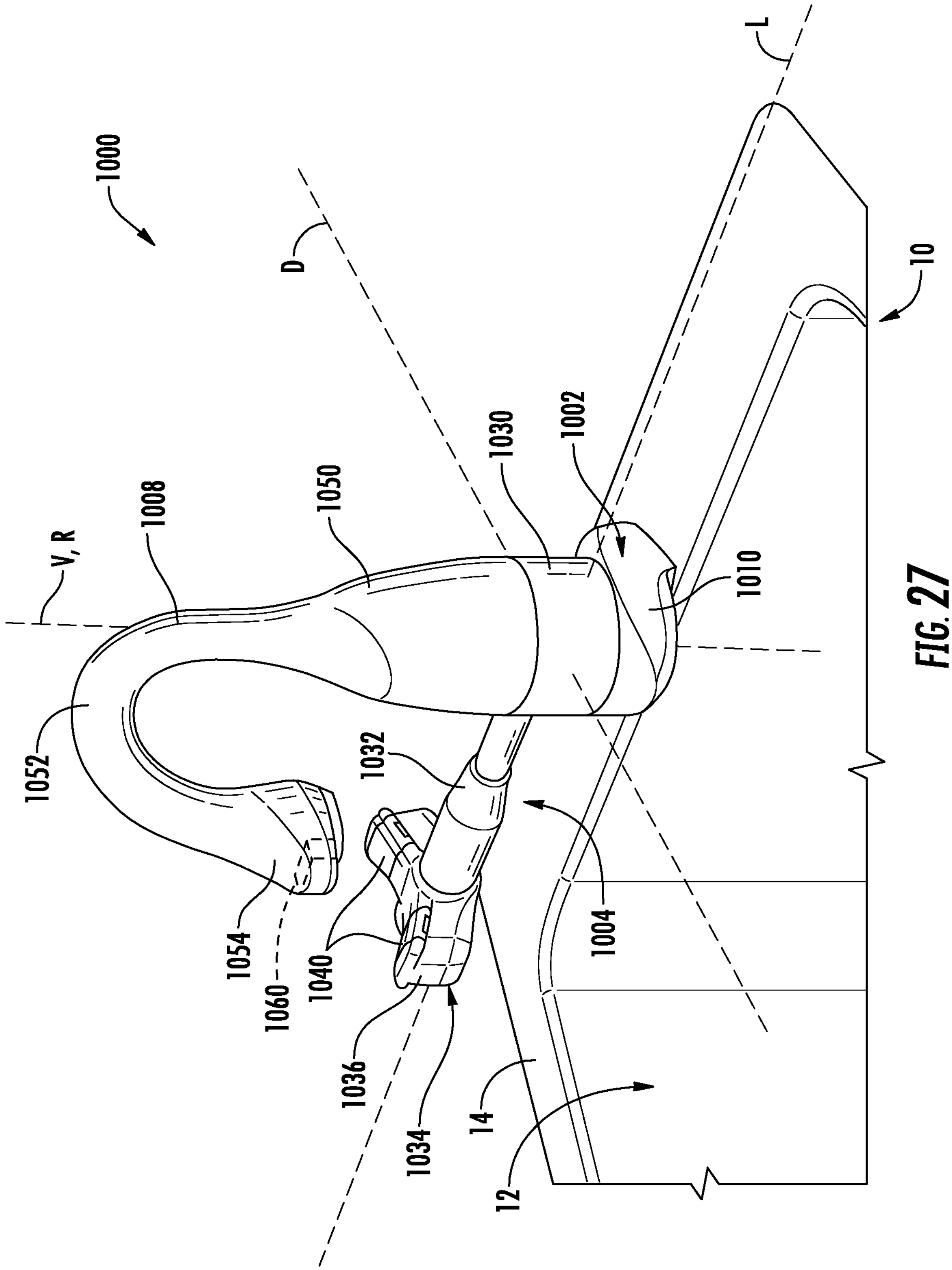
FIG. 27 is a perspective view of a combination eyewash and faucet unit, according to yet another exemplary embodiment.
Figure 30:
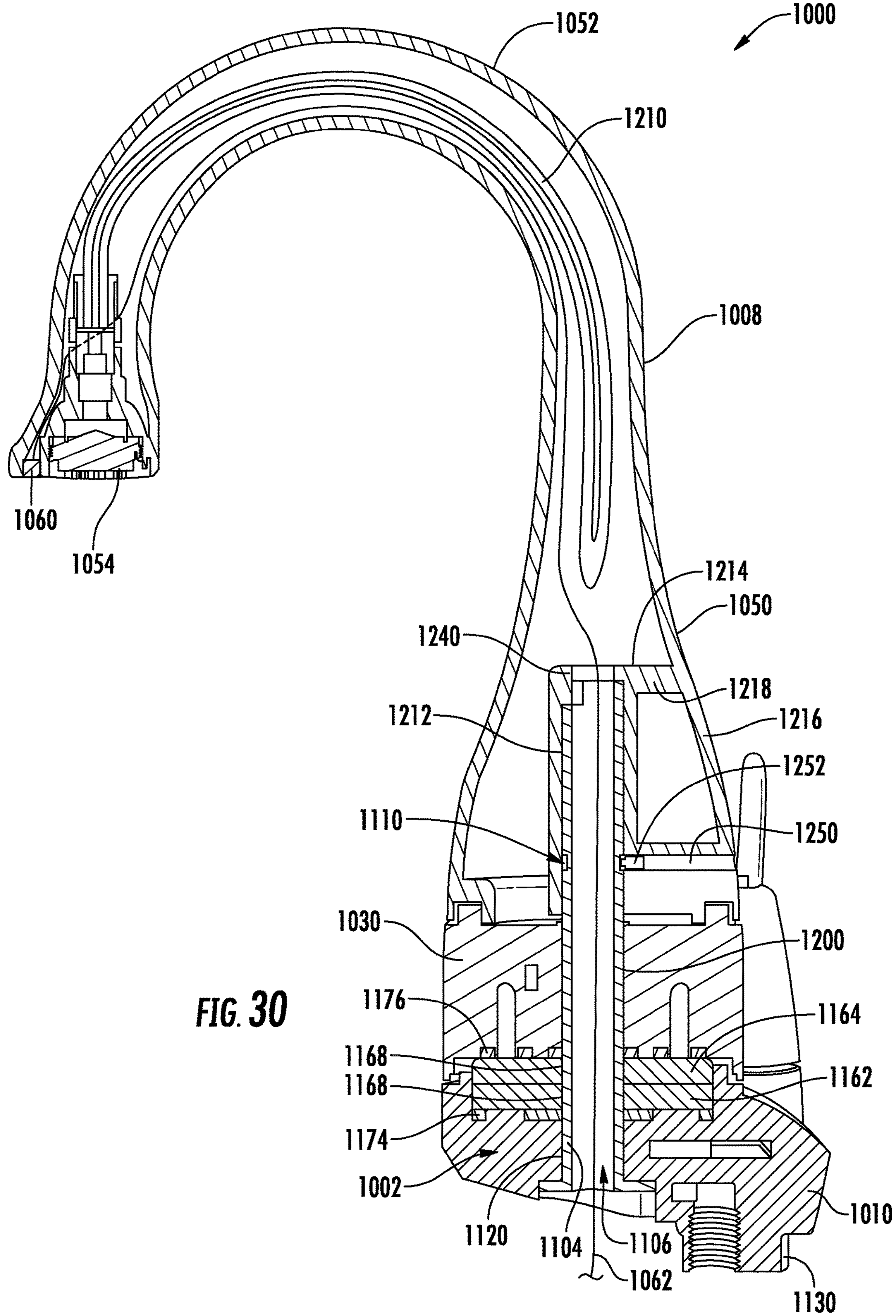
FIG. 30 is a side section view of a combination eyewash and faucet unit, according to an exemplary embodiment.

Referring to FIGS. 27 and 30, in some embodiments, and as alluded to earlier, the fixture 1000 includes a sensor, shown as motion sensor 1060. As shown, the motion sensor 1060 is directly coupled to the nozzle 1054 of the spout section 1008. In other embodiments, the motion sensor 1060 is coupled to another portion of the fixture 1000, such as the body 1050 of the spout section 1008, the collar 1030 of the eyewash arm 1004, or the body 1010 of the base 1002. In some embodiments, the motion sensor 1060 extends through an aperture defined by the spout section 1008 such that the motion sensor 1060 is exposed. In other embodiments, the motion sensor 1060 is hidden (e.g., behind a cover). The motion sensor 1060 is an infrared sensor configured to detect movement of a user in close proximity to the fixture 1000 (e.g., a hand waving below the spout section 1008, etc.). Accordingly, the motion sensor 1060 is configured to provide an indication of the presence of an operator. The motion sensor 1060 is coupled to one or more conductors (e.g., wires, cables, etc.), shown as wires 1062. The wires 1062 extend into the spout section 1008. The wires 1062 operatively couple the motion sensor 1060 to a valve or a valve controller. The valve is configured to supply water (e.g., hot water, cold water, mixed water, etc.) to the spout section 1008 in response to the motion sensor 1060 detecting the presence of a user. The valve may be located within the fixture 1000 or remote from the fixture 1000. In other embodiments, the motion sensor 1060 is replaced with another type of sensor configured to detect the presence of a user (e.g., a capacitive sensor, a button, etc.). In other embodiments, the motion sensor 1060 is positioned remote from the fixture 1000 (e.g., within a post separate from the fixture 1000 and coupled to the support structure 20).

Figure 28:
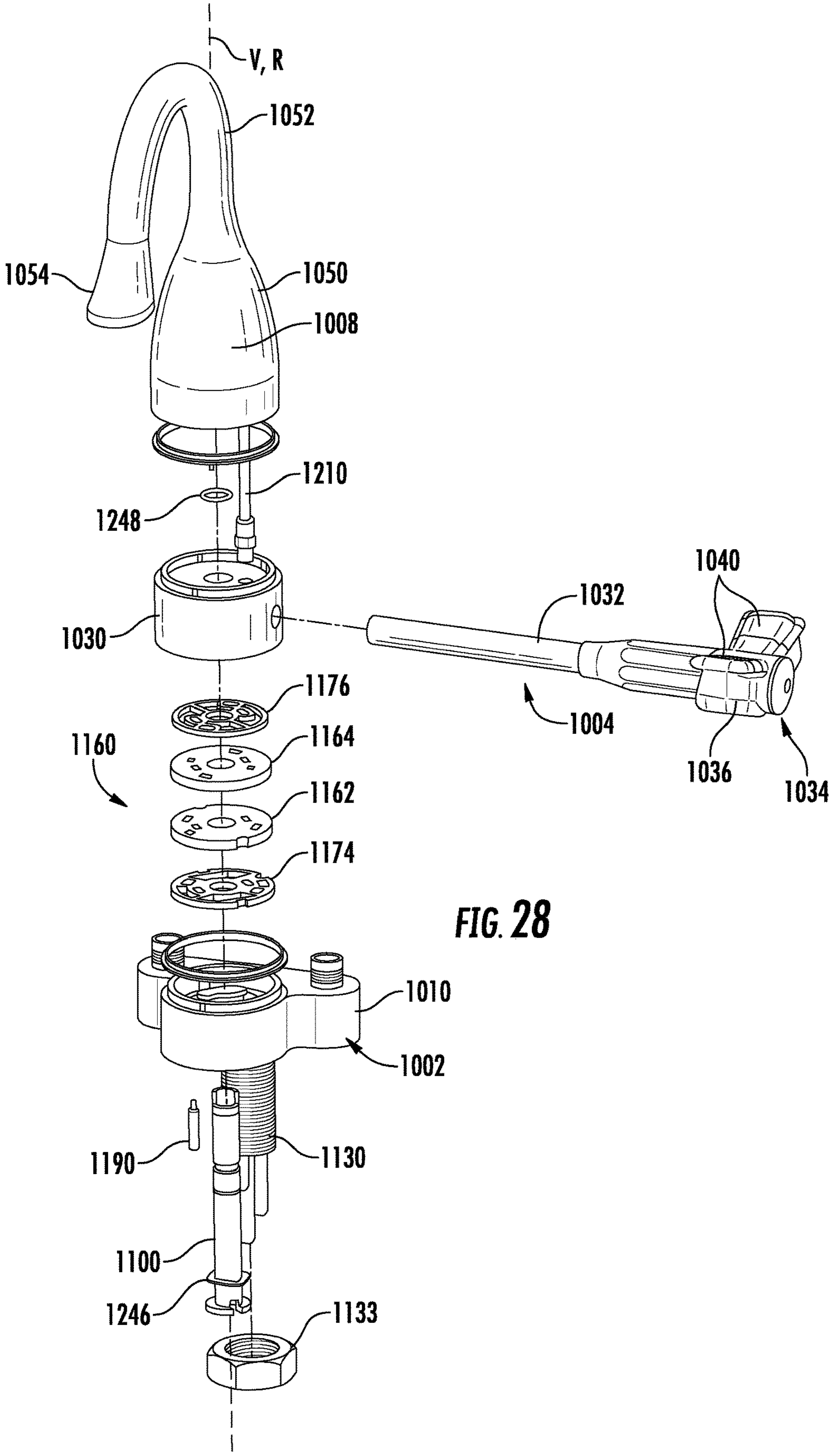
FIG. 28 is an exploded view of the combination eyewash and faucet unit of FIG. 26.
Figure 33:
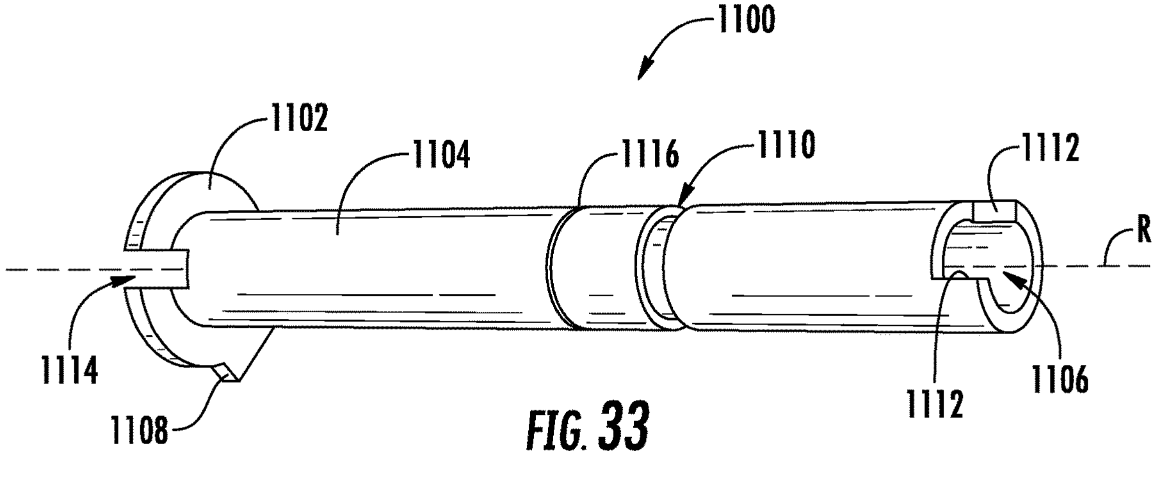
FIG. 33 is a perspective view of a center post of the combination eyewash and faucet unit of FIG. 26, according to an exemplary embodiment.
Figure 34:
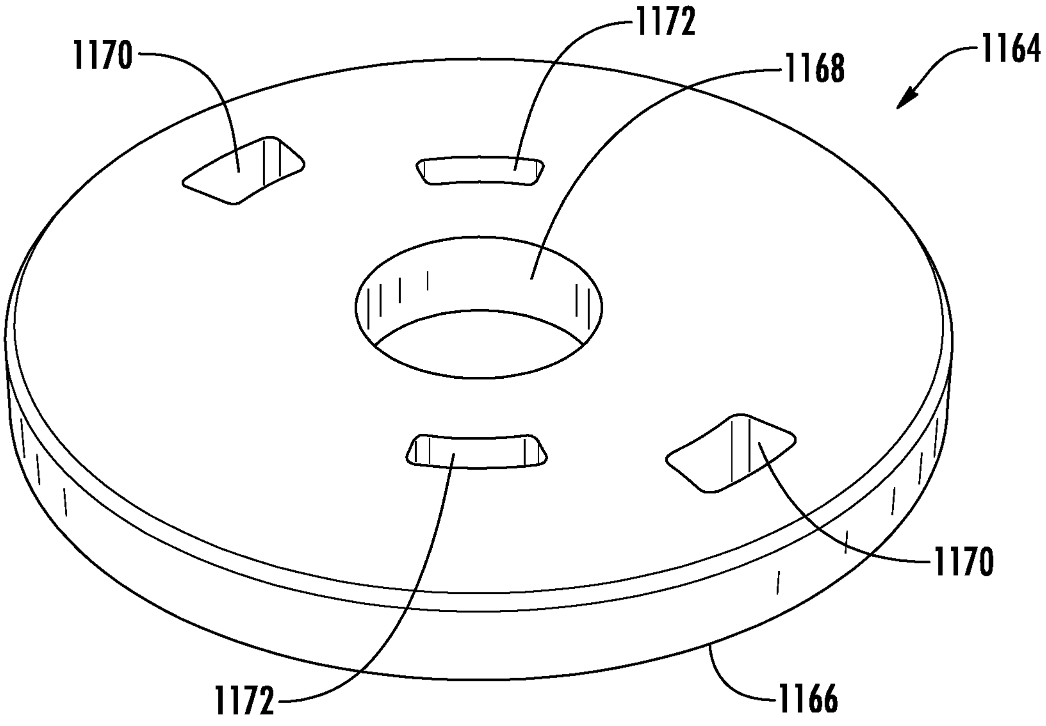
FIG. 34 is a perspective view of a top disk of a puck valve of the combination eyewash and faucet unit of FIG. 26, according to an exemplary embodiment.
Figure 35:
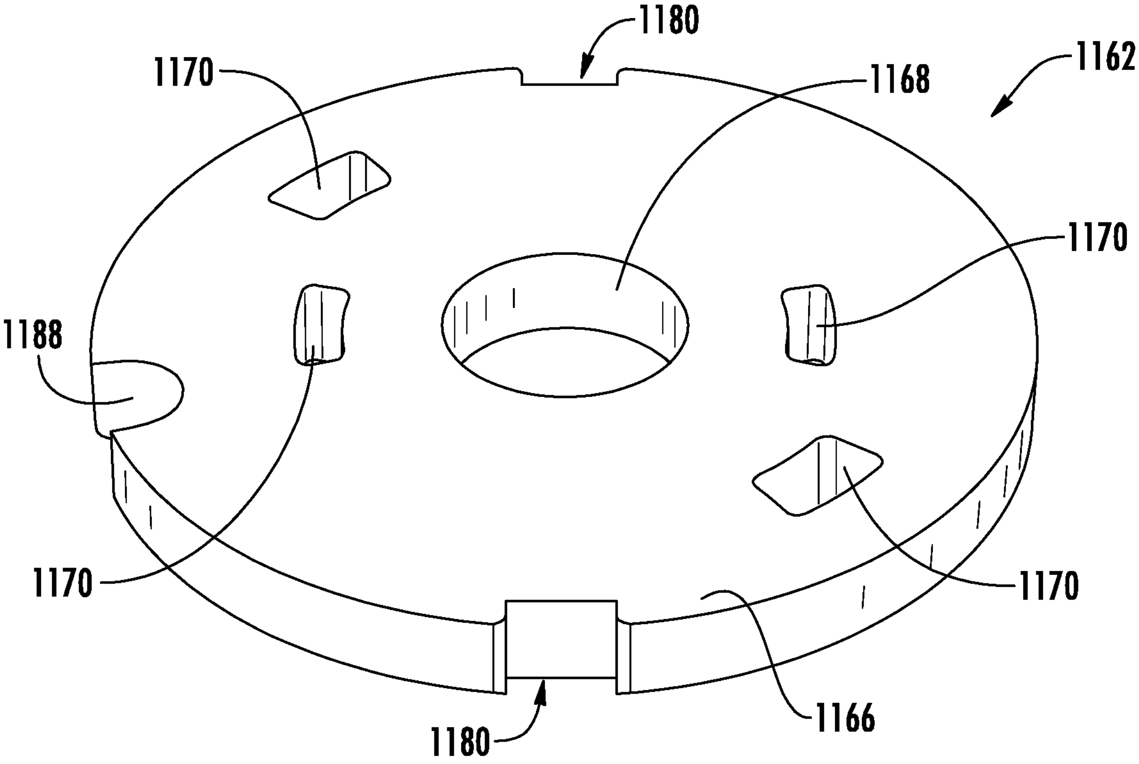
FIG. 35 is a perspective view of a bottom disk of the puck valve of the combination eyewash and faucet unit of FIG. 26, according to an exemplary embodiment.
Figure 36:
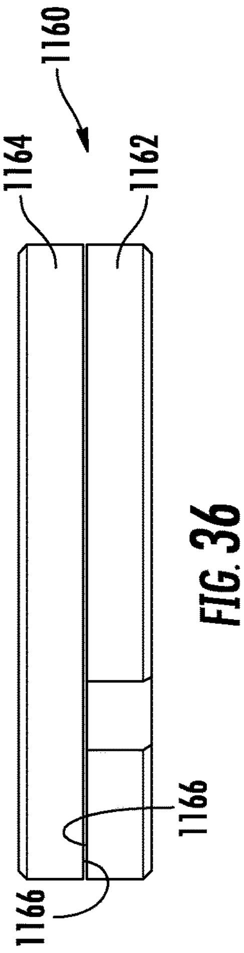
FIG. 36 is a side view of the puck valve of the combination eyewash and faucet unit of FIG. 26.
Figure 37B:
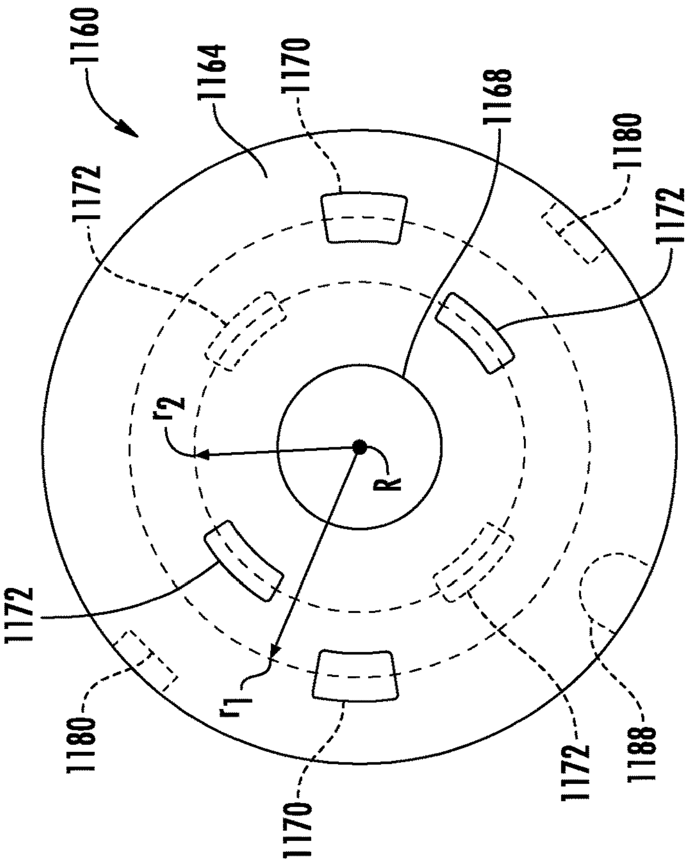
FIG. 37B is a top view of the puck valve of FIG. 36 in a second configuration.
Figure 37A:
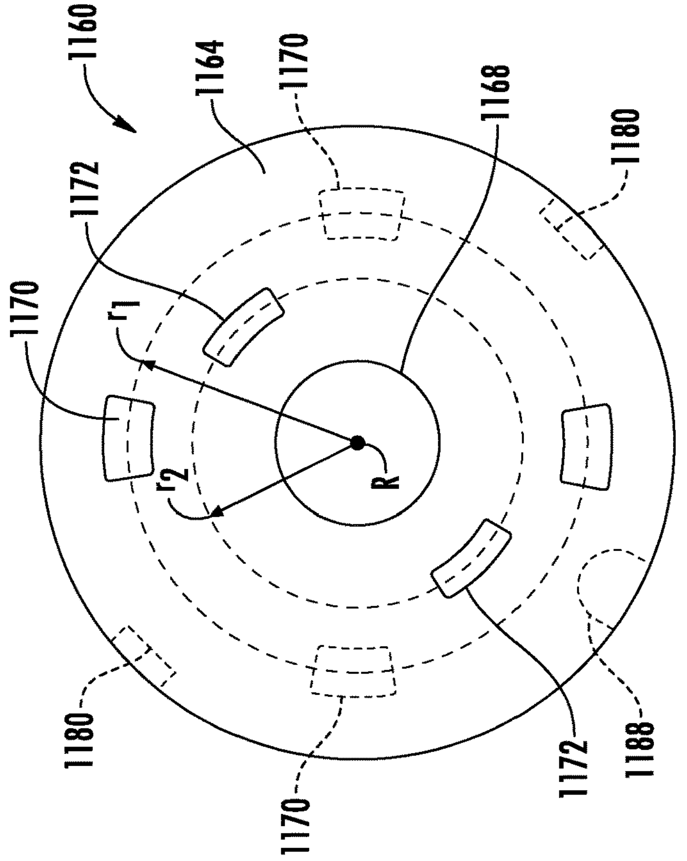
FIG. 37A is a top view of the puck valve of FIG. 36 in a first configuration.

Referring to FIGS. 28 and 33, the base 1002 further includes a support column, tubular member, or shaft, shown as center post 1100. The center post 1100 includes a foot or base, shown as base 1102, and a support column, tubular member, post, or shaft, shown as shaft 1104. As shown, one end of the shaft 1104 coupled to the base 1102. In some embodiments, the shaft 1104 and the base 1102 are integrally formed. The shaft 1104 has a substantially circular cross section. The shaft 1104 and the base 1102 define a passage, shown as central aperture 1106, extending along the entire length of the center post 1100. The base 1102 is primarily circular, having a disk shape. A protrusion, shown as key 1108, extends radially outward from the disk-shaped portion of the base 1102. The key 1108 is rectangular. In other embodiments, the key 1108 is otherwise shaped.

The shaft 1104 defines an annular groove, shown as retaining groove 1110, extending radially inward from the outer surface of the shaft 1104. The retaining groove 1110 extends around the entire circumference of the shaft 1104. In other embodiments, the retaining groove 1110 extends only partway along the circumference of the shaft 1104 (e.g., along 180 degrees of the circumference of the shaft 1104). A notch, groove, or slot is cut into the end of the shaft 1104 opposite the base 1102. The notch, groove, or slot extends approximately 90 degrees along the circumference of the shaft 1104, defining a pair of engagement surfaces 1112. The engagement surfaces 1112 are substantially flat and extend approximately radially outward from the center of the shaft 1104. A slot, groove, or notch, shown as wire slot 1114, extends radially through the base 1102 from the central aperture 1106 to an outer circumference of the base 1102. As shown in FIG. 30, together the central aperture 1106 and the wire slot 1114 define a passage or path through which the wires 1062 extend. This path facilitates entry of wires into the spout section 1008 without them being visually exposed to a user. The shaft 1104 further defines an annular groove, shown as retaining ring groove 1116, extending radially inward from the outer surface of the shaft 1104. The retaining ring groove 1116 extends around the entire circumference of the shaft 1104.

Referring to FIGS. 29A, 29B, 31, and 32, the body 1010 defines an aperture, shown as central aperture 1120, configured to receive the shaft 1104. The central aperture 1120 is located such that the center post 1100 is positioned directly above the depression 12 of the sink 10. The body 1010 additionally defines a recess, slot, or aperture, shown as keying recess 1122, positioned adjacent the central aperture 1120. The keying recess 1122 is shaped and sized to match the outer surface of the base 1102 and the key 1108. Because the key 1108 extends radially outward from the base 1102, the key 1108 engages the wall of the keying recess 1122 and prevents rotation of the center post 1100 relative to the body 1010. Alternatively, the keying recess 1122 can be made larger and/or the key 1108 can be made smaller such that the key 1108 only limits or restricts rotation of the center post 1100 relative to the body 1010 (e.g., such that a limited amount of rotation of the center post 1100 is permitted). In other embodiments, the base 1102 defines a notch, slot, or aperture configured to receive a protrusion from the body 1010. During assembly, the center post 1100 is inserted upward through the central aperture 1120. The shaft 1104 extends upward above the base 1002 along the vertical axis V. In an alternative embodiment, the body 1010 and the center post 1100 are integrally formed as a single component.

The base 1002 further includes a protrusion, shown as mounting neck 1130, extending downward from the body 1010. The mounting neck 1130 is configured to fixedly couple the body 1010 to the sink 10 and the support structure 20. The mounting neck 1130 is configured to extend partially through an aperture defined by the flange 14 of the sink 10 and/or the support structure 20. In the embodiment shown in FIG. 31, the mounting neck 1130 defines a pair of apertures, shown as mounting fastener apertures 1132, that are configured to receive fasteners (e.g., threaded, sized, etc.). The fasteners are tightened against a bottom surface of the sink 10 or the support structure 20 to fixedly couple the body 1010 to the sink 10 and the support structure 20. In the embodiment shown in FIG. 28, the mounting neck 1130 is substantially cylindrical, and the exterior surface of the mounting neck 1130 is threaded. A fastener, shown as nut 1133, is configured to thread onto the mounting neck 1130.

When tightened, the nut 1133 presses against a bottom surface of the sink 10 or the support structure 20 to fixedly couple the base 1002 to the sink 10 and the support structure 20.

Figure 31:
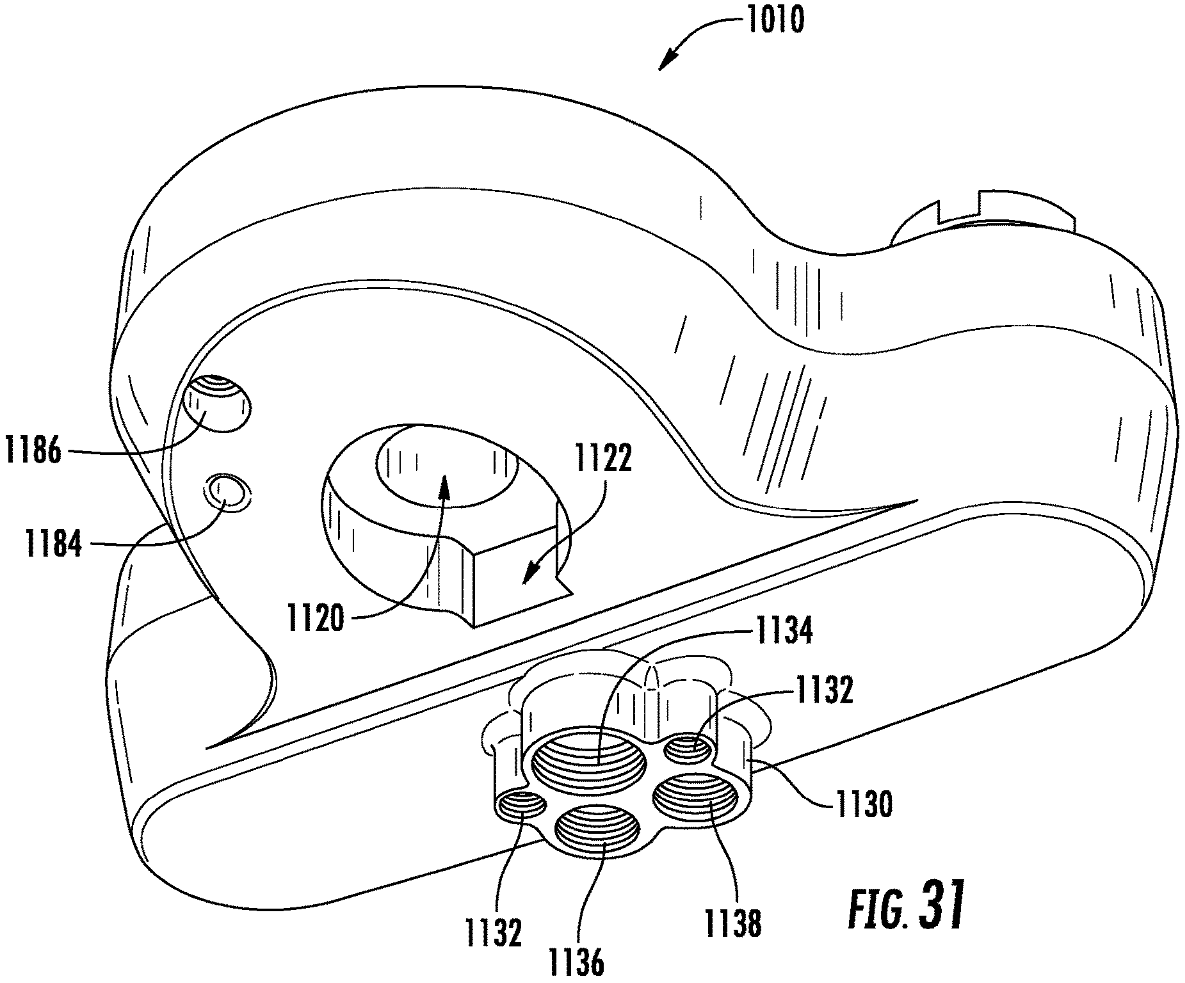
FIGS. 31 and 32 are perspective views of a body of the combination eyewash and faucet unit of FIG. 26, according to an exemplary embodiment.

Referring to FIG. 31, the mounting neck 1130 further defines a series of apertures or passages, shown as tepid water inlet 1134, hot water inlet 1136, and cold water inlet 1138. The tepid water inlet 1134, the hot water inlet 1136, and the cold water inlet 1138 are internally threaded to facilitate coupling to sources of water (e.g., hoses, pipes, etc.). The tepid water inlet 1134 is coupled to a tepid water source (e.g., the tepid water line 194, etc.). The hot water inlet 1136 is coupled to a hot water source (e.g., the hot water line 190). The cold water inlet 1138 is coupled to a cold water source (e.g., the cold water line 192). The tepid water inlet 1134, the hot water inlet 1136, and the cold water inlet 1138 facilitate entry of tepid water, hot water, and cold water, respectively, into the fixture 1000.

Figure 29A:
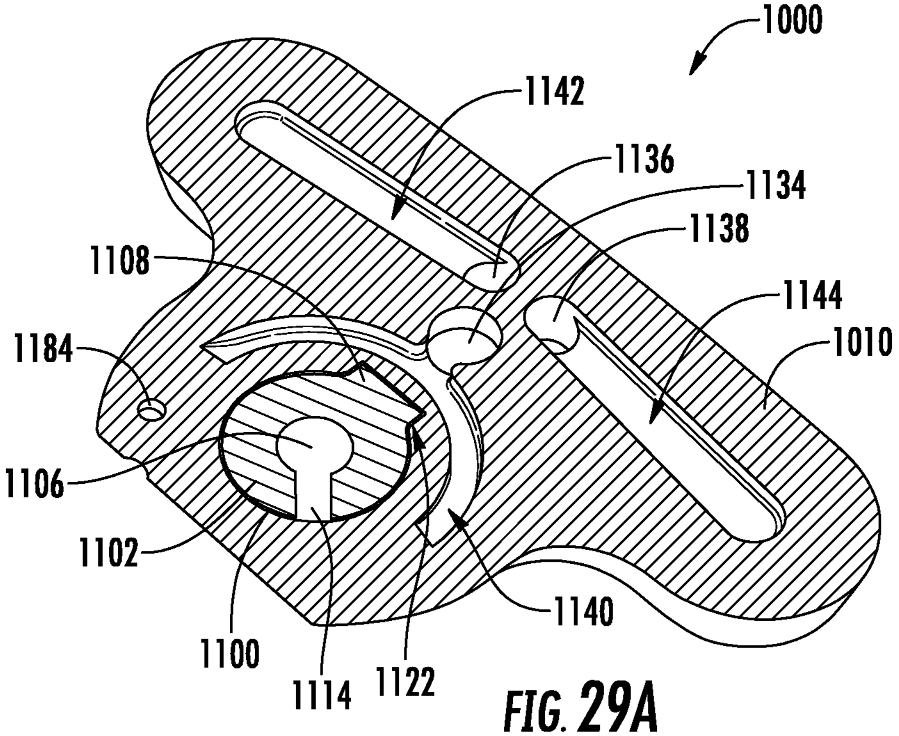
FIGS. 29A-29N are top section views of the combination eyewash and faucet unit of FIG. 26.
Figure 29B:
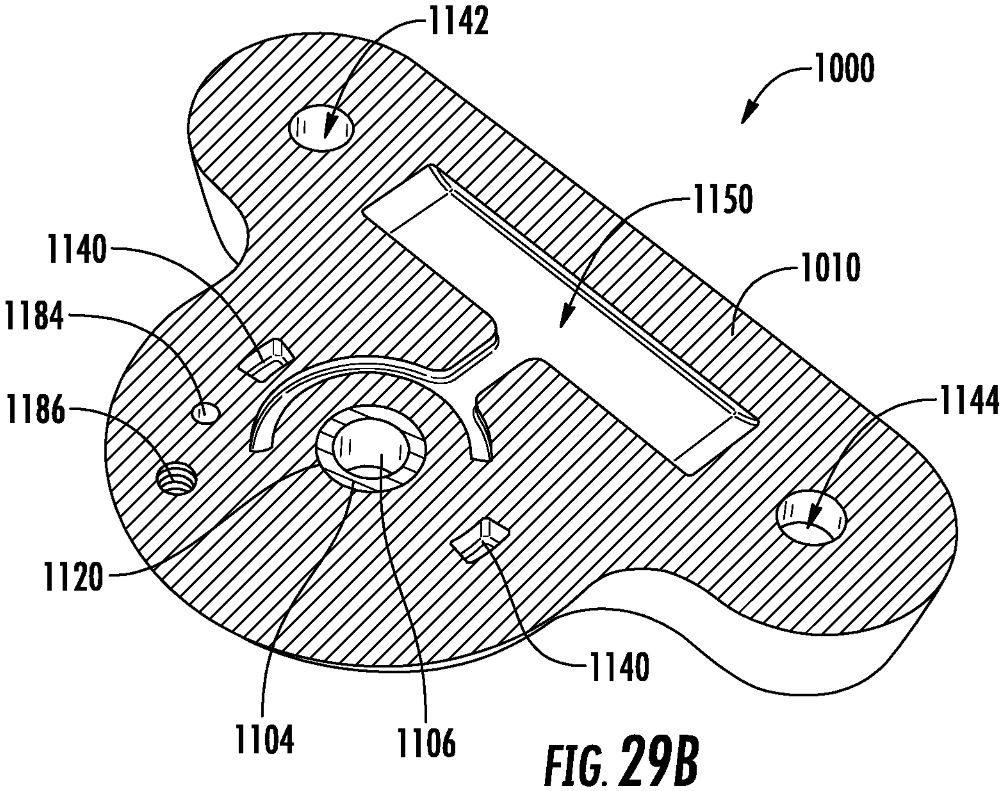

Referring to FIGS. 29A, 29B, and 31, the base 1102 defines a channel, path, or passage, shown as tepid water passage 1140. The tepid water passage 1140 is fluidly coupled to the tepid water inlet 1134. The tepid water passage 1140 extends through the body 1010 from the tepid water inlet 1134. The tepid water passage 1140 extends upward, then extends horizontally, dividing into two equally-sized branches that extend partway around the keying recess 1122. Each branch extends approximately 90 degrees around the keying recess 1122. Each branch then extends upward and through a top surface of the body 1010.

Referring to FIGS. 29A-29D, 31, and 32, the body 1010 defines a pair of channels, paths, or passages, shown as hot water passage 1142 and cold water passage 1144. The hot water passage 1142 and the cold water passage 1144 are symmetrically arranged about a center plane oriented perpendicular to the lateral axis L and centered on the body 1010. The hot water passage 1142 is fluidly coupled to the hot water inlet 1136. The cold water passage 1144 is fluidly coupled to the cold water inlet 1138. The hot water passage 1142 extends upward from the hot water inlet 1136, then extends substantially horizontally and laterally outwards (i.e., away from the center plane). The hot water passage 1142 then extends upward and intersects the bottom of a recess, shown as hot water valve recess 1146. Similarly, the cold water passage 1144 extends upward from the cold water inlet 1138, then extends substantially horizontally and laterally outwards (i.e., away from the center plane). The cold water passage 1144 then extends upward and intersects the bottom of a recess, shown as cold water valve recess 1148.

The hot water valve recess 1146 is configured to receive a valve (e.g., the hot water valve 220) that controls the flow of hot water from the hot water passage 1142 to a channel, path, passage, or mixing chamber, shown as mixed water passage 1150. Likewise, the cold water valve recess 1148 is configured to receive a valve (e.g., the cold water valve 222) that controls the flow of cold water from the cold water passage 1144 to the mixed water passage 1150. The hot water and the cold water that pass through the valves mix within the mixed water passage 1150, becoming mixed water. The mixed water passage 1150 extends laterally inward (i.e., toward the center plate) and downward from the hot water valve recess 1146 and the cold water valve recess 1148. The mixed water passage 1150 then extends horizontally forward, dividing into two branches that extend partway around the central aperture 1120. One branch is shorter than the other branch. Each branch then extends upward and through a top surface of the body 1010. The branches of the mixed water passage 1150 are positioned radially inward of the branches of the tepid water passage 1140. The mixed water passage 1150 is positioned above the tepid water passage 1140.

In alternative embodiments, such as the embodiment shown in FIG. 27, hot and cold water are mixed prior to reaching the fixture 1000, and the fixture 1000 receives the resultant mixed water. In such an embodiment, separate paths for hot and cold water are not necessary. Accordingly, the hot water inlet 1136 and the cold water inlet 1138 are replaced by a single mixed water inlet. In embodiments where the flow of mixed water to the fixture 1000 is controlled remotely (e.g., by a remote valve), the mixed water inlet can be directly fluidly coupled to the mixed water passage 1150. Alternatively, a valve (e.g., a solenoid-operated valve that opens in response to an input from the motion sensor 1060, etc.) can be positioned within the body 1010 between the mixed water inlet and the mixed water passage 1150. The geometry of the mixed water passage 1150 can be modified to reduce the overall size of the body 1010.

Referring to FIGS. 28 and 34-37B, the fixture 1000 further includes a valve assembly, shown as puck valve 1160. The puck valve 1160 includes a first annular member, valve member, or disk-shaped member, shown as bottom disk 1162 and a second annular member, valve member, or disk-shaped member, shown as top disk 1164. The bottom disk 1162 is positioned below the top disk 1164. The bottom disk 1162 and the top disk 1164 are made from a ceramic material. In other embodiments, the bottom disk 1162 and the top disk 1164 are made from another material (e.g., steel, etc.). The bottom disk 1162 and the top disk 1164 each define a flat engagement surface, shown as sealing surface 1166. The sealing surface 1166 of the bottom disk 1162 is a top surface of the bottom disk 1162. The sealing surface 1166 of the top disk 1164 is a bottom surface of the top disk 1164. The sealing surfaces 1166 slidably engage one another. The sealing surfaces 1166 are machined (e.g., lapped, polished, etc.) to be extremely smooth and flat. This creates a seal between the sealing surfaces 1166 and prevents fluid from leaking out between the bottom disk 1162 and the top disk 1164. In some embodiments, an additional coating, such as silicone grease, is applied between the sealing surfaces 1166 to facilitate sealing and relative sliding movement of the bottom disk 1162 and the top disk 1164.

The bottom disk 1162 and the top disk 1164 each further define an aperture, shown as central aperture 1168. The central apertures 1168 are sized to receive the shaft 1104 therethrough. This constrains movement of the bottom disk 1162 and the top disk 1164 to rotation about the axis R of rotation extending through the center of the center post 1100. The bottom disk 1162 and the top disk 1164 each further define a pair of passages, emergency wash apertures, or eyewash apertures, shown as tepid water apertures 1170. Each of the tepid water apertures 1170 have the same shape and size. The tepid water apertures 1170 are centered about the circumference of a circle having a radius $r_1$ centered about the axis R. In the example shown, the tepid water apertures 1170 are diametrically opposed (i.e., offset 180 degrees from one another). The bottom disk 1162 and the top disk 1164 each define a pair of passages or spout apertures, shown as mixed water apertures 1172. Each of the mixed water apertures 1172 have the same shape and size. The mixed water apertures 1172 are centered about the circumference of a circle having a radius $r_2$ centered about the axis R. The mixed water apertures 1172 are diametrically opposed. The radius $r_1$ is larger than the radius $r_2$. This prevents the mixed water apertures 1172 from overlapping with the tepid water apertures 1170 in all positions of the puck valve 1160. The mixed water apertures 1172 are angularly offset approximately 45 degrees from the tepid water apertures 1170. This increases the strength of the bottom disk 1162 and the top disk 1164. The combined cross-sectional area of the tepid water apertures 1170 is greater than the combined cross-sectional area of the mixed water apertures 1172. This facilitates the tepid water flowing more freely than the mixed water, which in turn facilitates a high flow rate of tepid water out of the eyewash 1034, increasing the effectiveness of the eyewash 1034.

When the tepid water apertures 1170 or the mixed water apertures 1172 do not overlap, the pressure of the tepid water or the mixed water imparts an upward force on the sealing surface 1166 of the top disk 1164. Because the tepid water apertures 1170 are diametrically opposed, both positioned at the same distance from the axis R, and the same size and shape, the upward forces from the tepid water produce no net moment load on the top disk 1164. Similarly, because the mixed water apertures 1172 are diametrically opposed, both positioned at the same distance from the axis R, and the same size and shape, the upward forces from the mixed water produce no net moment load on the top disk 1164. A net moment load could cause the top disk 1164 to rotate about a horizontal axis, causing a leak between the sealing surfaces 1166. Other arrangements could produce similar effects. By way of example, the top disk 1164 and the bottom disk 1162 can include three tepid water apertures 1170 each spaced evenly around the axis R. By way of another example, the top disk 1164 and the bottom disk 1162 can each include one relatively small tepid water aperture 1170 that is relatively far from the axis R and one relatively large tepid water aperture 1170 that is relatively close to the axis R, where both of the tepid water apertures 1170 are diametrically opposed.

In other embodiments, the relative size, shape, and positions of the tepid water apertures 1170 and the mixed water apertures 1072 are varied. By way of example, the cross-sectional areas of the tepid water apertures 1170 and the mixed water apertures 1072 can be varied. By way of another example, the radius $r_1$ and/or the radius $r_2$ can be varied. By way of another example, the quantities of the tepid water apertures 1170 and the mixed water apertures 1072 can be varied. By way of another example, the cross-sectional shapes of the tepid water apertures 1170 and the mixed water apertures 1072 can be varied. In a further alternative embodiment, the fixture 1000 includes a valve assembly made up of two puck valves 1160. The first puck valve defines the tepid water apertures 1170, and the second valve defines the mixed water apertures 1172.

When the tepid water apertures 1170 overlap (e.g., partially, completely), the puck valve 1160 permits the flow of tepid water through the puck valve 1160. When the tepid water apertures 1170 do not overlap, the puck valve 1160 prevents the flow of tepid water through the puck valve 1160, fluidly decoupling the tepid water inlet 1134 from the eyewash 1034. When the mixed water apertures 1172 overlap (e.g., partially, completely), the puck valve 1160 permits the flow of mixed water through the puck valve 1160. When the mixed water apertures 1172 do not overlap, the puck valve 1160 prevents the flow of mixed water through the puck valve 1160, fluidly decoupling the hot water inlet 1136 and the cold water inlet 1138 from the spout section 1008.

Figure 29C:
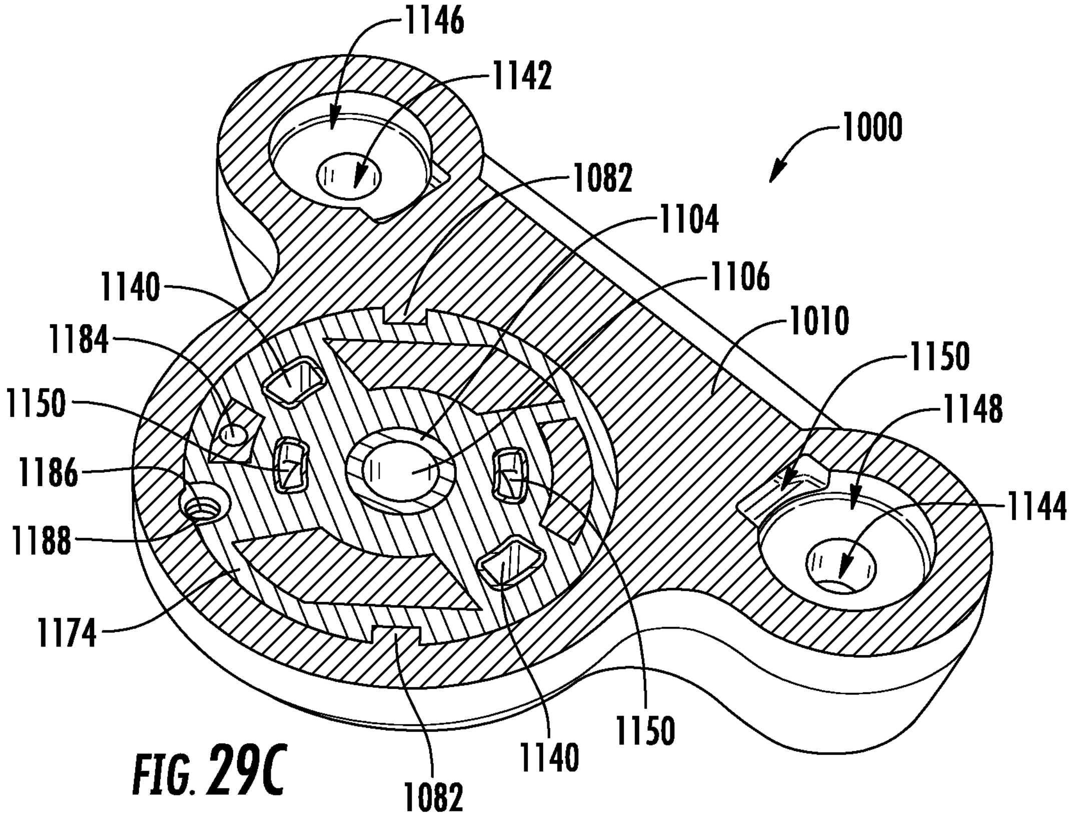
Figure 29D:
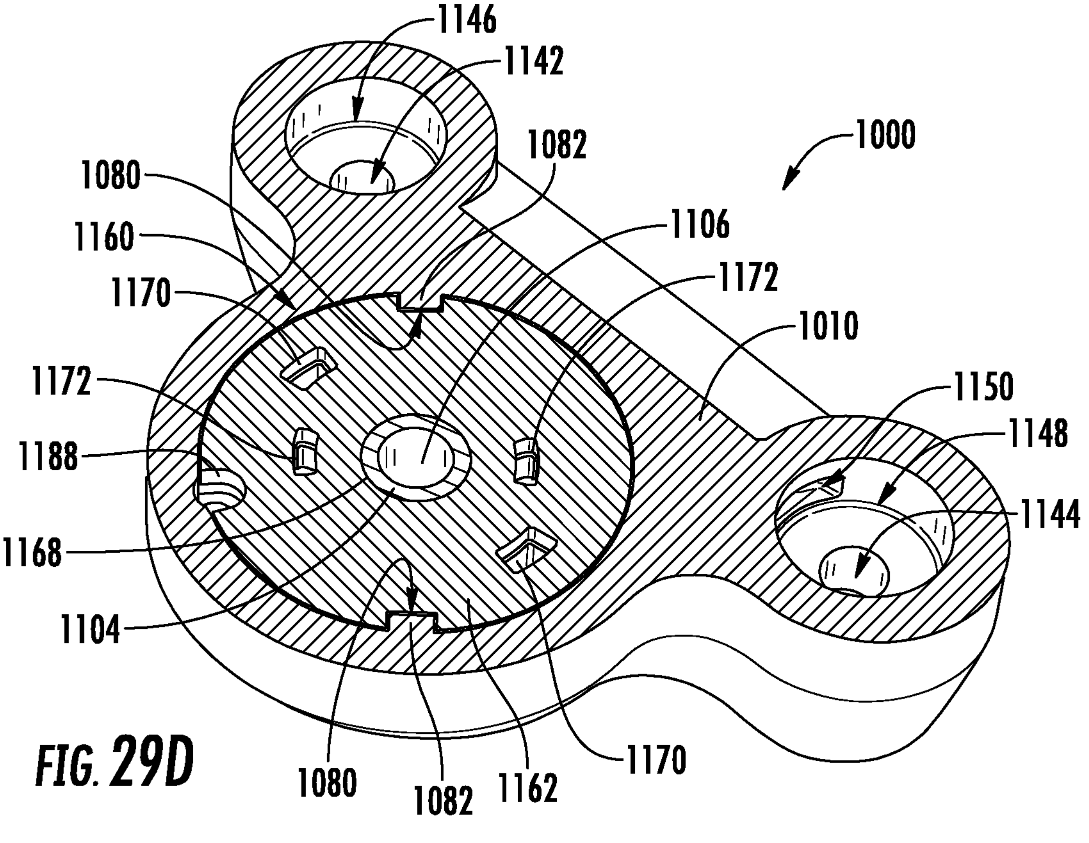

Referring to FIGS. 29C and 29D, the bottom disk 1162 is coupled to the base 1002. In this orientation, the tepid water apertures 1170 of the bottom disk 1162 overlap the tepid water passage 1140 completely. Specifically, the portions of the tepid water passage 1140 that extend upward to the top surface of the body 1010 have the same shape and size as the tepid water apertures 1170. Accordingly, the tepid water passage 1140 is fluidly coupled to the tepid water apertures 1170 of the bottom disk 1162. The mixed water apertures 1172 of the bottom disk 1162 overlap the mixed water passage 1150 completely. Specifically, the portions of the mixed water passage 1150 that extend upward to the top surface of the body 1010 have the same shape and size as the mixed water apertures 1172. Accordingly, the mixed water passage 1150 is fluidly coupled to the mixed water apertures 1172 of the bottom disk 1162.

Figure 29E:
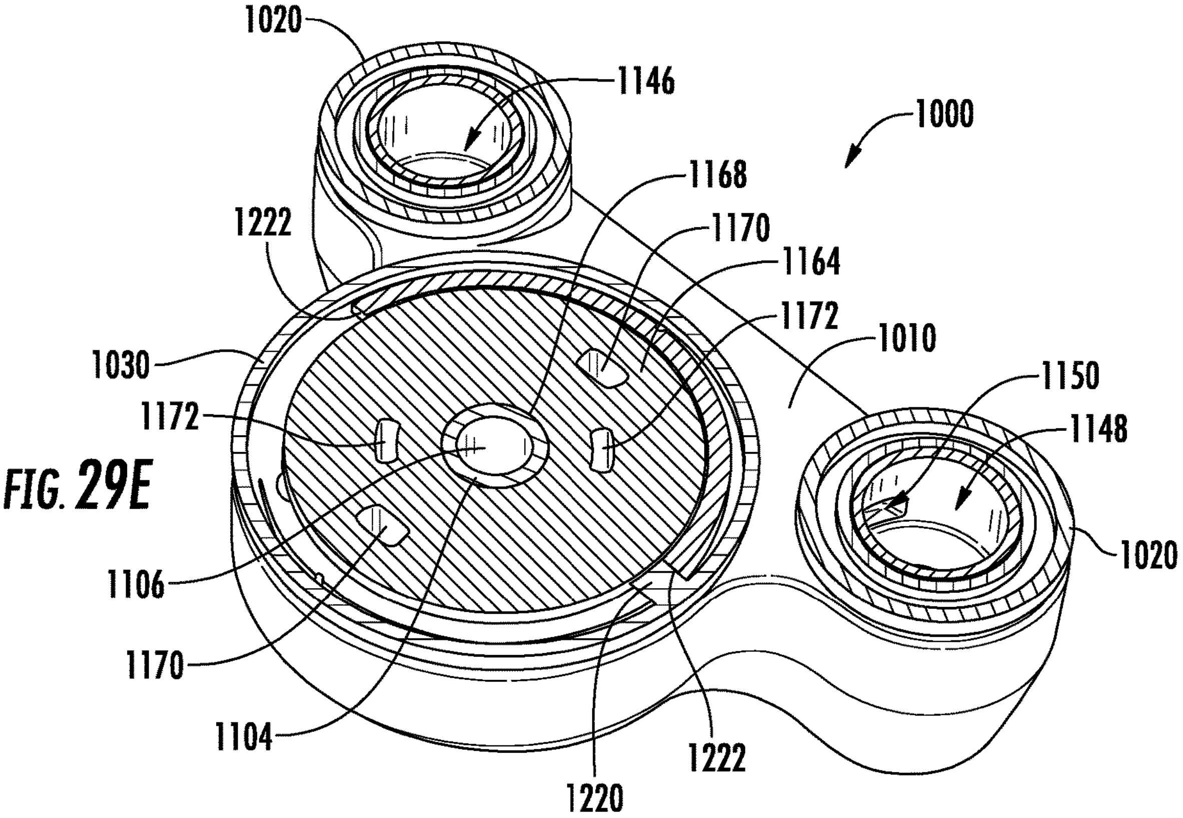
Figure 29F:
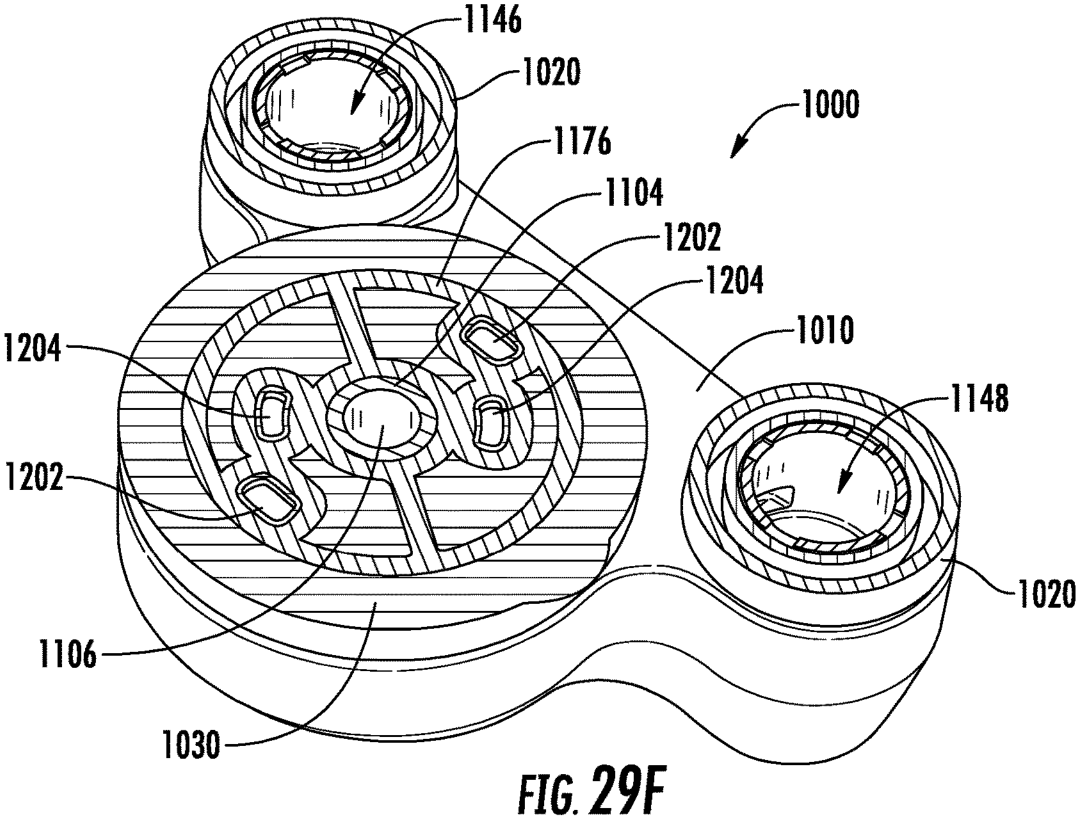

A first resilient member or sealing member, shown as bottom seal 1174, engages both the body 1010 and the bottom disk 1162. The bottom seal 1174 surrounds each of the tepid water apertures 1170 and each of the mixed water apertures 1172 of the bottom disk 1162, forming a seal between the body 1010 and the bottom disk 1162. In some embodiments, the body 1010 defines a recess that receives the bottom seal 1174. The bottom seal 1174 prevents tepid water and mixed water from leaking out between the body 1010 and the bottom disk 1162. Similarly, as shown in FIGS. 29E and 29F, the top disk 1164 is coupled to the collar 1030. A second resilient member or sealing member, shown as top seal 1176, engages both the collar 1030 and the top disk 1164. The top seal 1176 prevents tepid water and mixed water from leaking out between the top disk 1164 and the collar 1030.

The bottom disk 1162 is rotationally coupled to the body 1010, and the top disk 1164 is rotationally coupled to the collar 1030. This rotational coupling can be accomplished in multiple different ways. As shown in FIG. 29D, the bottom disk 1162 defines a pair of recesses, slots, or apertures, shown as keying recesses 1180. The keying recesses 1180 extend radially inward from the circumference of the bottom disk 1162. The base 1002 defines a pair of protrusions, shown as keys 1182, that are received within the keying recesses 1180. The keys 1182 and the keying recesses 1180 are correspondingly sized and shaped to prevent rotation of the bottom disk 1162 relative to the body 1010. A similar arrangement can be used to rotationally couple the top disk 1164 to the collar 1030. Additionally or alternatively, an adhesive, such as epoxy or cyanoacrylate, can be used to fixedly couple the bottom disk 1162 to the body 1010 and/or to couple the top disk 1164 to the collar 1030. In such embodiments, the adhesive can create a seal between the bottom disk 1162 and the body 1010 and/or between the top disk 1164 and the collar 1030. Accordingly, the bottom seal 1174 and/or the top seal 1176 can be omitted in such embodiments.

Figure 32:
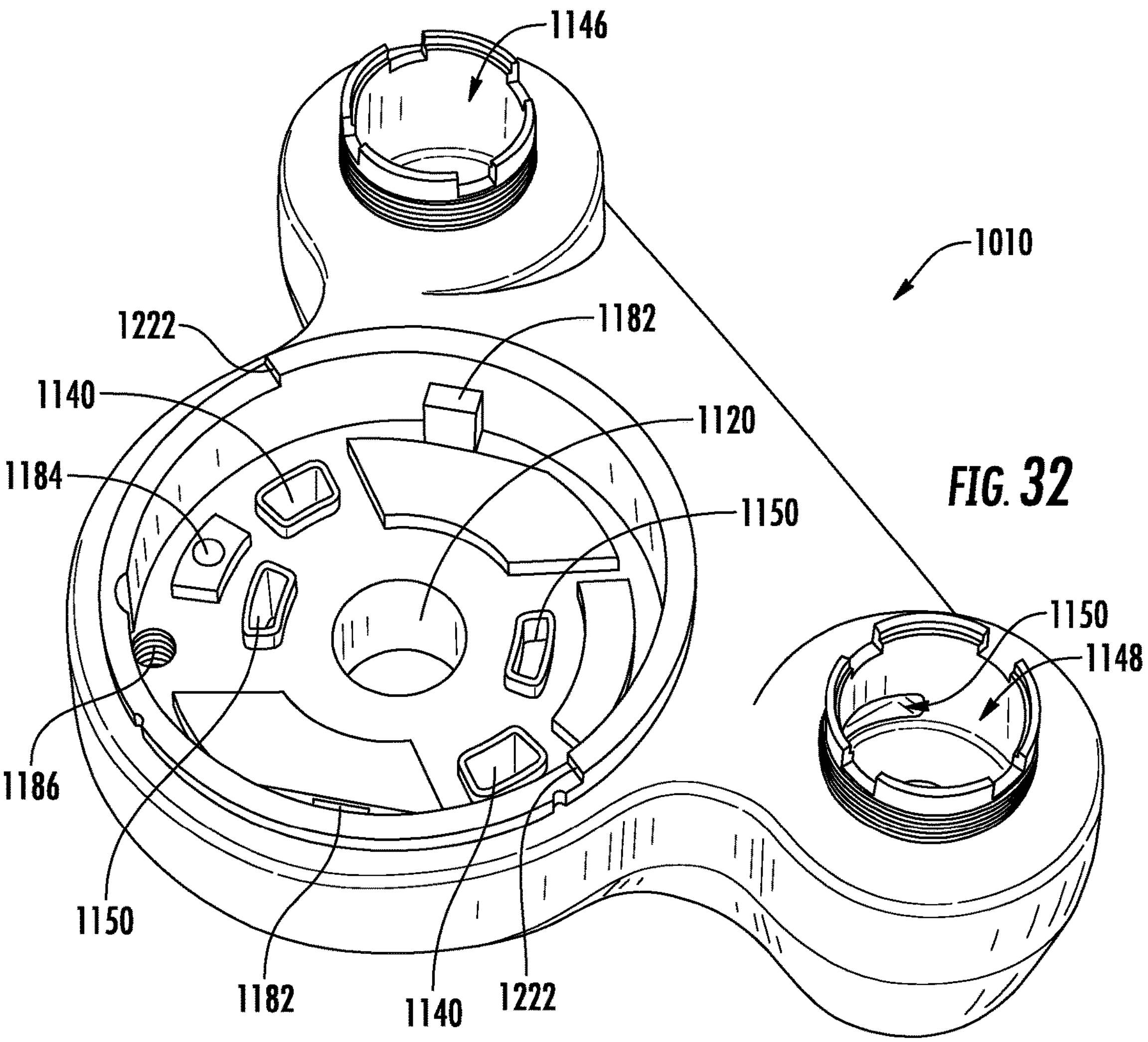

Referring to FIGS. 31 and 32, an aperture or passage, shown as weep hole 1184, is defined by the base 1002. Specifically, the weep hole 1184 extends through the body 1010 from directly beneath the bottom disk 1162 to the bottom of the body 1010 directly above the depression 12 of the sink 10. The weep hole 1184 fluidly couples the interior of the body 1010 to the surroundings. Fluid can potentially accumulate within the body 1010 from a number of sources. Fluid can condense from humidity within the air onto surfaces of the body 1010, the puck valve 1160, and the collar 1030. Additionally or alternatively, fluid flowing through fixture 1000 has the potential to leak (e.g., between the sealing surfaces 1166, etc.) into the interior of the body 1010. The weep hole 1184 permits the accumulated fluid or at least a portion thereof fluid within the interior of the body 1010 to exit the fixture 1000 due to the force of gravity. This prevents growth of mold or other contaminants within the fixture 1000, reducing the potential for contaminants to contact the user during operation. Because the weep hole 1184 is directly above the depression 12, the fluid is deposited directly into the sink 10. In other embodiments, the size and/or shape of the weep hole 1184 and/or the position of the weep hole 1184 on the body 1010 are varied. In yet other embodiments, the weep hole 1184 is omitted.

Referring to FIGS. 28, 29C, 31, and 32, the body 1010 further defines an aperture or passage, shown as detent passage 1186. The detent passage 1186 is threaded with an internal thread. The detent passage 1186 extends from a bottom surface of the body 1010 to a top surface of the body 1010. The detent passage 1186 is aligned with a slot, aperture, or passage, shown as detent passage 1188, defined by the bottom disk 1162. The detent passage 1186 and the detent passage 1188 are configured to receive a detent assembly 1190 therethrough. The exterior of the detent assembly 1190 is threaded such that the detent assembly 1190 can be threaded into engagement with the detent passage 1186. Turning the detent assembly 1190 controls the vertical position of the detent assembly 1190 relative to the body 1010. The detent assembly 1190 includes a ball bearing or other round object that is biased upward (e.g., by a compression spring). The detent assembly 1190 is configured to engage corresponding recesses defined in the top disk 1164. Alternatively, the recesses can be defined by the collar 1030. The recesses are positioned such that the detent assembly 1190 engages the recesses when the eyewash arm 1004 is in certain target orientations. As the eyewash arm 1004 rotates into one of the target orientations, the ball bearing is biased into a corresponding recess. To rotate the eyewash arm 1004 out of the target orientation, a threshold torque must be applied to the eyewash arm 1004 to overcome the biasing force of the biasing member and force the ball bearing out of the recess. The detent assembly 1190 facilitates holding the eyewash arm 1004 in one of a number of target orientations (e.g., an active orientation, a stored orientation, etc.) until a user applies the threshold torque to rotate the eyewash arm 1004.

Figure 29G:
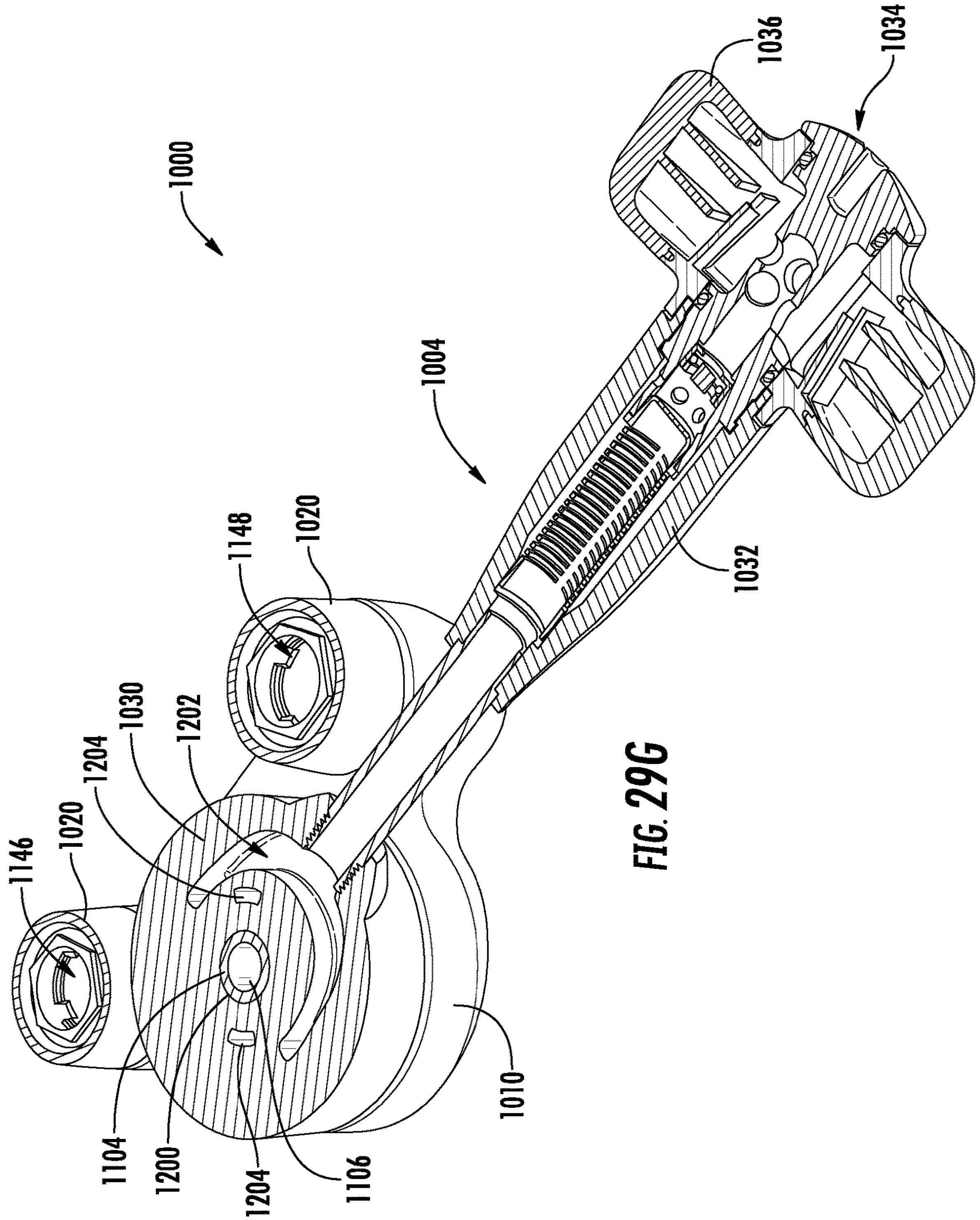
Figure 29H:
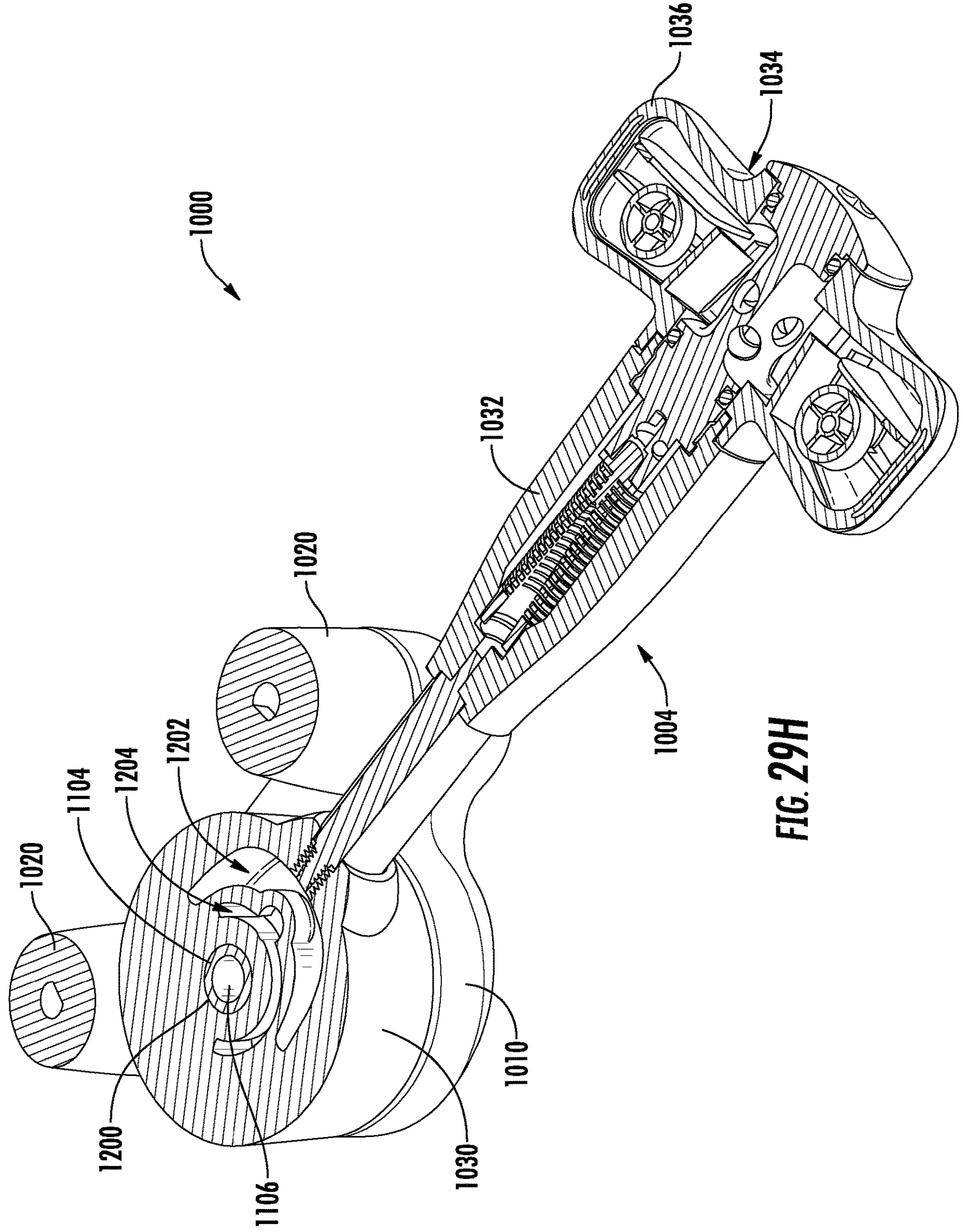
Figure 29I:
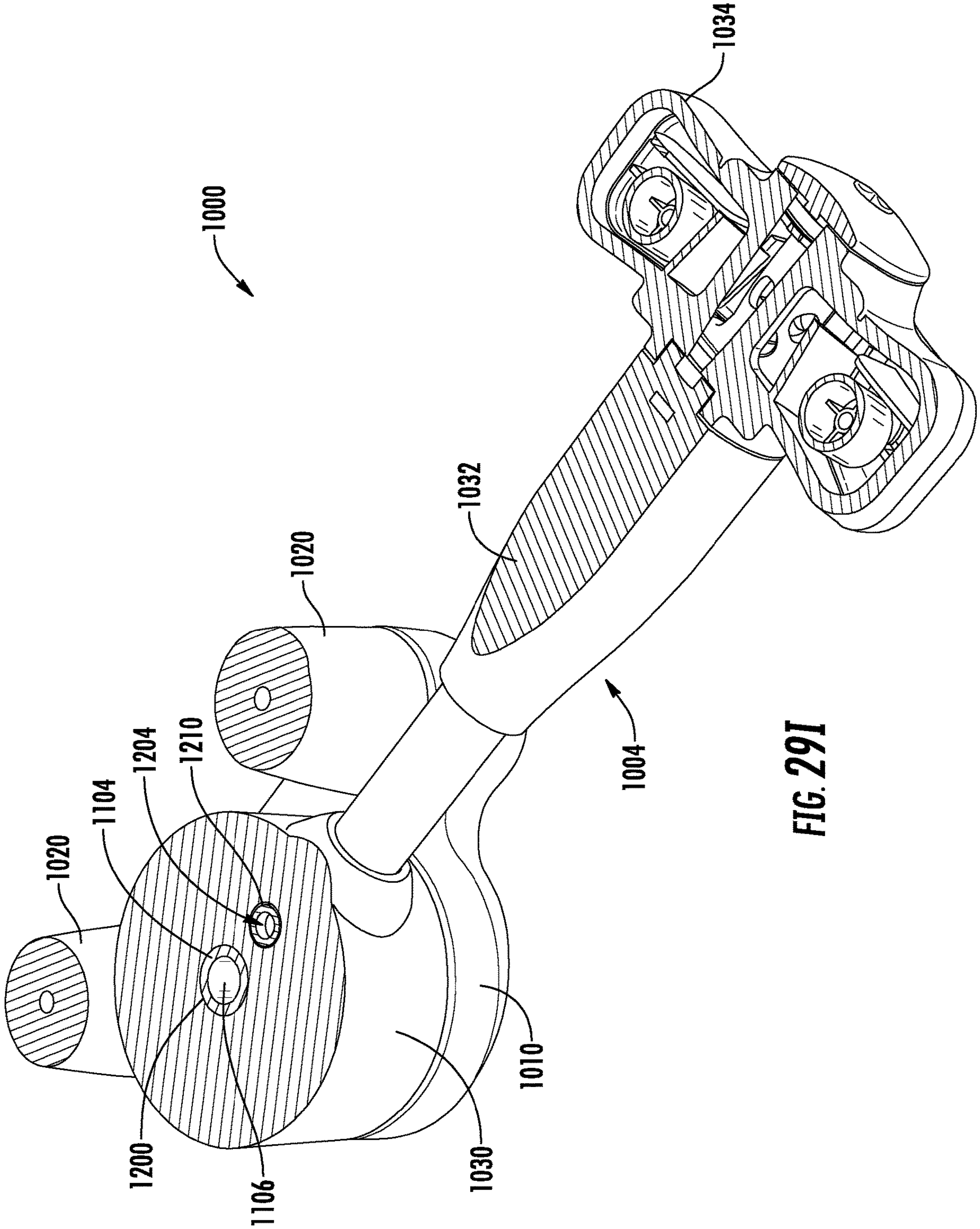

Referring to FIG. 29G, the collar 1030 defines an aperture, shown as central aperture 1200. The central aperture 1200 is configured to receive the shaft 1104 to rotatably couple the collar 1030 and the other components of the eyewash arm 1004 to the base 1002. The central aperture 1200 extends vertically through the center of the collar 1030. The central aperture 1200 and the shaft 1104 are correspondingly sized and each have a circular cross section. Accordingly, the shaft 1104 rotatably couples the eyewash arm 1004 to the body 1010 such that the eyewash arm 1004 rotates about the axis R, which extends vertically through the center of the shaft 1104.

Referring to FIGS. 29F-29J, the collar 1030 further defines a channel, path, or passage, shown as tepid water passage 1202 and a channel, path, or passage, shown as mixed water passage 1204. The tepid water passage 1202 has two branches that overlap the tepid water apertures 1170 of the top disk 1064 completely. Accordingly, the tepid water passage 1202 is fluidly coupled to the tepid water apertures 1070. Similarly, the mixed water passage 1204 has two branches that overlap the mixed water apertures 1172 of the top disk 1164 completely. Accordingly, the mixed water passage 1204 is fluidly coupled to the mixed water apertures 1172 of the top disk 1164. The top seal 1176 surrounds each branch of the tepid water passage 1202 and each branch of the mixed water passage 1204 between the top disk 1164 and the collar 1030. In some embodiments, the collar 1030 defines a recess that receives the top seal 1176. The top seal 1176 prevents leakage of water between the top disk 1164 and the collar 1030.

The branches of the tepid water passage 1202 extend upward through the collar 1030 and then horizontally around the central aperture 1200, eventually converging to form a unified passage. The unified passage extends horizontally through a side of the collar 1030. The tepid water passage 1202 is fluidly coupled to the extension portion, which is in turn fluidly coupled to the eyewash 1034. Accordingly, the eyewash 1034 is selectively fluidly coupled to the tepid water inlet 1134 through the tepid water passage 1140, the tepid water apertures 1070, the tepid water passage 1202, and the extension portion 1032. The flow of tepid water is interrupted when the tepid water apertures 1070 do not overlap.

The branches of the mixed water passage 1204 extend upward through the collar 1030 and then horizontally around the central aperture 1200, eventually converging to form a unified passage. The mixed water passage 1204 extends above the tepid water passage 1202. The unified portion of the mixed water passage 1204 is fluidly coupled to a conduit (e.g., a tube, a pipe, a hose, etc.), shown as hose 1210. The hose 1210 includes a fitting that is coupled to (e.g., threaded into) the collar 1030. The hose 1210 extends through the body 1050 and the spout 1052 and meets the nozzle 1054, fluidly coupling the mixed water passage 1204 to the nozzle 1054. The hose 1210 may be flexible to facilitate rotation of the eyewash arm 1004 relative to the spout section 1008. Accordingly, the nozzle 1054 is selectively fluidly coupled to the hot water inlet 1136 through the hot water passage 1142, the hot water valve recess 1146, the hot water valve, the mixed water passage 1150, the mixed water apertures 1172, the mixed water passage 1204, and the hose 1210. The flow of hot water is interrupted when the mixed water apertures 1172 do not overlap or when the hot water valve is closed. The nozzle 1054 is selectively fluidly coupled to the cold water inlet 1138 through the cold water passage 1144, the cold water valve recess 1148, the cold water valve, the mixed water passage 1150, the mixed water apertures 1172, the mixed water passage 1204, and the hose 1210. The flow of cold water is interrupted when the mixed water apertures 1172 do not overlap or when the cold water valve is closed.

Figure 29J:
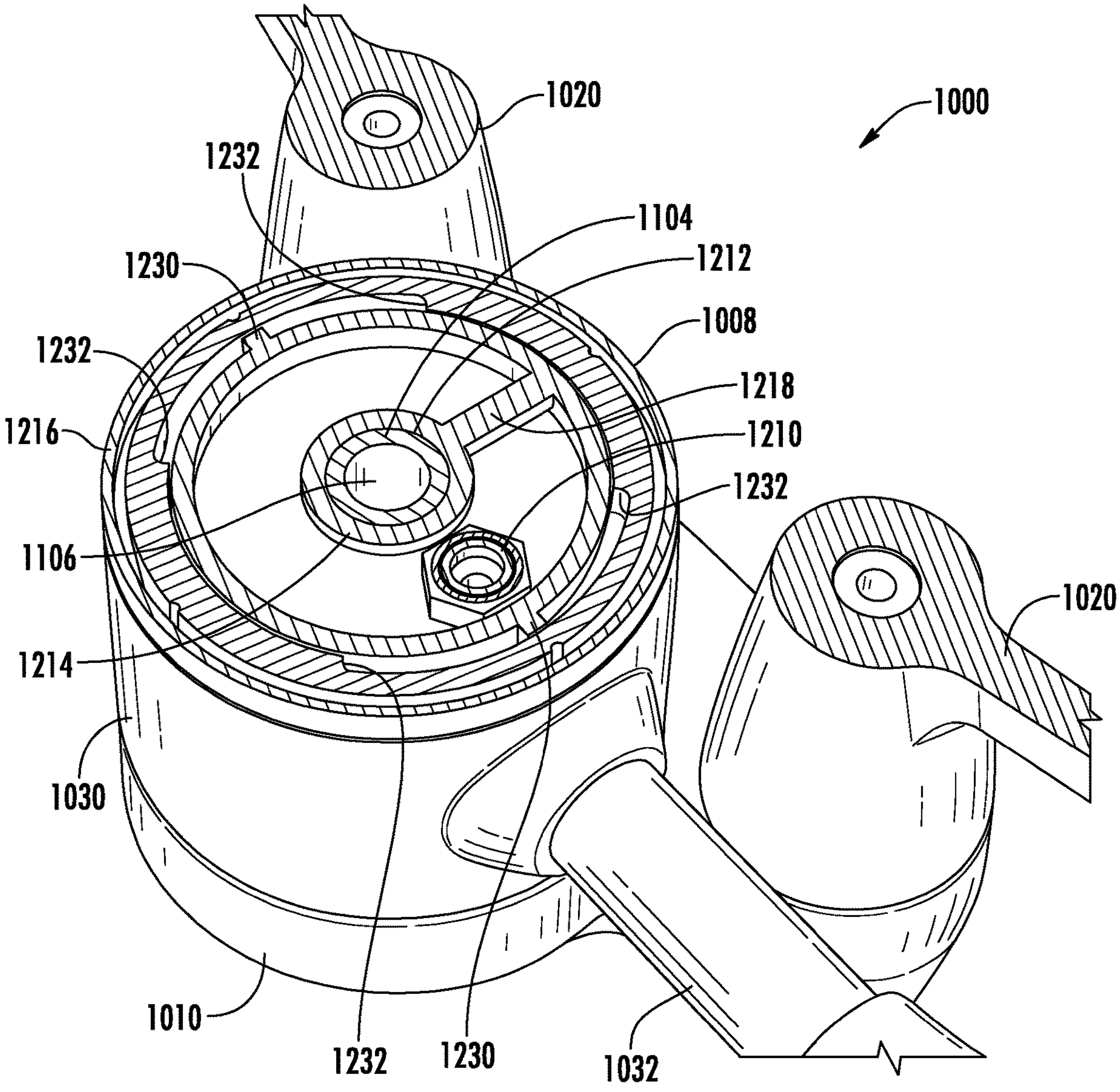

Referring to FIGS. 29J-30, the spout section 1008 defines an aperture, shown as central aperture 1212, configured to receive the shaft 1104. Specifically, the body 1050 of the spout section 1008 includes a center post 1214 that is received within an outer shell 1216. The center post 1214 is coupled to the outer shell 1216 by a series of standoffs 1218, leaving the majority of the inner volume of the spout section 1008 open for the wires 1062 and the hose 1210 to pass through. The center post 1214 defines the central aperture 1212. The central aperture 1212 is configured to receive the shaft 1104 to rotatably or pivotally couple the spout section 1008 to the base 1002. The central aperture 1212 extends vertically through the body 1050. The central aperture 1212 and the shaft 1104 are correspondingly sized and each have a circular cross section. Accordingly, the shaft 1104 rotatably couples the spout section 1008 to the base 1002 such that the spout section 1008 rotates about the axis R, which extends vertically through the center of the shaft 1104.

Referring to FIG. 29E, the collar 1030 includes a radial protrusion, shown as stop 1220, that extends radially inward from an outer surface of the collar 1030. The stop 1220 defines a pair of opposing engagement surfaces. The body 1010 of the base 1002 defines a pair of engagement surfaces

1222. The engagement surfaces 1222 are configured to engage the engagement surfaces of the stop 1220 to limit rotation of the eyewash arm 1004 relative to the base 1002. At one extreme (e.g., corresponding to a first stored position of the eyewash arm 1004), one engagement surface of the stop 1220 engages one of the engagement surfaces 1222, preventing the eyewash arm 1004 from rotating farther in a first direction. At the other extreme, (e.g., corresponding to a second stored position of the eyewash arm 1004), the other engagement surface of the stop 1220 engages the other engagement surface 1222, preventing the eyewash arm 1004 from rotating farther in a second direction opposite the first direction. Between the extremes, the eyewash arm 1004 is permitted to rotate freely. As shown, the stop 1220 and the engagement surfaces 1222 permit the eyewash arm 1004 to rotate approximately 180 degrees. This rotation range of the eyewash arm 1004 is approximately centered about an orientation of the eyewash arm 1004 where the eyewash arm 1004 extends along the depth axis D (e.g., the active position of the eyewash arm 1004). In other embodiments, the stop 1220 and/or the engagement surfaces 1222 are otherwise positioned to increase or decrease the rotation range of the eyewash arm 1004. In an alternative embodiment, the body 1010 includes the stop 1220 and the collar 1030 defines the engagement surfaces 1222.

Referring to FIG. 29J, the spout section 1008 includes a pair of radial protrusions, shown as stops 1230, that extend radially outward. The stops 1230 are diametrically opposed and similarly sized and shaped. Each stop 1230 defines a pair of opposing engagement surfaces. The collar 1030 further defines two pairs of engagement surfaces 1232. Each pair of engagement surfaces 1232 are configured to engage the engagement surfaces of one of the stops 1230 to limit rotation of the spout section 1008 relative to the eyewash arm 1004. At one extreme, one engagement surface of each stop 1230 engages one of the corresponding pair of engagement surfaces 1232, preventing the spout section 1008 from rotating farther in a first direction. At the other extreme, the other engagement surface of each stop 1230 engages the other engagement surface 1232 of the corresponding pair of engagement surfaces 1232, preventing the spout section 1008 from rotating farther in a second direction opposite the first direction. Between the extremes, the spout section 1008 is permitted to rotate freely relative to the eyewash arm 1004. When the spout section 1008 is at one of the extremes, further rotation of the spout section 1008 will cause both the spout section 1008 and the eyewash arm 1004 to rotate in unison. Similarly, when the spout section 1008 is at one of the extremes, rotation of the eyewash arm 1004 can cause the spout section 1008 to rotate in unison with the eyewash arm 1004. As shown, the stops 1230 and the engagement surfaces 1232 permit the spout section 1008 to rotate approximately 90 degrees relative to the eyewash arm 1004. At one of the extremes, the eyewash arm 1004 is offset approximately 45 degrees from the spout section 1008. At the other of the extremes, the eyewash arm 1004 is offset approximately 135 degrees from the spout section 1008. In other embodiments, the stops 1230 and/or the engagement surfaces 1232 are otherwise positioned to increase or decrease the rotation range of the eyewash arm 1004 relative to the spout section 1008. In an alternative embodiment, the collar 1030 includes the stop 1230 and the spout section 1008 defines the engagement surfaces 1232.

Figure 29K:
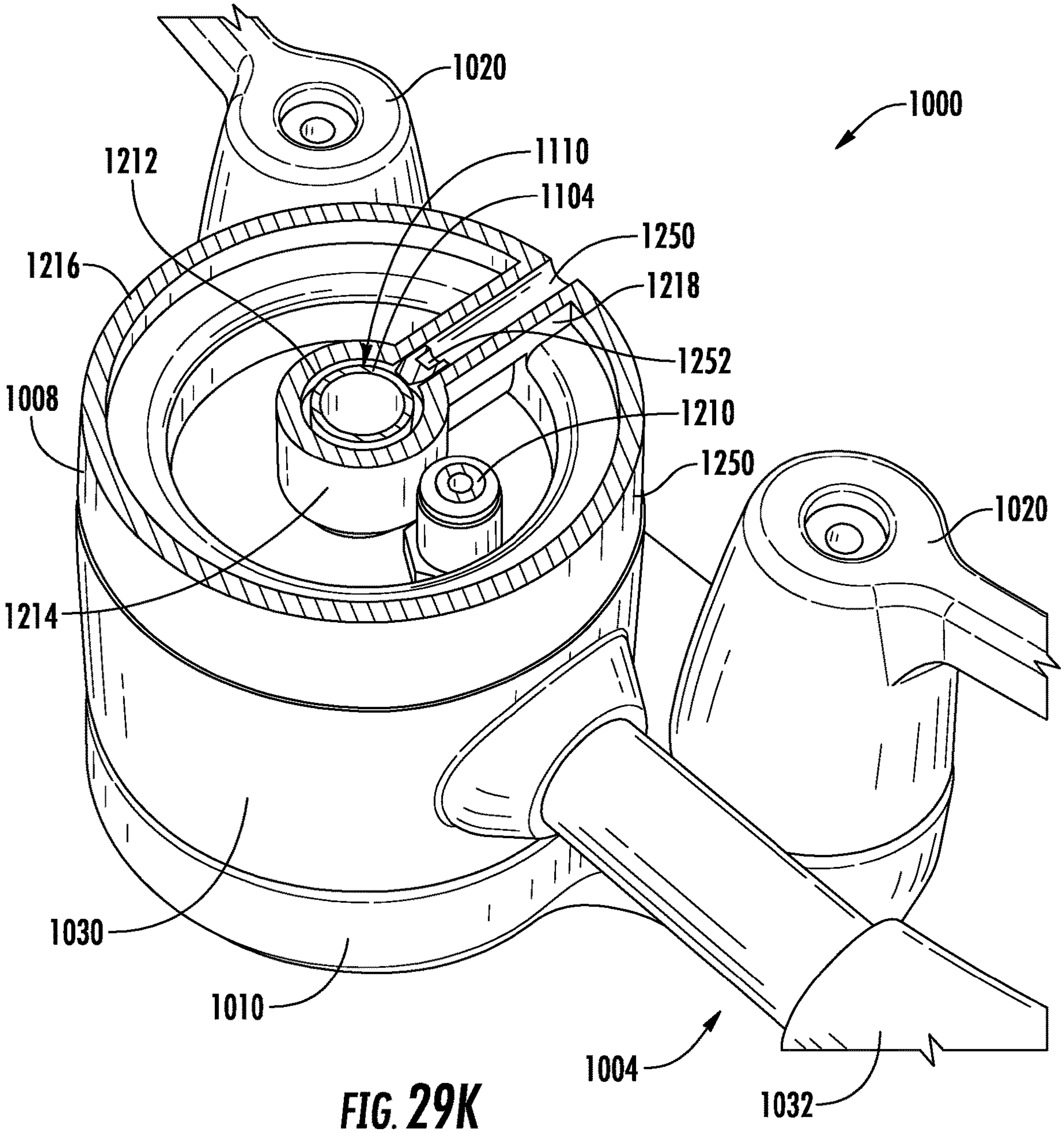
Figure 29L:
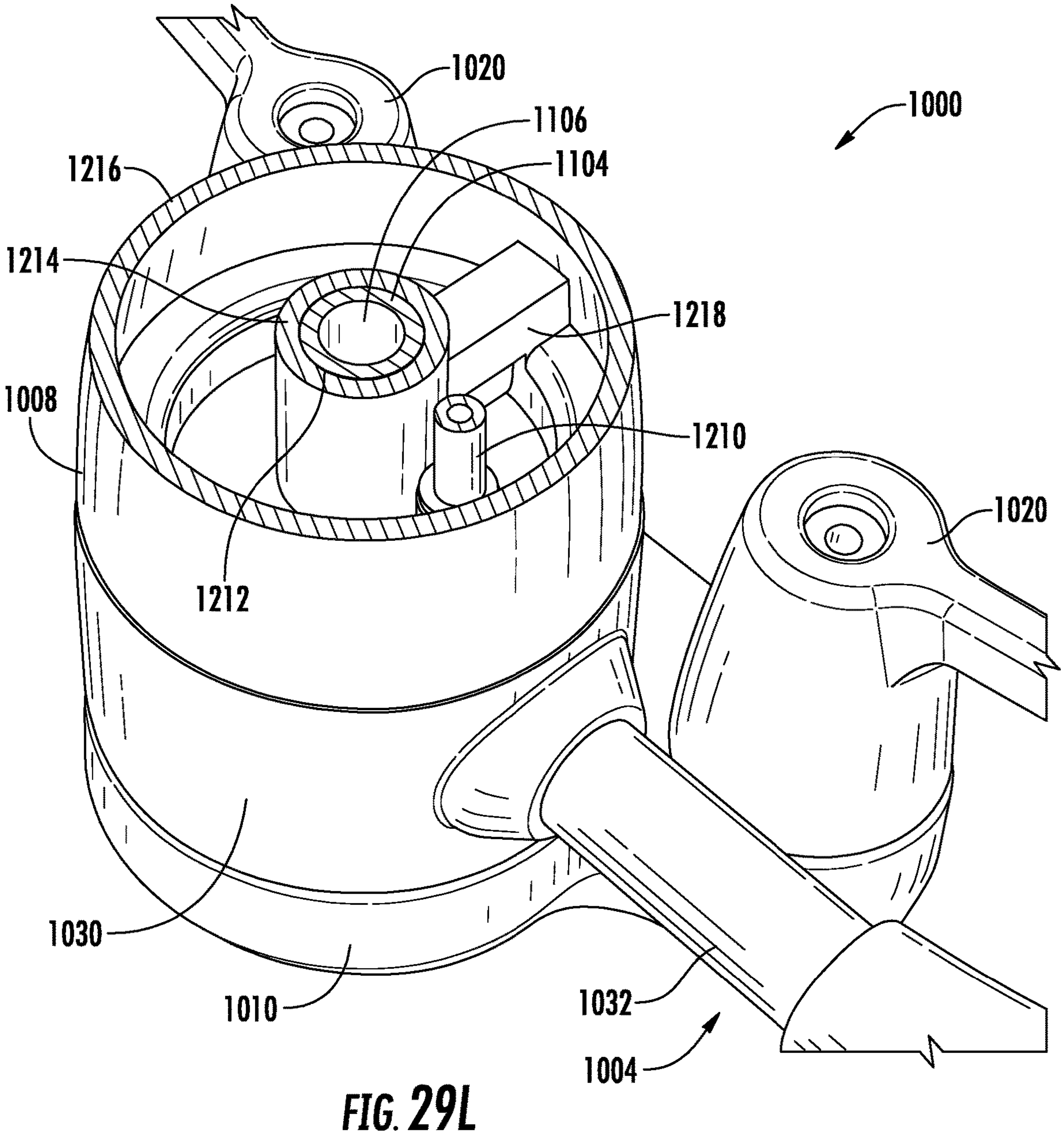
Figure 29M:
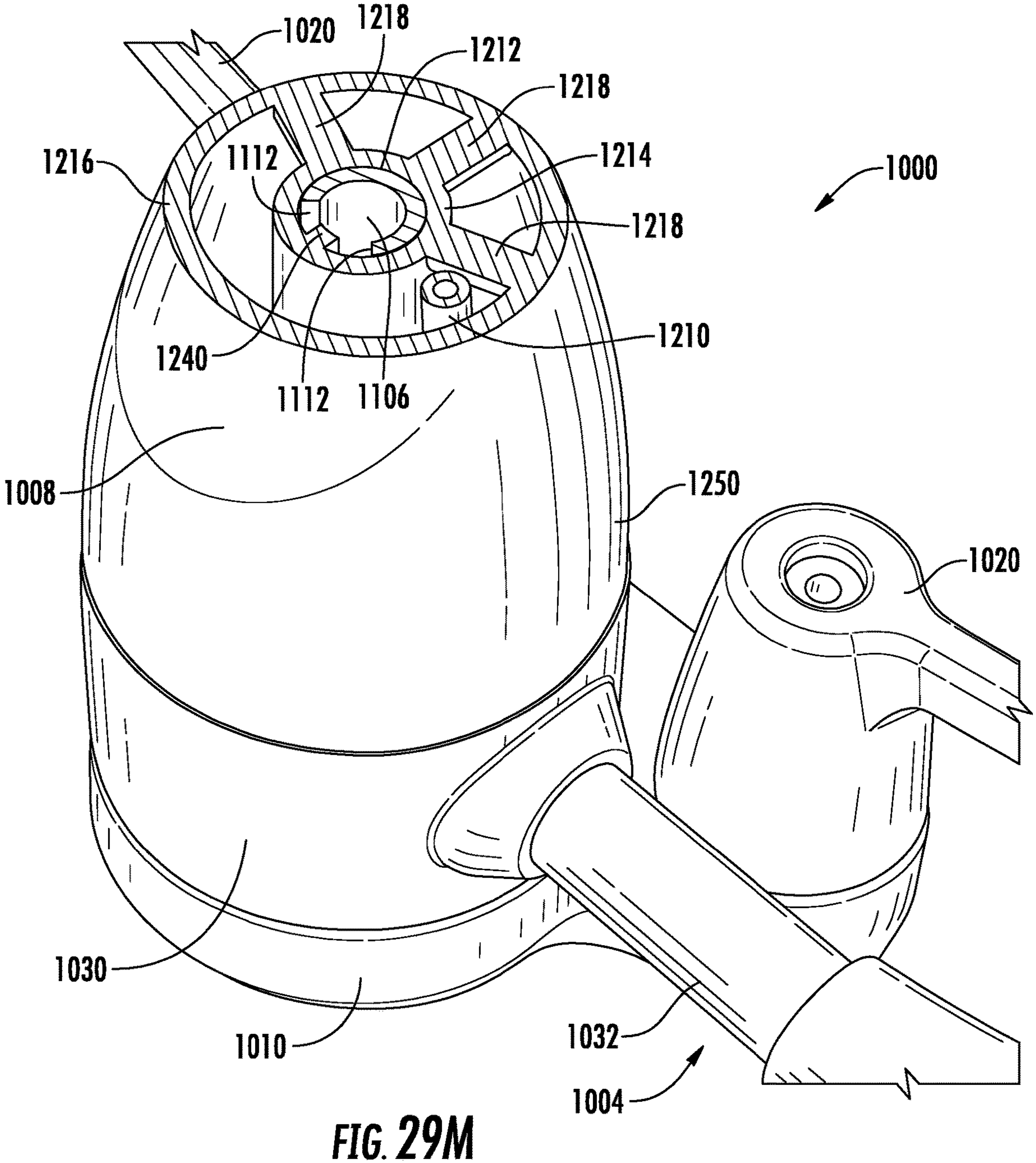
Figure 29N:
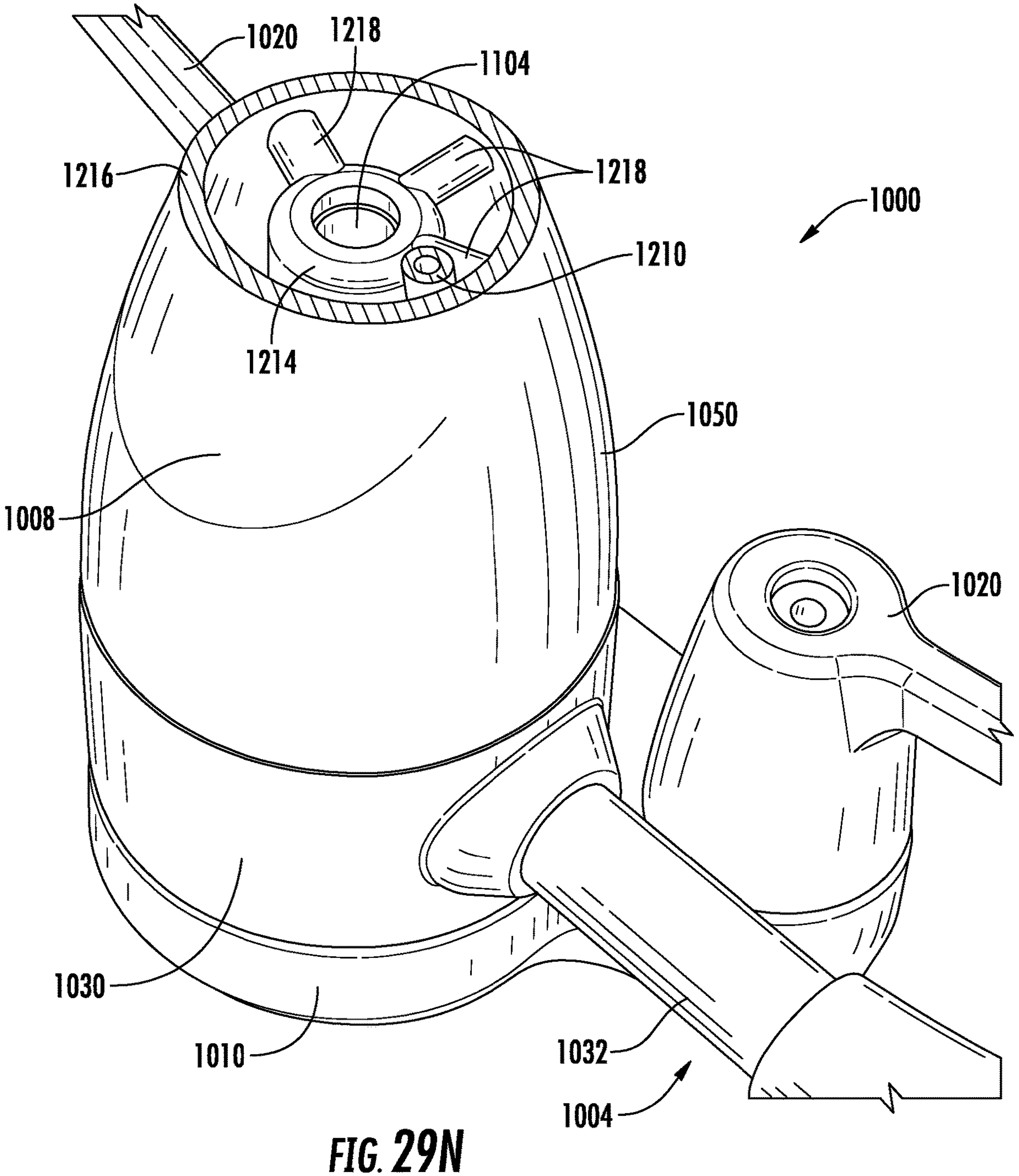

Referring to FIG. 29M, the center post 1214 of the spout section 1008 includes a radial protrusion, shown as stop 1240, that extends radially inward from an inner surface of the center post 1214. The stop 1240 defines a pair of opposing engagement surfaces. The engagement surfaces 1112 of the shaft 1104 are configured to engage the engagement surfaces of the stop 1240 to limit rotation of the spout section 1008 relative to the base 1002. At one extreme (e.g., corresponding to a first stored position of the spout section 1008), one engagement surface of the stop 1240 engages one of the engagement surfaces 1112, preventing the spout section 1008 from rotating farther in a first direction. At the other extreme, (e.g., corresponding to a second stored position of the spout section 1008), the other engagement surface of the stop 1240 engages the other engagement surface 1112, preventing the spout section 1008 from rotating farther in a second direction opposite the first direction. Between the extremes, the spout section 1008 is permitted to rotate freely. As shown, the stop 1240 and the engagement surfaces 1112 permit the eyewash arm 1004 to rotate approximately 90 degrees. This rotation range of the spout section 1008 is approximately centered about an orientation of the spout section 1008 where the spout section 1008 extends along the depth axis D (e.g., the active or center position of the spout section 1008). In other embodiments, the stop 1240 and/or the engagement surfaces 1112 are otherwise positioned to increase or decrease the rotation range of the spout section 1008. In an alternative embodiment, the center post 1100 includes the stop 1240 and the spout section 1008 defines the engagement surfaces 1112.

Referring to FIGS. 28, 29K, and 33, the center post 1100 rotatably couples the body 1010, the eyewash arm 1004, and the spout section 1008 together. A biasing member, shown as wave spring 1246, extends around the shaft 1104. The wave spring 1246 is compressed between the base 1102 and the body 1010. The wave spring 1246 imparts a downward biasing force on the center post 1100. The retaining ring groove 1116 is configured to receive a fastener, shown as retaining ring 1248 (e.g., a snap ring, an E clip, etc.). The retaining ring groove 1116 is positioned directly above the collar 1030 such that the retaining ring 1248 is positioned on a top surface of the collar 1030. Due to the downward biasing force of the wave spring 1246, the body 1010, the puck valve 1160, and the collar 1030 are held against one another. The spout section 1008 defines a passage, shown as set screw aperture 1250. The set screw aperture 1250 extends radially through the center post 1214, the outer shell 1216, and one of the standoffs 1218. The set screw aperture 1250 is configured to receive a fastener or retainer, shown as set screw 1252. The set screw aperture 1250 and the set screw 1252 are correspondingly threaded such that the radial position of the set screw 1252 can be adjusted by tightening or loosening the set screw 1252. The set screw 1252 extends into the retaining groove 1110. The set screw 1252 can move freely along the length of the retaining groove 1110, facilitating the spout section 1008 rotating freely about the center post 1100. If a vertical force is applied to the spout section 1008, the set screw 1252 engages the walls of the retaining groove 1110, preventing vertical movement of the spout section 1008.

Referring to FIGS. 38A-39B, the fixture 1000 is shown in various use configurations. Throughout normal operation, the eyewash arm 1004 is positioned in a stored position along the back of the sink 10, as shown in FIGS. 38A-38C. The user can use the handles 1020 or the motion sensor 1060 to control the temperature and/or flow rate of mixed water dispensed by the spout section 1008. The user can freely rotate the spout section 1008 independent of the eyewash arm 1004 until the stop 1240 engages one of the engagement surfaces 1112. Such movement does not affect the flow rate of the mixed water through the spout section 1008.

When the user desires to use the eyewash 1034 (e.g., to wash a contaminant away from their face or eyes), the user can pull the eyewash arm 1004 from the stored position toward the active position, as shown in FIGS. 38C-39B. As the eyewash arm 1004 moves toward the active position (e.g., toward alignment with the depth axis D), the top disk 1164 of the puck valve 1160 moves relative to the bottom disk 1162. When the eyewash arm 1004 is in the stored position, the puck valve 1160 is in the configuration shown in FIG. 37A. In this configuration, the mixed water apertures 1172 overlap, and the tepid water apertures 1170 do not overlap. Accordingly, mixed water flows freely through the puck valve 1160, and the puck valve 1160 prevents the flow of tepid water. As the eyewash arm 1004 moves, the mixed water apertures gradually move out of alignment, decreasing the flow of mixed water through the puck valve 1160. Eventually, the puck valve 1160 reaches a configuration where neither the tepid water aperture 1170 nor the mixed water apertures 1172 overlap, and no mixed water or tepid water flows through the puck valve 1160. As the eyewash arm 1004 nears the active position, the puck valve 1160 approaches the configuration shown in FIG. 37B. In this configuration, the tepid water apertures 1170 overlap, and the mixed water apertures 1172 do not overlap. Accordingly, tepid water flows freely through the puck valve 1160, and the puck valve 1160 prevents the flow of mixed water. In this way, the puck valve 1160 automatically activates the eyewash 1034 and deactivates the spout section 1008 as the eyewash arm 1004 is moved into the active position. The opposite occurs when the eyewash arm 1004 is moved back to the stored position.

In alternative embodiments, the puck valve 1160 is configured such that (a) the eyewash 1034 is fluidly coupled to the tepid water inlet 1134 and/or (b) the nozzle 1054 is fluidly coupled to the hot water inlet 1136 and/or the cold water inlet 1138, simultaneously. In one such embodiment, the mixed water apertures 1172 are enlarged (e.g., changed to slots) or relocated or more mixed water apertures 1172 are added to the puck valve 1160 such that the mixed water apertures 1172 overlap when the eyewash arm 1004 is in the active position. In other embodiments, the mixed water bypasses the puck valve 1160 entirely such that the mixed water passes from the mixed water passage 1150 to the nozzle 1054 without being controlled by the puck valve 1160. By way of example, the hose 1210 can be directly coupled to the mixed water passage 1150. In such an embodiment, the flow of the mixed water out of the nozzle 1054 can still be controlled using the handles 1020 and/or the motion sensor 1060.

Figure 39B:
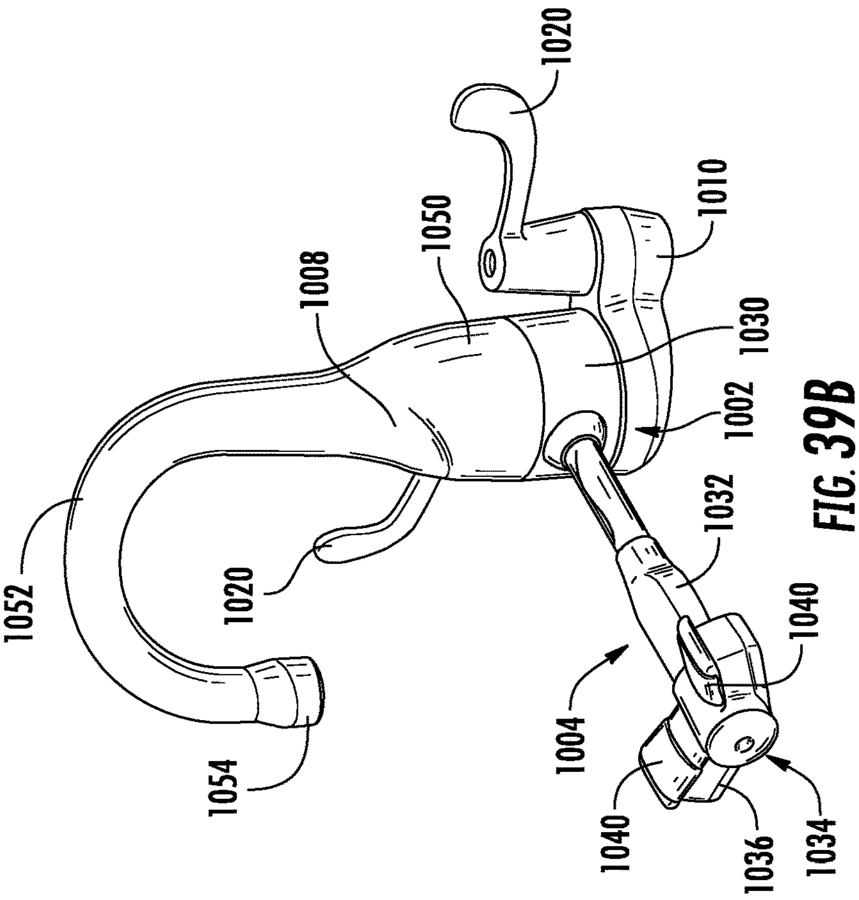
FIGS. 39A and 39B are perspective views of the combination eyewash and faucet unit of FIG. 26 illustrating movement of an eyewash arm of the combination eyewash and faucet unit, according to an exemplary embodiment.
Figure 39A:
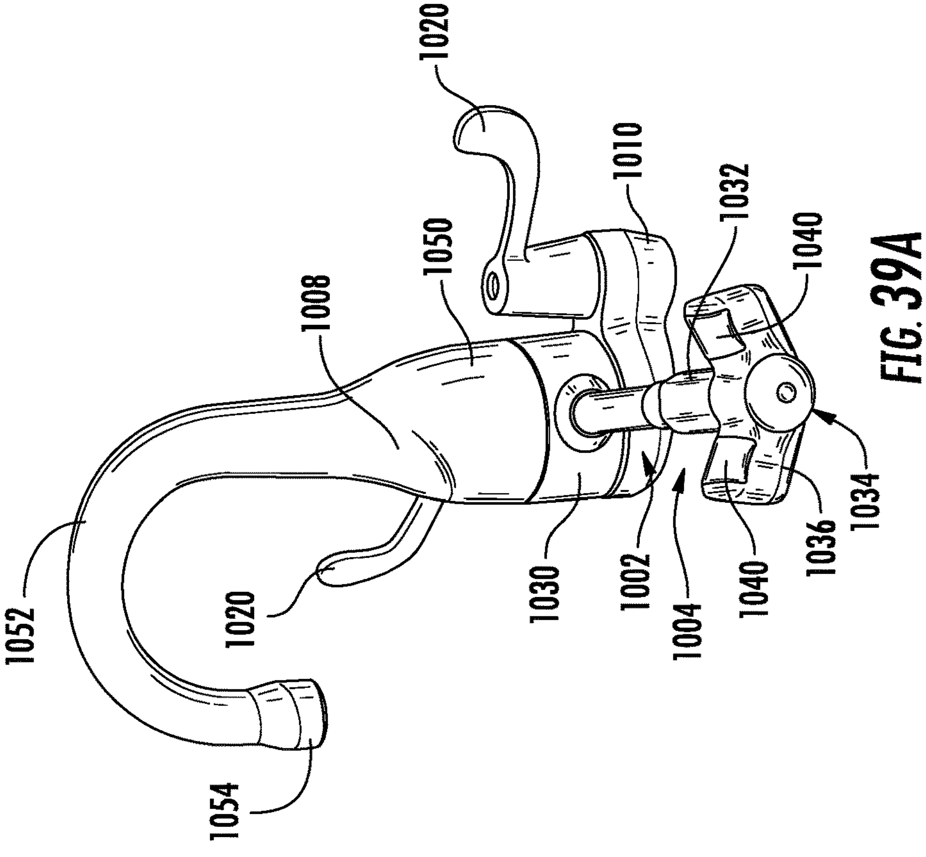

Moving the eyewash arm 1004 toward the active position also engages the stops 1230 to automatically move the spout section 1008 out of the active position and toward the stored position. This moves the spout section 1008 away from the active position of the eyewash arm 1004, providing clearance for the user's head. Referring to FIGS. 29J and 29M, the stops 1230 permit the spout section 1008 to begin in any orientation permitted by the stop 1240 (e.g., within degrees of the center position) when the eyewash arm 1004 is in the stored position. As the eyewash arm 1004 moves closer to the active position, the engagement surfaces 1232 move relative to the stops 1230. Once one of the engagement surfaces 1232 engages each stop 1230, the spout section 1008 begins rotating with the eyewash arm 1004. This engagement occurs when the spout section 1008 is offset approximately 45 degrees from the eyewash arm 1004. The eyewash arm 1004 and the spout section 1008 continue to rotate freely until the eyewash arm 1004 reaches the active position, as shown in FIG. 39B. In this position, the stop 1240 engages one of the engagement surfaces 1112, and the stops 1230 each continue to engage one of the engagement surfaces 1232. Accordingly, the spout section 1008 is prevented from moving relative to the eyewash arm 1004, and the eyewash arm 1004 is prevented from moving beyond the active position. To return the eyewash arm 1004 to the stored position, the user can simply push the eyewash arm 1004 back to the stored position without changing the position of the spout section 1008. Alternatively, the user can pull the spout section 1008 back to the active position, and contact between the stops 1230 and the engagement surfaces 1232 causes the eyewash arm 1004 to move back toward the stored position.

The fixture 1000 has multiple advantages that are not provided by a conventional emergency wash unit. When using the eyewash arm 1004 is rotated toward its active position over the depression 12 of the sink 10, the spout section 1008 is rotated away from the active position of the eyewash arm 1004, preventing the spout section 1008 from interfering with movement of the user's head. This can facilitate the fixture 1000 conforming to one or more standards. When the eyewash arm 1004 is into the active position, the eyewash 1034 can be centered over the depression 12 of the sink 10, minimizing the potential for water to splash outside of the sink 10. In the stored position, the eyewash arm 1004 is positioned along the rear side of the sink 10, leaving the left and right sides of the sink 10 unobstructed. Additionally, hot water, cold water, and tepid water are all introduced into the fixture 1000 through the mounting neck 1130. Accordingly, only one hole is required in the support structure 20 to install the fixture 1000.

Figure 38B:
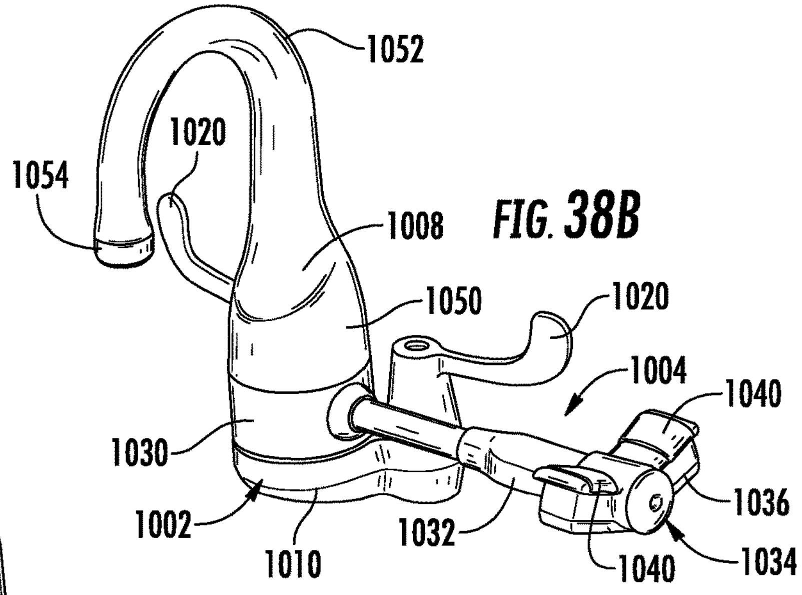
Figure 38C:
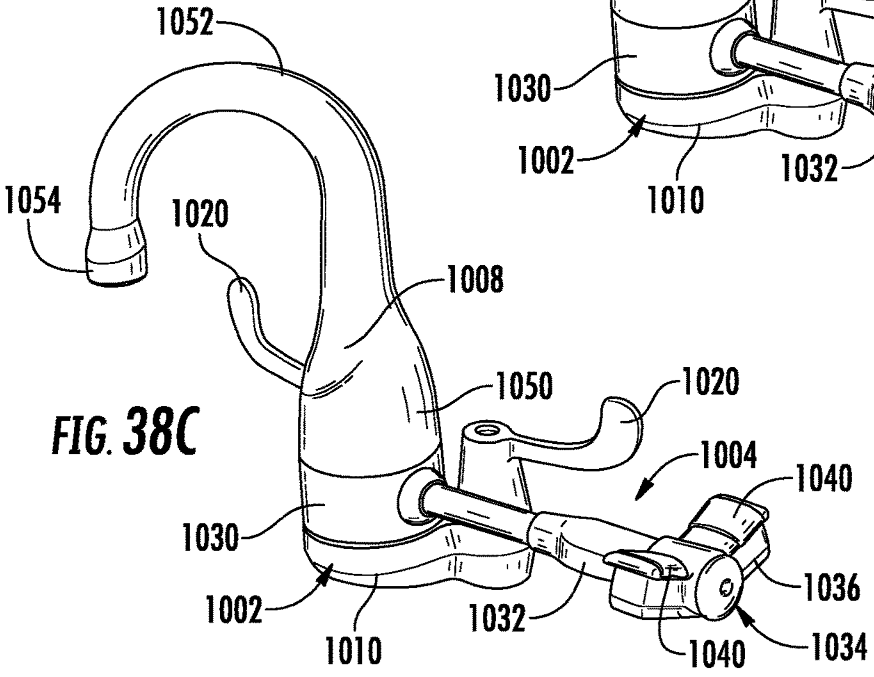

The eyewash arm 1004 is selectively reconfigurable between two configurations: a first or left hand configuration, shown in FIG. 26, and a second or right hand configuration, shown in FIG. 38B. In the left hand configuration, the eyewash arm 1004 extends a first direction along the lateral axis L in the stored position (e.g., left when viewed from the front), and in the right hand configuration, the eyewash arm 1004 extends the opposite direction along the lateral axis L in the stored position (e.g., right when viewed from the front). Accordingly, the stored position of the eyewash arm 1004 in the left hand configuration is angularly offset approximately 180 degrees from the stored position in the right hand configuration. This facilitates use of the fixture 1000 in environments having different obstacles positioned around the sink 10. To reconfigure the eyewash arm 1004, the spout section 1008 is removed, and the collar 1030 is removed from the shaft 1104. The eyewash arm 1004 is rotated 180 degrees, and the collar 1030 and the spout section 1008 are replaced.

The stop 1220 and the stops 1230 are configured to function similarly in both the left hand configuration and the right hand configuration. As shown in FIG. 29E, in the right hand configuration, the stop 1220 engages one of the engagement surfaces 1222 when the eyewash arm 1004 is in the stored position. In the left hand configuration, the stop 1220 engages the other of the engagement surfaces 1222 when the eyewash arm 1004 is in the stored position. As shown in FIG. 29J, in the right hand configuration, the stops 1230 engage a first pair of the engagement surfaces 1232 as the eyewash arm 1004 is moved to the active position. In the left hand configuration, the stops 1230 engage the other two engagement surfaces 1232 as the eyewash arm 1004 is moved to the active position.

Additionally, the puck valve 1160 functions similarly in both the first configuration and the second configuration.

When eyewash arm 1004 changes configurations, the top disk 1064 rotates 180 degrees. However, the top disk 1064 is radially symmetric due to the tepid water apertures 1070 and the mixed water apertures 1072 being diametrically opposed and arranged along constant radius circles. Accordingly, the rotating the top disk 1064 a full 180 degrees has no effect on the operation of the puck valve 1160.

Although the various embodiments described herein are shown with components having certain ornamental features, it is to be understood that the ornamental features shown in the drawings represent only a small subset of the ornamental features possible for use in the design. The various embodiments may incorporate individual components or assemblies having various curvatures, sizes, shapes, surface textures, material choices, relative locations, and relative orientations.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the combination eyewash and faucet unit as shown in the various exemplary embodiments is illustrative only. Additionally, any element disclosed in one embodiment may be incorporated or utilized with any other embodiment disclosed herein. For example, the motion sensor 1060 of the exemplary embodiment shown in FIG. 30 may be incorporated in the fixture 1000 of an embodiment in which the fixture 1000 omits the handles 1020, as described herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A combination emergency wash and faucet unit, comprising:

a base;

an emergency wash arm coupled to the base, the emergency wash arm including an emergency wash unit having a first fluid outlet facing at least partially upward, wherein the emergency wash arm is repositionable relative to the base; and a spout coupled to the base, wherein the spout is repositionable relative to the base and the emergency wash arm, wherein the emergency wash arm is selectively reconfigurable between a left hand configuration and a right hand configuration.

2. The combination emergency wash and faucet unit of claim 1, wherein the emergency wash arm is spaced apart from the spout in a first direction when in the left hand configuration, and wherein the emergency wash arm is spaced apart from the spout in a second direction opposite the first direction when in the right hand configuration.

3. The combination emergency wash and faucet unit of claim 1, wherein the emergency wash arm is movable in a first direction when moving toward a first active position in the left hand configuration, and wherein the emergency wash arm is movable in a second direction opposite the first direction when moving toward a second active position in the right hand configuration.

4. The combination emergency wash and faucet unit of claim 3, wherein the emergency wash arm moves relative to the base in a substantially horizontal plane in both the left hand configuration and the right hand configuration.

5. The combination emergency wash and faucet unit of claim 3, wherein the emergency wash arm is movable between a first stored position and the first active position when in the left hand configuration, wherein the emergency wash arm is movable between a second stored position and the second active position when in the right hand configuration, and wherein the first active position and the second active position are the same position.

6. The combination emergency wash and faucet unit of claim 1, wherein the spout is movable in a first direction in response to the emergency wash arm moving toward an active position in the left hand configuration, and wherein the spout is movable in a second direction opposite the first direction in response to the emergency wash arm moving toward the active position in the right hand configuration.

7. The combination emergency wash and faucet unit of claim 6, wherein the spout is rotatable relative to the base about a substantially vertical axis.

8. The combination emergency wash and faucet unit of claim 1, wherein the emergency wash arm moves relative to the base in a substantially horizontal plane in both the left hand configuration and the right hand configuration.

9. The combination emergency wash and faucet unit of claim 8, wherein the emergency wash arm is rotatable relative to the base about a substantially vertical axis.

10. A combination emergency wash and faucet unit, comprising:

a base;

an emergency wash arm coupled to the base, the emergency wash arm including an emergency wash unit, wherein the emergency wash arm is rotatable relative to the base about a first axis; and a spout coupled to the base, wherein the spout is rotatable relative to the base about a second axis that is different from the first axis.

11. The combination emergency wash and faucet unit of claim 10, wherein the second axis is a substantially vertical axis.

12. The combination emergency wash and faucet unit of claim 10, wherein the emergency wash unit has an outlet that is positioned to dispense a fluid upward.

13. The combination emergency wash and faucet unit of claim 10, wherein a rotation of the emergency wash arm about the first axis causes a corresponding movement of the spout about the second axis.

14. The combination emergency wash and faucet unit of claim 10, wherein a rotation of the spout about the second axis causes a corresponding movement of the emergency wash arm about the first axis.

15. The combination emergency wash and faucet unit of claim 10, wherein the spout is at least partly movable independent of the emergency wash arm when the emergency wash arm is in a stored position.

16. A combination emergency wash and faucet unit, comprising:

a base;

an emergency wash arm coupled to the base, the emergency wash arm including an emergency wash unit having a first fluid outlet facing at least partially upward; and a spout coupled to the base, the spout having a second fluid outlet facing at least partially downward, wherein at least one of the emergency wash arm or the spout is movable relative to the base in a substantially horizontal plane.

17. The combination emergency wash and faucet unit of claim 16, wherein the emergency wash arm is movable relative to the base in the substantially horizontal plane.

18. The combination emergency wash and faucet unit of claim 17, wherein the spout is pivotally coupled to the base, and wherein the spout is rotatable relative to the base about a substantially vertical axis.

19. The combination emergency wash and faucet unit of claim 16, wherein the spout is movable relative to the base in the substantially horizontal plane.

20. The combination emergency wash and faucet unit of claim 16, wherein the base is configured to be coupled to a sink, wherein the first fluid outlet is positioned to direct a first fluid away from the sink, and wherein the second fluid outlet is positioned to direct a second fluid toward the sink.

* * * * *